United States Patent
Huang et al.

(10) Patent No.: US 11,516,745 B2
(45) Date of Patent: Nov. 29, 2022

(54) UPLINK POWER CONTROL METHOD, TERMINAL DEVICE, AND NETWORK DEVICE

(71) Applicant: DATANG MOBILE COMMUNICATIONS EQUIPMENT CO., LTD., Beijing (CN)

(72) Inventors: Qiuping Huang, Beijing (CN); Qiubin Gao, Beijing (CN); Runhua Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/284,769

(22) PCT Filed: Sep. 23, 2019

(86) PCT No.: PCT/CN2019/107355
§ 371 (c)(1),
(2) Date: Apr. 12, 2021

(87) PCT Pub. No.: WO2020/073794
PCT Pub. Date: Apr. 16, 2020

(65) Prior Publication Data
US 2022/0015039 A1  Jan. 13, 2022

(30) Foreign Application Priority Data
Oct. 12, 2018 (CN) .......................... 201811192321.0

(51) Int. Cl.
*H04W 52/18* (2009.01)
*H04W 52/14* (2009.01)
*H04B 7/0456* (2017.01)

(52) U.S. Cl.
CPC ........ *H04W 52/146* (2013.01); *H04B 7/0456* (2013.01); *H04W 52/18* (2013.01)

(58) Field of Classification Search
USPC ....................................................... 455/522
See application file for complete search history.

(56) References Cited

U.S. PATENT DOCUMENTS 7,493,132 B2 * 2/2009 Malladi ................. H04W 28/22
455/442
9,144,040 B2 * 9/2015 Xiao ..................... H04B 7/0447
(Continued)

FOREIGN PATENT DOCUMENTS

| CN | 101674642 A | 3/2010 |
| CN | 102763463 A | 10/2012 |
| CN | 103733692 A | 4/2014 |

OTHER PUBLICATIONS

CATT, "Consideration on full transmission power of UL", 3GPP TSG RAN WG1 Meeting #94bis, Chengdu, China, Oct. 8-12, 2018, total 9 pages, R1-1810557.
(Continued)

*Primary Examiner* — Hai V Nguyen
(74) *Attorney, Agent, or Firm* — Kilpatrick Townsend & Stockton, LLP

(57) ABSTRACT

Disclosed in the present invention are an uplink power control method, a terminal device and a network device. The uplink power control method comprises: determining, according to the power capability of a terminal device, a power control scaling rule for an uplink signal, and/or determining, according to a first instruction message from a network device, the power control scaling rule; and processing the power of the uplink signal according to the scaling rule, and determining, according to the processed power, the transmission power of the uplink signal at each antenna port.

23 Claims, 3 Drawing Sheets

(56) References Cited

U.S. PATENT DOCUMENTS

| | | | |
|---|---|---|---|
| 9,642,101 B2* | 5/2017 | Xiao | H04W 52/346 |
| 10,085,164 B2* | 9/2018 | Chen | H04W 24/10 |
| 10,237,832 B2* | 3/2019 | Sagae | H04W 52/18 |
| 10,383,099 B2* | 8/2019 | Ko | H04W 72/0413 |
| 10,476,567 B2* | 11/2019 | Wernersson | H04W 72/0473 |
| 10,834,686 B2* | 11/2020 | Xiao | H01Q 1/246 |
| 10,931,339 B2* | 2/2021 | Huang | H04B 7/0469 |
| 10,993,190 B2* | 4/2021 | Yang | H04W 52/325 |
| 11,206,618 B2* | 12/2021 | Huang | H04L 25/0226 |
| 2011/0081940 A1* | 4/2011 | Gerstenberger | H04W 52/325 455/522 |
| 2011/0190026 A1* | 8/2011 | Nishikawa | H04W 52/08 455/522 |
| 2012/0082192 A1 | 4/2012 | Pelletier et al. | |
| 2012/0114030 A1 | 5/2012 | Yue et al. | |
| 2013/0310105 A1* | 11/2013 | Sagae | H04W 52/34 455/522 |
| 2013/0324181 A1 | 12/2013 | Aio et al. | |
| 2015/0230190 A1 | 8/2015 | Shin et al. | |
| 2015/0351056 A1* | 12/2015 | Xiao | H04W 52/42 455/522 |
| 2016/0112961 A1* | 4/2016 | Zhang | H04W 52/242 455/522 |
| 2017/0201954 A1* | 7/2017 | Xiao | H01Q 1/246 |
| 2018/0007640 A1 | 1/2018 | Lee et al. | |
| 2018/0219590 A1* | 8/2018 | Matsuda | H04L 27/183 |
| 2018/0242308 A1* | 8/2018 | Ko | H04B 7/0626 |
| 2019/0132096 A1* | 5/2019 | Abedini | H04W 52/46 |
| 2019/0312617 A1* | 10/2019 | Wernersson | H04B 7/0626 |
| 2019/0387481 A1* | 12/2019 | Yang | H04W 52/325 |
| 2019/0394733 A1* | 12/2019 | Yang | H04B 7/0628 |
| 2020/0036425 A1* | 1/2020 | Ren | H04B 7/024 |
| 2020/0044706 A1* | 2/2020 | Wernersson | H04B 7/0486 |
| 2020/0053801 A1* | 2/2020 | Hosseini | H04W 72/0413 |
| 2020/0204225 A1* | 6/2020 | Huang | H04B 7/0456 |
| 2021/0058876 A1* | 2/2021 | Xiao | H04W 52/52 |
| 2021/0120499 A1* | 4/2021 | Su | H04B 7/0486 |
| 2021/0314873 A1* | 10/2021 | Huang | H04L 5/0051 |

OTHER PUBLICATIONS

Texas Instruments, "Further Details on LTE-A UL Power Control", 3GPP TSG RAN WG1 #59bis,Valencia, Spain, Jan. 18-22, 2010, total 5 pages, R1-100449.

Ericsson,"Power control for UL MIMO", 3GPP TSG RAN WG1 Meeting #92bis, Sanya, China, Apr. 16-20, 2018, total 8 pages, R1-1805205.

CATT,"Remaining issues on non-codebook based UL transmission",3GPP TSG RAN WG1 Meeting #93, Busan, Korea, May 21-25, 2018,total 7 pages, R1-18062773.

* cited by examiner

UPLINK POWER CONTROL METHOD, TERMINAL DEVICE, AND NETWORK DEVICE

CROSS-REFERENCE OF RELATED APPLICATIONS

The present application is a national phase entry under 35 U.S.C. § 371 of International Application No. PCT/CN2019/107355, filed on Sep. 23, 2019, which claims the priority from Chinese Patent Application No. 201811192321.0, filed on Oct. 12, 2018, in the China National Intellectual Property Administration and entitled "Uplink Power Control Method, Terminal Device, and Network Device", which is hereby incorporated by reference in its entirety.

FIELD

The present application relates to the field of communication technology, and in particular to an uplink power control method, a terminal device and a network device.

BACKGROUND

From the perspective of the performance of a terminal device, such as User Equipment (UE), when the UE is located at the edge of a cell or the channel conditions are poor, the network device usually configures the UE with a low-rank transmission and transmits the data with the maximum transmit power as possible.

At present, under the codebook design of the New Radio (NR) system of the 3rd Generation Partnership Project (3GPP), for the codebook-based uplink transmission, there are always some antenna ports without Physical Uplink Shared Channel (PUSCH) transmission when the UE with the partial antenna coherent transmission capability and non-coherent transmission capability performs the low-rank transmission.

It can be seen that the current uplink Multiple Input Multiple Output (MIMO) multi-antenna power allocation mechanism cannot ensure that the UE with the partial antenna coherent transmission capability and non-coherent transmission capability can reach the maximum transmit power during the low-rank transmission under the codebook-based uplink transmission scheme, thereby reducing the performance of the UE at the edge of the cell and affecting the coverage of the cell.

SUMMARY

The embodiments of the present application provide an uplink power control method, a terminal device and a network device, to improve the performance of a UE at the edge of a cell.

In a first aspect, an uplink power control method is provided, which includes:
determining a power control scaling rule of an uplink signal according to a power capability of a terminal device, and/or
determining a power control scaling rule according to a first instruction message from a network device;
processing transmit power of the uplink signal according to the scaling rule, and determining transmit power on each antenna port of the uplink signal according to the processed transmit power.

In one embodiment, the power capability of the terminal device includes:
default power capability; or
power capability indicated by a power capability indication message sent by the terminal device to the network device.

In one embodiment, the power capability indication message includes a first signaling parameter, and the first signaling parameter includes multiple candidate values or multiple states, where the different candidate values indicate different power capabilities, and the different states indicate different power capabilities.

In one embodiment, the power capability indication message includes at least one of:
type information of the terminal device;
power class information of the terminal device;
coherent capability information of antennas of the terminal device;
codebook subset type supported by the terminal device.

In one embodiment, the power capability includes at least one of:
capability of the terminal device on transmit power of an Antenna Connector (AC);
capability of the terminal device on transmit power of an antenna port;
capability of the terminal device on transmit power of a Power Amplifier (PA);
capability of the terminal device on supporting full power transmission for one or more layers when the uplink signal is in a codebook-based uplink transmission mode;
indicated capability on whether the terminal device supports UL full power transmission;
indicated capability on whether the terminal device supports full power transmission for the uplink signal in a codebook-based uplink transmission mode;
indicated capability on whether the terminal device supports full power transmission with single-layer transmission for the uplink signal in a codebook-based uplink transmission mode;
indicated capability on whether the terminal device supports full power transmission for the uplink signal in a non-codebook based uplink transmission mode;
indicated capability on whether the terminal device supports full power transmission with single-layer transmission for the uplink signal in a non-codebook based uplink transmission mode;
indicated capability on whether the terminal device can use a codebook beyond its antenna coherence capability.

In one embodiment, the power capability includes:
capability of the terminal device on transmit power of each AC; or
capability of the terminal device on transmit power of each AC for the uplink signal in the codebook-based uplink transmission mode; or
capability of the terminal device on transmit power of each AC corresponding to a coherent antenna group; or
capability of the terminal device on transmit power of each AC corresponding to a coherent antenna group for the uplink signal in the codebook-based uplink transmission mode; or
capability of the terminal device on transmit power of each PA; or
capability of the terminal device on transmit power of each PA for the uplink signal in the codebook-based uplink transmission mode; or
capability of the terminal device on transmit power of each PA corresponding to a coherent antenna group; or capability of the terminal device on transmit power of each PA corresponding to a coherent antenna group for the uplink signal in the codebook-based uplink transmission mode; or capability of the terminal device on transmit power of each antenna port; or capability of the terminal device on transmit power of each antenna port for the uplink signal in the codebook-based uplink transmission mode; or capability of the terminal device on transmit power of each antenna corresponding to a coherent antenna group; or capability of the terminal device on transmit power of each antenna corresponding to a coherent antenna group for the uplink signal in the codebook-based uplink transmission mode; or capability of the terminal device on transmit power corresponding to each coherent antenna group; or capability of the terminal device on transmit power corresponding to each coherent antenna group for the uplink signal in the codebook-based uplink transmission mode.

In one embodiment, the power capability includes at least one of:

capability of the terminal device on the sum of transmit powers of any group of coherent antenna groups can reach the maximum output power corresponding to the power class of the terminal device;

capability of the terminal device on the sum of transmit powers of all ACs or all PAs or all antenna ports can reach the maximum output power corresponding to the power class of the terminal device;

capability of the terminal device on the transmit power of at least one AC can reach the maximum output power corresponding to the power class of the terminal device;

capability of the terminal device on the sum of transmit powers of at least N ACs can reach the maximum output power corresponding to the power class of the terminal device, where N is a positive integer;

capability of the terminal device on each AC can reach one $M^{th}$ of the maximum output power corresponding to the power class of the terminal device, where M is a positive integer;

capability of the terminal device on the sum of transmit powers of any Q ACs can reach the maximum output power corresponding to the power class of the terminal device, where Q is a positive integer;

capability of the terminal device on the transmit power of at least one PA can reach the maximum output power corresponding to the power class of the terminal device;

capability of the terminal device on the sum of transmit powers of at least N PAs of the terminal device can reach the maximum output power corresponding to the power class of the terminal device, where N is a positive integer;

capability of the terminal device on the transmit power of each PA can reach one $M^{th}$ of the maximum output power corresponding to the power class of the terminal device, where M is a positive integer;

capability of the terminal device on the sum of transmit powers of any Q PAs can reach the maximum output power corresponding to the power class of the terminal device, where Q is a positive integer;

capability of the terminal device on the transmit power of at least one antenna port can reach the maximum output power corresponding to the power class of the terminal device;

capability of the terminal device on the sum of transmit powers of at least N antenna ports can reach the maximum output power corresponding to the power class of the terminal device, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer;

capability of the terminal device on the transmit power of at least one AC can reach the maximum output power corresponding to the power class of the terminal device for the uplink signal in the codebook-based uplink transmission mode;

capability of the terminal device on the sum of transmit powers of at least N ACs can reach the maximum output power corresponding to the power class of the terminal device for the uplink signal in the codebook-based uplink transmission mode, where N is a positive integer;

capability of the terminal device on the transmit power of each AC can reach one Mtn of the maximum output power corresponding to the power class of the terminal device for the uplink signal in the codebook-based uplink transmission mode, where M is a positive integer;

capability of the terminal device on the sum of transmit powers of any Q ACs can reach the maximum output power corresponding to the power class of the terminal device for the uplink signal in the codebook-based uplink transmission mode, where Q is a positive integer;

capability of the terminal device on the transmit power of at least one PA can reach the maximum output power corresponding to the power class of the terminal device for the uplink signal in the codebook-based uplink transmission mode;

capability of the terminal device on the sum of transmit powers of at least N PAs can reach the maximum output power corresponding to the power class of the terminal device for the uplink signal in the codebook-based uplink transmission mode, where N is a positive integer;

capability of the terminal device on the transmit power of each PA can reach one Mtn of the maximum output power corresponding to the power class of the terminal device for the uplink signal in the codebook-based uplink transmission mode, where M is a positive integer;

capability of the terminal device on the sum of transmit powers of any Q PAs can reach the maximum output power corresponding to the power class of the terminal device for the uplink signal in the codebook-based uplink transmission mode, wherein Q is a positive integer;

capability of the terminal device on the transmit power of at least one antenna port can reach the maximum output power corresponding to the power class of the terminal device for the uplink signal in the codebook-based uplink transmission mode;

capability of the terminal device on the sum of transmit powers of at least N antenna ports can reach the maximum output power corresponding to the power class of the terminal device for the uplink signal in the codebook-based uplink transmission mode, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer.

In one embodiment, the N is the number of antenna ports corresponding to the uplink MIMO; the M is the maximum number of antenna ports that the terminal device can transmit coherently.

In one embodiment, the power capability indication message does not contain the power class of the terminal device, and determining the power control scaling rule of the uplink signal according to the power capability includes:

determining the power control scaling rule of the uplink signal according to the power capability and the power class of the terminal device;

where the power class of the terminal device is indicated by the network device, or reported by the terminal device.

In one embodiment, determining the power control scaling rule of the uplink signal according to the power capability, includes:

determining the power control scaling rule according to the power capability and at least one of following parameters, where the parameters include:

the number of antenna ports configured by the network device for the uplink signal transmission;

a precoding matrix corresponding to the uplink signal;

a codebook subset restriction type corresponding to the uplink signal;

the number of transmission layer corresponding to the uplink signal;

maximum power of uplink transmission.

In one embodiment, the parameters include a precoding matrix corresponding to the uplink signal, and determining the power control scaling rule according to the power capability and the at least one parameter includes:

determining the power control scaling rule according to the power capability and the number of coherent antenna groups associated with non-zero elements in the precoding matrix corresponding to the uplink signal; or determining the power control scaling rule according to the power capability and a codeword coherent transmission type corresponding to the precoding matrix corresponding to the uplink signal; or determining the power control scaling rule according to the power capability, the number of coherent antenna groups associated with non-zero elements in the precoding matrix corresponding to the uplink signal, and the number of antenna ports configured by the network device for transmission of the uplink signal; or determining the power control scaling rule according to the power capability, a codeword coherent transmission type corresponding to the precoding matrix corresponding to the uplink signal, and the number of antenna ports configured by the network device for transmission of the uplink signal; or determining the power control scaling rule according to the power capability, a codeword coherent transmission type corresponding to the precoding matrix corresponding to the uplink signal, and the number of transmission layers corresponding to the uplink signal; or determining the power control scaling rule according to the power capability, a coherent transmission type corresponding to the precoding matrix corresponding to the uplink signal, the number of transmission layers corresponding to the uplink signal, and the number of antenna ports configured by the network device for transmission of the uplink signal.

In one embodiment, the parameters include a codebook subset restriction type corresponding to the uplink signal, and determining the power control scaling rule according to the power capability and at least one parameter includes:

determining the power control scaling rule according to the power capability, the codebook subset restriction type corresponding to the uplink signal, and the number of antenna ports configured by the network device for transmission of the uplink signal; or determining the power control scaling rule according to the power capability, the codebook subset restriction type corresponding to the uplink signal, the number of transmission layers corresponding to the uplink signal, and the number of antenna ports configured by the network device for transmission of the uplink signal; or determining the power control scaling rule according to the power capability, the codebook subset restriction type corresponding to the uplink signal, and a coherent transmission type corresponding to the precoding matrix corresponding to the uplink signal; or determining the power control scaling rule according to the power capability, the codebook subset restriction type corresponding to the uplink signal, a coherent transmission type corresponding to the precoding matrix corresponding to the uplink signal, and the number of antenna ports configured by the network device for transmission of the uplink signal; or determining the power control scaling rule according to the power capability, the codebook subset restriction type corresponding to the uplink signal, a coherent transmission type corresponding to the precoding matrix corresponding to the uplink signal, the number of transmission layers corresponding to the uplink signal, and the number of antenna ports configured by the network device for transmission of the uplink signal.

In one embodiment, determining the power control scaling rule according to the power capability and at least one parameter, includes:

determining the power control scaling rule as a first power control scaling rule when the power capability and the at least one parameter satisfy a first preset condition.

In one embodiment, determining the power control scaling rule according to the power capability, includes:

determining the power control scaling rule as a second power control scaling rule when the power capability satisfies a second preset condition.

In one embodiment, the method further includes:

receiving a codebook subset restriction parameter from the network device, where the codebook subset restriction parameter carries the first instruction message.

In one embodiment, the first instruction message carries a first parameter, the first parameter indicates the type of the power control scaling rule, and different types correspond to different power control scaling rules.

In one embodiment, the first instruction message carries a second parameter, the second parameter indicates whether the terminal device uses full power to transmit an uplink signal.

In one embodiment, determining the power control scaling rule according to the first instruction message, includes:

determining the power control scaling rule as a third power control scaling rule when the first instruction message satisfies a third preset condition.

In one embodiment, the power control scaling rule is at least one of:

not scaling the transmit power, calculated according to high-level parameters, of the uplink signal;

scaling the transmit power, calculated according to high-level parameters, of the uplink signal with a power control scaling factor.

In one embodiment, processing the transmit power of the uplink signal according to the scaling rule, includes:

the second preset condition is that the transmit power of each antenna port or AC or PA of the terminal device reaches a maximum output power requirement corresponding to a power class of the terminal device, and the power control scaling rule is not scaling the transmit power, calculated according to high-level parameters, of the uplink signal or scaling the transmit power, calculated according to high-level parameters, of the uplink signal with a power control scaling factor of 1; or the third preset condition is that the first instruction message instructs the terminal device to transmit the uplink signal at full power, and the power control scaling rule is not scaling the transmit power, calculated according to high-level parameters, of the uplink signal or scaling the transmit power, calculated according to high-level parameters, of the uplink signal with a power control scaling factor of 1; or the first preset condition is that the transmit power of each antenna port or AC or PA of the terminal device reaches one half of the maximum output power requirement corresponding to a power class of the terminal device, the number of antenna ports configured by the network device for an uplink transmission mode of the uplink signal is greater than 1, and an indicated precoding matrix corresponds to a precoding matrix of single-layer NC transmission, and the power control scaling rule is scaling the transmit power, calculated according to high-level parameters, of the uplink signal with a power control scaling factor of ½; or the first preset condition is that the transmit power of each antenna port or AC or PA of the terminal device reaches a quarter of the maximum output power requirement corresponding to a power class of the terminal device, the number of antenna ports configured by the network device for an uplink transmission mode of the uplink signal is greater than 1, and an indicated precoding matrix corresponds to a precoding matrix of three-layer NC transmission, and the power control scaling rule is scaling the transmit power, calculated according to high-level parameters, of the uplink signal with a power control scaling factor of ¾; or the second preset condition is that the transmit power of each antenna port or AC or PA of the terminal device reaches a quarter of the maximum output power requirement corresponding to a power class of the terminal device, or a single antenna port or AC or PA of the terminal device does not reach a specific requirement, or the terminal device does not report the capability of each antenna port or AC or PA, or a communication protocol does not formulate a performance requirement for each antenna port or AC or PA of the terminal device, and the power control scaling rule is scaling the transmit power, calculated according to high-level parameters, of the uplink signal with a ratio of an actual number of ports for sending signals to the total number of ports configured by the network device for a transmission mode corresponding to the uplink signal; or the second preset condition is that the transmit power of each antenna port, or AC, or PA of the terminal device reaches the maximum power of uplink transmission, and the power control scaling rule is not scaling the transmit power, calculated according to high-level parameters, of the uplink signal or scaling the transmit power, calculated according to high-level parameters, of the uplink signal with a power control scaling factor of 1; or the first preset condition is that the power capability of the terminal device is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of single-layer NC transmission, and the power control scaling rule is scaling the transmit power, calculated according to high-level parameters, of the uplink signal with a power control scaling factor of ½; or the first preset condition is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of three-layer NC transmission, and the power control scaling rule is scaling the transmit power, calculated according to high-level parameters, of the uplink signal with a power control scaling factor of ¾; or the second preset condition is that the transmit power of each antenna port, or AC, or PA of the terminal device reaches a quarter of the maximum power of uplink transmission, or a single antenna port of the terminal device does not reach a specific requirement, or the terminal device does not report the capability of each antenna port, or a communication protocol does not formulate a performance requirement for each antenna port, or AC, or PA of the terminal device, and the power control scaling rule is scaling the transmit power, calculated according to high-level parameters, of the uplink signal with a ratio of an actual number of ports for sending signals to the total number of ports configured by the network device for a transmission mode corresponding to the uplink signal.

In one embodiment, processing the transmit power of the uplink signal according to the scaling rule, includes:

scaling the transmit power, calculated according to high-level parameters, of the uplink signal with a power control scaling factor, where:

when a precoding matrix of the uplink signal is non-coherent transmission precoding matrix, the power control scaling factor is $$\beta = \min\left\{\frac{\rho_0}{\rho}, \frac{\rho}{R}\right\};$$

or when a precoding matrix of the uplink signal is partial coherent transmission precoding matrix, the power control scaling factor is $$\beta = \min\left\{\frac{\rho_0}{\rho}, \frac{\rho}{2R}\right\};$$

or when a precoding matrix of the uplink signal is full-coherent transmission precoding matrix the power control scaling factor is $\beta=1$;

where R is the number of transmission layers of the uplink signal, $\rho_0$ is the number of ports of non-zero transmission corresponding to the precoding matrix of the uplink signal, and $p$ is the number of antenna ports configured by the network device for transmission of the uplink signal.

In one embodiment, processing the power of the uplink signal according to the scaling rule, includes:

scaling the transmit power, calculated according to high-level parameters, of the uplink signal with a power control scaling factor, where:

the power control scaling factor is $$\beta = \min\left\{1, \frac{p}{G}\right\};$$

where p is the number of antenna ports configured by the network device for the uplink signal transmission, and G is a coefficient related to the power capability of the terminal device; or the power control scaling factor is $$\beta = \max\left\{1, \frac{K}{R}\right\}\frac{\rho_0}{\rho},$$

where R is the number of transmission layers of the uplink signal, K is a coefficient, $\rho_0$ is the number of ports of non-zero transmission corresponding to the precoding matrix of the uplink signal, and ρ is the number of antenna ports configured by the network device for the uplink signal transmission; or the power control scaling factor is $$\beta = \frac{G}{G_0}\frac{\rho_0}{\rho},$$

where R is the number of transmission layers of the uplink signal, $G_0$ is the number of coherent antenna groups corresponding to the precoding matrix of the uplink signal, G is the maximum number of coherent antenna groups, indicated by the network device to the terminal device, corresponding to all precoding matrices in a codebook corresponding to the codebook subset restriction type of the uplink signal, $\rho_0$ is the number of ports of non-zero transmission corresponding to the precoding matrix of the uplink signal, and $p$ is the number of antenna ports configured by the network device for transmission of the uplink signal.

In one embodiment, the K is a coefficient related to the number of antenna ports of the uplink signal and the codebook subset restriction type corresponding to the uplink signal; or the K is a coefficient related to the power capability of the terminal device.

In a second aspect, an uplink power control method is provided, which includes:

determining a power control scaling rule of an uplink signal;

instructing the terminal device to send an uplink signal;

determining scheduling information of the uplink signal according to the power control scaling rule.

In one embodiment, the determining a power control scaling rule of an uplink signal, includes:

determining the power control scaling rule of the uplink signal according to a power capability of the terminal device.

In one embodiment, the method further includes:

sending a first instruction message to the terminal device, where the first instruction message indicates the power control scaling rule of the uplink signal and/or the power capability of the terminal device.

In one embodiment, the method further includes:

determining a first instruction message of the uplink signal according to the power capability of the terminal device.

In one embodiment, sending the first instruction message to the terminal device, includes:

sending a codebook subset restriction parameter to the terminal device, where the codebook subset restriction parameter carries the first instruction message.

In one embodiment, the first instruction message carries a first parameter, the first parameter indicates the type of the power control scaling rule, and different types correspond to different power control scaling rules.

In one embodiment, the first instruction message carries a second parameter, the second parameter indicates whether the terminal device uses full power to transmit an uplink signal.

In one embodiment, the scheduling information of the uplink signal includes at least one of:

precoding and layer number indication information;
SRS indication information;
Modulation and Coding Level (MCS) information.

In one embodiment, the power capability of the terminal device includes:

default power capability; or
power capability indicated by a power capability indication message sent by the terminal device to the network device.

In one embodiment, the power capability indication message includes a first signaling parameter, and the first signaling parameter includes multiple candidate values or multiple states, where the different candidate values indicate different power capabilities, and the different states indicate different power capabilities.

In one embodiment, the power capability indication message includes at least one of:

type information of the terminal device;
power class information of the terminal device;
coherence capability information of antennas of the terminal device or
codebook subset type supported by the terminal device.

In one embodiment, the power capability includes at least one of:

capability of the terminal device on transmit power of an AC;
capability of the terminal device on transmit power of an antenna port;
capability of the terminal device on transmit power of a PA;
capability of the terminal device on supporting full power transmission for one or more layers when the uplink signal is in a codebook-based uplink transmission mode;
indicated capability on whether the terminal device supports UL full power transmission;
indicated capability on whether the terminal device supports full power transmission for the uplink signal in a codebook-based uplink transmission mode;
indicated capability on whether the terminal device supports full power transmission with single-layer transmission for the uplink signal in a codebook-based uplink transmission mode;

indicated capability on whether the terminal device supports full power transmission for the uplink signal in a non-codebook based uplink transmission mode;

indicated capability on whether the terminal device supports full power transmission with single-layer transmission for the uplink signal in a non-codebook based uplink transmission mode;

indicated capability on whether the terminal device can use a codebook beyond its antenna coherence capability.

In one embodiment, the power capability includes:

capability of the terminal device on transmit power of each AC; or capability of the terminal device on transmit power of each AC for the uplink signal in the codebook-based uplink transmission mode; or capability of the terminal device on transmit power of each AC corresponding to a coherent antenna group; or capability of the terminal device on transmit power of each AC corresponding to a coherent antenna group for the uplink signal in the codebook-based uplink transmission mode; or capability of the terminal device on transmit power of each PA; or capability of the terminal device on transmit power of each PA for the uplink signal in the codebook-based uplink transmission mode; or capability of the terminal device on transmit power of each PA corresponding to a coherent antenna group; or capability of the terminal device on transmit power of each PA corresponding to a coherent antenna group for the uplink signal in the codebook-based uplink transmission mode; or capability of the terminal device on transmit power of each antenna port; or capability of the terminal device on transmit power of each antenna port for the uplink signal in the codebook-based uplink transmission mode; or capability of the terminal device on transmit power of each antenna corresponding to a coherent antenna group; or capability of the terminal device on transmit power of each antenna corresponding to a coherent antenna group for the uplink signal in the codebook-based uplink transmission mode; or capability of the terminal device on transmit power corresponding to each coherent antenna group; or capability of the terminal device on transmit power corresponding to each coherent antenna group for the uplink signal in the codebook-based uplink transmission mode.

In one embodiment, the power capability includes at least one of:

capability of the terminal device on the sum of transmit powers of any group of coherent antenna groups can reach the maximum output power corresponding to the power class of the terminal device;

capability of the terminal device on the sum of transmit powers of all ACs or all PAs or all antenna ports can reach the maximum output power corresponding to the power class of the terminal device;

capability of the terminal device on the transmit power of at least one AC can reach the maximum output power corresponding to the power class of the terminal device;

capability of the terminal device on the sum of transmit powers of at least N ACs can reach the maximum output power corresponding to the power class of the terminal device, where N is a positive integer;

capability of the terminal device on each AC can reach one $M^{th}$ of the maximum output power corresponding to the power class of the terminal device, where M is a positive integer;

capability of the terminal device on the sum of transmit powers of any Q ACs can reach the maximum output power corresponding to the power class of the terminal device, where Q is a positive integer;

capability of the terminal device on the transmit power of at least one PA can reach the maximum output power corresponding to the power class of the terminal device;

capability of the terminal device on the sum of transmit powers of at least N PAs of the terminal device can reach the maximum output power corresponding to the power class of the terminal device, where N is a positive integer;

capability of the terminal device on the transmit power of each PA can reach one $M^{th}$ of the maximum output power corresponding to the power class of the terminal device, where M is a positive integer;

capability of the terminal device on the sum of transmit powers of any Q PAs can reach the maximum output power corresponding to the power class of the terminal device, where Q is a positive integer;

capability of the terminal device on the transmit power of at least one antenna port can reach the maximum output power corresponding to the power class of the terminal device;

capability of the terminal device on the sum of transmit powers of at least N antenna ports can reach the maximum output power corresponding to the power class of the terminal device, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer;

capability of the terminal device on the transmit power of at least one AC can reach the maximum output power corresponding to the power class of the terminal device for the uplink signal in the codebook-based uplink transmission mode;

capability of the terminal device on the sum of transmit powers of at least N ACs can reach the maximum output power corresponding to the power class of the terminal device for the uplink signal in the codebook-based uplink transmission mode, where N is a positive integer;

capability of the terminal device on the transmit power of each AC can reach one $M^{th}$ of the maximum output power corresponding to the power class of the terminal device for the uplink signal in the codebook-based uplink transmission mode, where M is a positive integer;

capability of the terminal device on the sum of transmit powers of any Q ACs can reach the maximum output power corresponding to the power class of the terminal device for the uplink signal in the codebook-based uplink transmission mode, where Q is a positive integer;

capability of the terminal device on the transmit power of at least one PA can reach the maximum output power corresponding to the power class of the terminal device for the uplink signal in the codebook-based uplink transmission mode;

capability of the terminal device on the sum of transmit powers of at least N PAs can reach the maximum output power corresponding to the power class of the terminal device for the uplink signal in the codebook-based uplink transmission mode, where N is a positive integer;

capability of the terminal device on the transmit power of each PA can reach one $M^{th}$ of the maximum output power corresponding to the power class of the terminal device for the uplink signal in the codebook-based uplink transmission mode, where M is a positive integer;

capability of the terminal device on the sum of transmit powers of any Q PAs can reach the maximum output power corresponding to the power class of the terminal device for the uplink signal in the codebook-based uplink transmission mode, and Q is a positive integer;

capability of the terminal device on the transmit power of at least one antenna port can reach the maximum output power corresponding to the power class of the terminal device for the uplink signal in the codebook-based uplink transmission mode;

capability of the terminal device on the sum of transmit powers of at least N antenna ports can reach the maximum output power corresponding to the power class of the terminal device for the uplink signal in the codebook-based uplink transmission mode, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer.

In one embodiment, the N is the number of antenna ports corresponding to the uplink MIMO; the M is the maximum number of antenna ports that the terminal device can transmit coherently.

In one embodiment, determining a power control scaling rule of an uplink signal according to a power capability of a terminal device, includes:

determining the power control scaling rule according to the power capability and at least one of following parameters, where the parameters include:

the number of antenna ports configured by the network device for transmission of the uplink signal;

a precoding matrix corresponding to the uplink signal;

a codebook subset restriction type corresponding to the uplink signal;

the number of transmission layers corresponding to the uplink signal;

maximum power of uplink transmission.

In one embodiment, the parameters include a precoding matrix corresponding to the uplink signal, and determining the power control scaling rule according to the power capability and at least one parameter includes:

determining the power control scaling rule according to the power capability and the number of coherent antenna groups associated with non-zero elements in the precoding matrix corresponding to the uplink signal; or determining the power control scaling rule according to the power capability and a codeword coherent transmission type corresponding to the precoding matrix corresponding to the uplink signal; or determining the power control scaling rule according to the power capability, the number of coherent antenna groups associated with non-zero elements in the precoding matrix corresponding to the uplink signal, and the number of antenna ports configured by the network device for transmission of the uplink signal; or determining the power control scaling rule according to the power capability, a codeword coherent transmission type corresponding to the precoding matrix corresponding to the uplink signal, and the number of antenna ports configured by the network device for transmission of the uplink signal; or determining the power control scaling rule according to the power capability, a codeword coherent transmission type corresponding to the precoding matrix corresponding to the uplink signal, and the number of transmission layers corresponding to the uplink signal; or determining the power control scaling rule according to the power capability, a coherent transmission type corresponding to the precoding matrix corresponding to the uplink signal, the number of transmission layers corresponding to the uplink signal, and the number of antenna ports configured by the network device for transmission of the uplink signal.

In one embodiment, the parameters include a codebook subset restriction type corresponding to the uplink signal, and determining the power control scaling rule according to the power capability and at least one parameter includes:

determining the power control scaling rule according to the power capability, the codebook subset restriction type corresponding to the uplink signal, and the number of antenna ports configured by the network device for transmission of the uplink signal; or determining the power control scaling rule according to the power capability, the codebook subset restriction type corresponding to the uplink signal, the number of transmission layers corresponding to the uplink signal, and the number of antenna ports configured by the network device for transmission of the uplink signal; or determining the power control scaling rule according to the power capability, the codebook subset restriction type corresponding to the uplink signal, and a coherent transmission type corresponding to the precoding matrix corresponding to the uplink signal; or determining the power control scaling rule according to the power capability, the codebook subset restriction type corresponding to the uplink signal, a coherent transmission type corresponding to the precoding matrix corresponding to the uplink signal, and the number of antenna ports configured by the network device for transmission of the uplink signal; or determining the power control scaling rule according to the power capability, the codebook subset restriction type corresponding to the uplink signal, a coherent transmission type corresponding to the precoding matrix corresponding to the uplink signal, the number of transmission layers corresponding to the uplink signal, and the number of antenna ports configured by the network device for transmission of the uplink signal.

In one embodiment, the power control scaling rule is at least one of:

not scaling the transmit power, calculated according to high-level parameters, of the uplink signal;

scaling the transmit power, calculated according to high-level parameters, of the uplink signal with a power control scaling factor.

In one embodiment, determining a power control scaling rule of an uplink signal according to a power capability of a terminal device, includes:

when the power capability is that the transmit power of each antenna port or AC or PA of the terminal device reaches a maximum output power requirement corresponding to a power class of the terminal device, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the first instruction message instructs the terminal device to transmit the uplink signal at full power, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the transmit power of each antenna port or AC or PA of the terminal device reaches one half of the maximum output power requirement corresponding to a power class of the terminal device, the number of antenna ports configured by the network device for an uplink transmission mode of the uplink signal is greater than 1, and an indicated precoding matrix corresponds to a precoding matrix of single-layer non-coherent (NC) transmission, the power control scaling rule is scaling the transmit power, calculated according to high-level parameters, of the uplink signal with a power control scaling factor of ½; or when the power capability is that the transmit power of each antenna port or AC or PA of the terminal device reaches a quarter of the maximum output power requirement corresponding to a power class of the terminal device, the number of antenna ports configured by the network device for an uplink transmission mode of the uplink signal is greater than 1, and an indicated precoding matrix corresponds to a precoding matrix of three-layer NC transmission, the power control scaling rule is scaling the transmit power, calculated according to high-level parameters, of the uplink signal with a power control scaling factor of ¾; or when the power capability is that the transmit power of each antenna port or AC or PA of the terminal device reaches a quarter of the maximum output power requirement corresponding to a power class of the terminal device, or a single antenna port or AC or PA of the terminal device does not reach a specific requirement, or the terminal device does not report the capability of each antenna port or AC or PA, or a communication protocol does not formulate a performance scaling requirement for each antenna port or AC or PA of the terminal device, the power control scaling rule is scaling the transmit power, calculated according to high-level parameters, of the uplink signal with a ratio of an actual number of ports for sending signals to the total number of ports configured by the network device for a transmission mode corresponding to the uplink signal; or when the power capability is that the transmit power of each antenna port, or AC, or PA of the terminal device reaches the maximum power of uplink transmission, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of single-layer NC transmission, the power control scaling rule is scaling the transmit power, calculated according to high-level parameters, of the uplink signal with a power control scaling factor of ½; or when the power capability is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of three-layer NC transmission, the power control scaling rule is scaling the transmit power, calculated according to high-level parameters, of the uplink signal with a power control scaling factor of ¾; or when the power capability is that the transmit power of each antenna port, or AC, or PA of the terminal device reaches a quarter of the maximum power of uplink transmission, or a single antenna port of the terminal device does not reach a specific requirement, or the terminal device does not report the capability of each antenna port, or a communication protocol does not formulate a performance requirement for each antenna port, or AC, or PA of the terminal device, the power control scaling rule is scaling the transmit power, calculated according to high-level parameters, of the uplink signal with a ratio of an actual number of ports for sending signals to the total number of ports configured by the network device for a transmission mode corresponding to the uplink signal.

In one embodiment, the first instruction message instructs the terminal device to transmit the uplink signal at full power, and then the first instruction message indicates to the terminal device that the power control scaling rule is not scaling the transmit power, calculated according to high-level parameters, of the uplink signal or scaling the transmit power, calculated according to high-level parameters, of the uplink signal with a power control scaling factor of 1.

In one embodiment, determining a power control scaling rule of an uplink signal according to a power capability of a terminal device, includes:

determining the power control scaling factor according to the power capability of the terminal device, where:

when a precoding matrix of the uplink signal is non-coherent transmission precoding matrix, the power control scaling factor is $$\beta = \min\left\{\frac{\rho_0}{\rho}, \frac{\rho}{R}\right\};$$

or when a precoding matrix of the uplink signal is partial coherent transmission precoding matrix, the power control scaling factor is $$\beta = \min\left\{\frac{\rho_0}{\rho}, \frac{\rho}{2R}\right\};$$

or when a precoding matrix of the uplink signal is full-coherent transmission precoding matrix, the power control scaling factor is $\beta=1$;

where R is the number of transmission layers of the uplink signal, $\rho_0$ is the number of ports of non-zero transmission corresponding to the precoding matrix of the uplink signal, and $\rho$ is the number of antenna ports configured by the network device for transmission of the uplink signal.

In one embodiment, processing the power of the uplink signal according to the scaling rule, includes:

determining the power control scaling factor according to the power capability of the terminal device, where:

the power control scaling factor is $$\beta = \min\left\{1, \frac{\rho}{G}\right\};$$

where ρ is the number of antenna ports configured by the network device for the uplink signal transmission, and G is a coefficient related to the power capability of the terminal device; or the power control scaling factor is $$\beta = \max\left\{1, \frac{K}{R}\right\}\frac{\rho_0}{\rho},$$

where R is the number of transmission layers of the uplink signal, K is a coefficient, $\rho_0$ is the number of ports of non-zero transmission corresponding to the precoding matrix of the uplink signal, and $\rho$ is the number of antenna ports configured by the network device for transmission of the uplink signal; or the power control scaling factor is $$\beta = \frac{G}{G_0}\frac{\rho_0}{\rho},$$

and R is the number of transmission layers of the uplink signal, $G_0$ is the number of coherent antenna groups corresponding to the precoding matrix of the uplink signal, G is the maximum number of coherent antenna groups, indicated by the network device to the terminal device, corresponding to all precoding matrices in a codebook corresponding to the codebook subset restriction type of the uplink signal, $\rho_0$ is the number of ports of non-zero transmission corresponding to the precoding matrix of the uplink signal, and $\rho$ is the number of antenna ports configured by the network device for transmission of the uplink signal.

In one embodiment, the K is a coefficient related to the number of antenna ports of the uplink signal and the codebook subset restriction type corresponding to the uplink signal; or the K is a coefficient related to the power capability of the terminal device.

In a third aspect, a terminal device is provided, which includes:

a memory configured to store instructions;

a processor configured to read the instructions in the memory to perform the process of:

determining a power control scaling rule of an uplink signal according to a power capability of a terminal device, and/or determining a power control scaling rule according to a first instruction message from a network device;

processing transmit power of the uplink signal according to the scaling rule, and determining the transmit power on each antenna port of the uplink signal according to the processed transmit power;

a transceiver configured to receive and send data under the control of the processor.

In one embodiment, the power capability of the terminal device includes:

default power capability; or power capability indicated by a power capability indication message sent by the terminal device to the network device.

In one embodiment, the power capability indication message includes a first signaling parameter, and the first signaling parameter includes multiple candidate values or multiple states, where the different candidate values indicate different power capabilities, and the different states indicate different power capabilities.

In one embodiment, the power capability indication message includes at least one of:

type information of the terminal device;

power class information of the terminal device;

coherent capability information of antennas of the terminal device;

codebook subset type supported by the terminal device.

In one embodiment, the power capability includes at least one of:

capability of the terminal device on transmit power of an AC;

capability of the terminal device on transmit power of an antenna port;

capability of the terminal device on transmit power of a PA;

capability of the terminal device on supporting full power transmission for one or more layers when the uplink signal is in a codebook-based uplink transmission mode;

indicated capability on whether the terminal device supports UL full power transmission;

indicated capability on whether the terminal device supports full power transmission for the uplink signal in a codebook-based uplink transmission mode;

indicated capability on whether the terminal device supports full power transmission with single-layer transmission for the uplink signal in a codebook-based uplink transmission mode;

indicated capability on whether the terminal device supports full power transmission for the uplink signal in a non-codebook based uplink transmission mode;

indicated capability on whether the terminal device supports full power transmission with single-layer transmission for the uplink signal in a non-codebook based uplink transmission mode;

indicated capability on whether the terminal device can use a codebook beyond its antenna coherence capability.

In one embodiment, the power capability includes:

capability of the terminal device on transmit power of each AC; or capability of the terminal device on transmit power of each AC for the uplink signal in the codebook-based uplink transmission mode; or capability of the terminal device on transmit power of each AC corresponding to a coherent antenna group; or capability of the terminal device on transmit power of each AC corresponding to a coherent antenna group for the uplink signal in the codebook-based uplink transmission mode; or capability of the terminal device on transmit power of each PA; or capability of the terminal device on transmit power of each PA for the uplink signal in the codebook-based uplink transmission mode; or capability of the terminal device on transmit power of each PA corresponding to a coherent antenna group; or capability of the terminal device on transmit power of each PA corresponding to a coherent antenna group for the uplink signal in the codebook-based uplink transmission mode; or capability of the terminal device on transmit power of each antenna port; or capability of the terminal device on transmit power of each antenna port for the uplink signal in the codebook-based uplink transmission mode; or capability of the terminal device on transmit power of each antenna corresponding to a coherent antenna group; or capability of the terminal device on transmit power of each antenna corresponding to a coherent antenna group for the uplink signal in the codebook-based uplink transmission mode; or capability of the terminal device on transmit power corresponding to each coherent antenna group; or capability of the terminal device on transmit power corresponding to each coherent antenna group for the uplink signal in the codebook-based uplink transmission mode.

In one embodiment, the power capability includes at least one of:

capability of the terminal device on the sum of transmit powers of any group of coherent antenna groups can reach the maximum output power corresponding to the power class of the terminal device;

capability of the terminal device on the sum of transmit powers of all ACs or all PAs or all antenna ports can reach the maximum output power corresponding to the power class of the terminal device;

capability of the terminal device on the transmit power of at least one AC can reach the maximum output power corresponding to the power class of the terminal device;

capability of the terminal device on the sum of transmit powers of at least N ACs can reach the maximum output power corresponding to the power class of the terminal device, where N is a positive integer;

capability of the terminal device on each AC can reach one $M^{th}$ of the maximum output power corresponding to the power class of the terminal device, where M is a positive integer;

capability of the terminal device on the sum of transmit powers of any Q ACs can reach the maximum output power corresponding to the power class of the terminal device, where Q is a positive integer;

capability of the terminal device on the transmit power of at least one PA can reach the maximum output power corresponding to the power class of the terminal device;

capability of the terminal device on the sum of transmit powers of at least N PAs of the terminal device can reach the maximum output power corresponding to the power class of the terminal device, where N is a positive integer;

capability of the terminal device on the transmit power of each PA can reach one $M^{th}$ of the maximum output power corresponding to the power class of the terminal device, where M is a positive integer;

capability of the terminal device on the sum of transmit powers of any Q PAs can reach the maximum output power corresponding to the power class of the terminal device, where Q is a positive integer;

capability of the terminal device on the transmit power of at least one antenna port can reach the maximum output power corresponding to the power class of the terminal device;

capability of the terminal device on the sum of transmit powers of at least N antenna ports can reach the maximum output power corresponding to the power class of the terminal device, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer;

capability of the terminal device on the transmit power of at least one AC can reach the maximum output power corresponding to the power class of the terminal device for the uplink signal in the codebook-based uplink transmission mode;

capability of the terminal device on the sum of transmit powers of at least N ACs can reach the maximum output power corresponding to the power class of the terminal device for the uplink signal in the codebook-based uplink transmission mode, where N is a positive integer;

capability of the terminal device on the transmit power of each AC can reach one Mtn of the maximum output power corresponding to the power class of the terminal device for the uplink signal in the codebook-based uplink transmission mode, where M is a positive integer;

capability of the terminal device on the sum of transmit powers of any Q ACs can reach the maximum output power corresponding to the power class of the terminal device for the uplink signal in the codebook-based uplink transmission mode, where Q is a positive integer;

capability of the terminal device on the transmit power of at least one PA can reach the maximum output power corresponding to the power class of the terminal device for the uplink signal in the codebook-based uplink transmission mode;

capability of the terminal device on the sum of transmit powers of at least N PAs can reach the maximum output power corresponding to the power class of the terminal device for the uplink signal in the codebook-based uplink transmission mode, where N is a positive integer;

capability of the terminal device on the transmit power of each PA can reach one Mtn of the maximum output power corresponding to the power class of the terminal device for the uplink signal in the codebook-based uplink transmission mode, where M is a positive integer;

capability of the terminal device on the sum of transmit powers of any Q PAs can reach the maximum output power corresponding to the power class of the terminal device for the uplink signal in the codebook-based uplink transmission mode, and Q is a positive integer;

capability of the terminal device on the transmit power of at least one antenna port can reach the maximum output power corresponding to the power class of the terminal device for the uplink signal in the codebook-based uplink transmission mode;

capability of the terminal device on the sum of transmit powers of at least N antenna ports can reach the maximum output power corresponding to the power class of the terminal device for the uplink signal in the codebook-based uplink transmission mode, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer.

In one embodiment, the N is the number of antenna ports corresponding to the uplink MIMO; the M is the maximum number of antenna ports that the terminal device can transmit coherently.

In one embodiment, the power capability indication message does not contain the power class of the terminal device, and determining the power control scaling rule of the uplink signal according to the power capability includes:

determining the power control scaling rule of the uplink signal according to the power capability and the power class of the terminal device;

where the power class of the terminal device is indicated by the network device, or reported by the terminal device.

In one embodiment, determining the power control scaling rule of the uplink signal according to the power capability, includes:

determining the power control scaling rule according to the power capability and at least one of following parameters, where the parameters include:

the number of antenna ports configured by the network device for the uplink signal transmission;

a precoding matrix corresponding to the uplink signal;

a codebook subset restriction type corresponding to the uplink signal;

the number of transmission layers corresponding to the uplink signal;

maximum power of uplink transmission.

In one embodiment, the parameters include a precoding matrix corresponding to the uplink signal, and determining the power control scaling rule according to the power capability and the at least one parameter includes:

determining the power control scaling rule according to the power capability and the number of coherent antenna groups associated with non-zero elements in the precoding matrix corresponding to the uplink signal; or determining the power control scaling rule according to the power capability and a codeword coherent transmission type corresponding to the precoding matrix corresponding to the uplink signal; or determining the power control scaling rule according to the power capability, the number of coherent antenna groups associated with non-zero elements in the precoding matrix corresponding to the uplink signal, and the number of antenna ports configured by the network device for transmission of the uplink signal; or determining the power control scaling rule according to the power capability, a codeword coherent transmission type corresponding to the precoding matrix corresponding to the uplink signal, and the number of antenna ports configured by the network device for the transmission of the uplink signal; or determining the power control scaling rule according to the power capability, a codeword coherent transmission type corresponding to the precoding matrix corresponding to the uplink signal, and the number of transmission layers corresponding to the uplink signal; or determining the power control scaling rule according to the power capability, a coherent transmission type corresponding to the precoding matrix corresponding to the uplink signal, the number of transmission layers corresponding to the uplink signal, and the number of antenna ports configured by the network device for transmission of the uplink signal.

In one embodiment, the parameters include a codebook subset restriction type corresponding to the uplink signal, and the processor is specifically configured to:

determine the power control scaling rule according to the power capability, the codebook subset restriction type corresponding to the uplink signal, and the number of antenna ports configured by the network device for transmission of the uplink signal; or determine the power control scaling rule according to the power capability, the codebook subset restriction type corresponding to the uplink signal, the number of transmission layers corresponding to the uplink signal, and the number of antenna ports configured by the network device for transmission of the uplink signal; or determine the power control scaling rule according to the power capability, the codebook subset restriction type corresponding to the uplink signal, and a coherent transmission type corresponding to the precoding matrix corresponding to the uplink signal; or determine the power control scaling rule according to the power capability, the codebook subset restriction type corresponding to the uplink signal, a coherent transmission type corresponding to the precoding matrix corresponding to the uplink signal, and the number of antenna ports configured by the network device for transmission of the uplink signal; or determine the power control scaling rule according to the power capability, the codebook subset restriction type corresponding to the uplink signal, a coherent transmission type corresponding to the precoding matrix corresponding to the uplink signal, the number of transmission layers corresponding to the uplink signal, and the number of antenna ports configured by the network device for transmission of the uplink signal.

In one embodiment, the processor is specifically configured to:

determine the power control scaling rule as a first power control scaling rule when the power capability and the at least one parameter satisfy a first preset condition.

In one embodiment, the processor is specifically configured to:

determine the power control scaling rule as a second power control scaling rule when the power capability satisfies a second preset condition.

In one embodiment, the processor is specifically configured to:

receive a codebook subset restriction parameter from the network device, where the codebook subset restriction parameter carries the first instruction message.

In one embodiment, the first instruction message carries a first parameter, the first parameter indicates the type of the power control scaling rule, and different types correspond to different power control scaling rules.

In one embodiment, the first instruction message carries a second parameter, the second parameter indicates whether the terminal device uses full power to transmit an uplink signal.

In one embodiment, determining the power control scaling rule according to the first instruction message, includes:

determining the power control scaling rule as a third power control scaling rule when the first instruction message satisfies a third preset condition.

In one embodiment, the power control scaling rule is at least one of:

not scaling the transmit power, calculated according to high-level parameters, of the uplink signal;

scaling the transmit power, calculated according to high-level parameters, of the uplink signal with a power control scaling factor.

In one embodiment, the processor is specifically configured to:

the second preset condition is that the transmit power of each antenna port or AC or PA of the terminal device reaches a maximum output power requirement corresponding to a power class of the terminal device, and the power control scaling rule is not scaling the transmit power, calculated according to high-level parameters, of the uplink signal or scaling the transmit power, calculated according to high-level parameters, of the uplink signal with a power control scaling factor of 1; or the third preset condition is that the first instruction message instructs the terminal device to transmit the uplink signal at full power, and the power control scaling rule is not scaling the transmit power, calculated according to high-level parameters, of the uplink signal or scaling the transmit power, calculated according to high-level parameters, of the uplink signal with a power control scaling factor of 1; or the first preset condition is that the transmit power of each antenna port or AC or PA of the terminal device reaches one half of the maximum output power requirement corresponding to a power class of the terminal device, the number of antenna ports configured by the network device for an uplink transmission mode of the uplink signal is greater than 1, and an indicated precoding matrix corresponds to a precoding matrix of single-layer NC transmission, and the power control scaling rule is scaling the transmit power, calculated according to high-level parameters, of the uplink signal with a power control scaling factor of ½; or the first preset condition is that the transmit power of each antenna port or AC or PA of the terminal device reaches a quarter of the maximum output power requirement corresponding to a power class of the terminal device, the number of antenna ports configured by the network device for an uplink transmission mode of the uplink signal is greater than 1, and an indicated precoding matrix corresponds to a precoding matrix of three-layer NC transmission, and the power control scaling rule is scaling the transmit power, calculated according to high-level parameters, of the uplink signal with a power control scaling factor of ¾; or the second preset condition is that the transmit power of each antenna port or AC or PA of the terminal device reaches a quarter of the maximum output power requirement corresponding to a power class of the terminal device, or a single antenna port or AC or PA of the terminal device does not reach a specific requirement, or the terminal device does not report the capability of each antenna port or AC or PA, or a communication protocol does not formulate a performance requirement for each antenna port or AC or PA of the terminal device, and the power control scaling rule is scaling the transmit power, calculated according to high-level parameters, of the uplink signal with a ratio of an actual number of ports for sending signals to the total number of ports configured by the network device for a transmission mode corresponding to the uplink signal; or the second preset condition is that the transmit power of each antenna port, or AC, or PA of the terminal device reaches the maximum power of uplink transmission, and the power control scaling rule is not scaling the transmit power, calculated according to high-level parameters, of the uplink signal or scaling the transmit power, calculated according to high-level parameters, of the uplink signal with a power control scaling factor of 1; or the first preset condition is that the power capability of the terminal device is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of single-layer NC transmission, and the power control scaling rule is scaling the transmit power, calculated according to high-level parameters, of the uplink signal with a power control scaling factor of ½; or the first preset condition is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of three-layer NC transmission, and the power control scaling rule is scaling the transmit power, calculated according to high-level parameters, of the uplink signal with a power control scaling factor of ¾; or the second preset condition is that the transmit power of each antenna port, or AC, or PA of the terminal device reaches a quarter of the maximum power of uplink transmission, or a single antenna port of the terminal device does not reach a specific requirement, or the terminal device does not report the capability of each antenna port, or a communication protocol does not formulate a performance requirement for each antenna port, or AC, or PA of the terminal device, and the power control scaling rule is scaling the transmit power, calculated according to high-level parameters, of the uplink signal with a ratio of an actual number of ports for sending signals to the total number of ports configured by the network device for a transmission mode corresponding to the uplink signal.

In one embodiment, the processor is specifically configured to:

scale the transmit power, calculated according to high-level parameters, of the uplink signal with a power control scaling factor, where:

when a precoding matrix of the uplink signal is non-coherent transmission precoding matrix, the power control scaling factor is $$\beta = \min\left\{\frac{\rho_0}{\rho}, \frac{\rho}{R}\right\};$$

or when a precoding matrix of the uplink signal is partial coherent transmission precoding matrix, the power control scaling factor is $$\beta = \min\left\{\frac{\rho_0}{\rho}, \frac{\rho}{2R}\right\};$$

or, when a precoding matrix of the uplink signal is full-coherent transmission precoding matrix the power control scaling factor is $\beta=1$;

and R is the number of transmission layers of the uplink signal, $\rho_0$ is the number of ports of non-zero transmission corresponding to the precoding matrix of the uplink signal, and $\rho$ is the number of antenna ports configured by the network device for the uplink signal transmission.

In one embodiment, the processor is specifically configured to:

scale the transmit power, calculated according to high-level parameters, of the uplink signal with a power control scaling factor, where:

the power control scaling factor is $$\beta = \min\left\{1, \frac{\rho}{G}\right\};$$

where ρ is the number of antenna ports configured by the network device for the uplink signal MIMO transmission, and G is a coefficient related to the power capability of the terminal device; or the power control scaling factor is $$\beta = \max\left\{1, \frac{K}{R}\right\}\frac{\rho_0}{\rho},$$

where R is the number of transmission layers of the uplink signal, K is a coefficient, $\rho_0$ is the number of ports of non-zero transmission corresponding to the precoding matrix of the uplink signal, and ρ is the number of antenna ports configured by the network device for the uplink signal transmission; or the power control scaling factor is $$\beta = \frac{G}{G_0}\frac{\rho_0}{\rho},$$

where R is the number of transmission layers of the uplink signal, $G_0$ is the number of coherent antenna groups corresponding to the precoding matrix of the uplink signal, G is the maximum number of coherent antenna groups, indicated by the network device to the terminal device, corresponding to all precoding matrices in a codebook corresponding to the codebook subset restriction type of the uplink signal, $\rho_0$ is the number of ports of non-zero transmission corresponding to the precoding matrix of the uplink signal, and $\rho$ is the number of antenna ports configured by the network device for transmission of the uplink signal.

In one embodiment, the K is a coefficient related to the number of antenna ports of the uplink signal and the codebook subset restriction type corresponding to the uplink signal; or the K is a coefficient related to the power capability of the terminal device.

In a fourth aspect, a network device is provided, which includes:

a memory configured to store instructions;

a processor configured to read the instructions in the memory to perform the process of:

determining a power control scaling rule of an uplink signal;

instructing a terminal device to send an uplink signal;

determining the scheduling information of the uplink signal according to the power control scaling rule;

a transceiver configured to receive and send data under the control of the processor.

In one embodiment, the processor is specifically configured to:

determine the power control scaling rule of the uplink signal according to a power capability of the terminal device.

In one embodiment, the processor is further configured to:

send a first instruction message to the terminal device, where the first instruction message indicates the power control scaling rule of the uplink signal and/or the power capability of the terminal device.

In one embodiment, the processor is further configured to:

determine a first instruction message of the uplink signal according to the power capability of the terminal device.

In one embodiment, the transceiver is specifically configured to:

send a codebook subset restriction parameter to the terminal device, and the codebook subset restriction parameter carries the first instruction message.

In one embodiment, the first instruction message carries a first parameter, where the first parameter indicates the type of the power control scaling rule, and different types correspond to different power control scaling rules.

In one embodiment, the first instruction message carries a second parameter, where the second parameter indicates whether the terminal device uses full power to transmit an uplink signal.

In one embodiment, the scheduling information of the uplink signal includes at least one of:

precoding and layer number indication information;

SRS indication information;

Modulation and Coding Level (MCS) information.

In one embodiment, the power capability of the terminal device includes:

default power capability; or power capability indicated by a power capability indication message sent by the terminal device to the network device.

In one embodiment, the power capability indication message includes a first signaling parameter, and the first signaling parameter includes multiple candidate values or multiple states, where the different candidate values indicate different power capabilities, and the different states indicate different power capabilities.

In one embodiment, the power capability indication message includes at least one of:

type information of the terminal device;

power class information of the terminal device;

coherence capability information of antennas of the terminal device or codebook subset type supported by the terminal device.

In one embodiment, the power capability includes at least one of:

capability of the terminal device on transmit power of an AC;

capability of the terminal device on transmit power of an antenna port;

capability of the terminal device on transmit power of a PA;

capability of the terminal device on supporting full power transmission for one or more layers when the uplink signal is in a codebook-based uplink transmission mode;

indicated capability on whether the terminal device supports UL full power transmission;

indicated capability on whether the terminal device supports full power transmission for the uplink signal in a codebook-based uplink transmission mode;

indicated capability on whether the terminal device supports full power transmission with single-layer transmission for the uplink signal in a codebook-based uplink transmission mode;

indicated capability on whether the terminal device supports full power transmission for the uplink signal in a non-codebook based uplink transmission mode;

indicated capability on whether the terminal device supports full power transmission with single-layer transmission for the uplink signal in a non-codebook based uplink transmission mode;

indicated capability on whether the terminal device can use a codebook beyond its antenna coherence capability.

In one embodiment, the power capability includes:

capability of the terminal device on transmit power of each AC; or capability of the terminal device on transmit power of each AC for the uplink signal in the codebook-based uplink transmission mode; or capability of the terminal device on transmit power of each AC corresponding to a coherent antenna group; or capability of the terminal device on transmit power of each AC corresponding to a coherent antenna group for the uplink signal in the codebook-based uplink transmission mode; or capability of the terminal device on transmit power of each PA; or capability of the terminal device on transmit power of each PA for the uplink signal in the codebook-based uplink transmission mode; or capability of the terminal device on transmit power of each PA corresponding to a coherent antenna group; or capability of the terminal device on transmit power of each PA corresponding to a coherent antenna group for the uplink signal in the codebook-based uplink transmission mode; or capability of the terminal device on transmit power of each antenna port; or capability of the terminal device on transmit power of each antenna port for the uplink signal in the codebook-based uplink transmission mode; or capability of the terminal device on transmit power of each antenna corresponding to a coherent antenna group; or capability of the terminal device on transmit power of each antenna corresponding to a coherent antenna group for the uplink signal in the codebook-based uplink transmission mode; or capability of the terminal device on transmit power corresponding to each coherent antenna group; or capability of the terminal device on transmit power corresponding to each coherent antenna group for the uplink signal in the codebook-based uplink transmission mode.

In one embodiment, the power capability includes at least one of:

capability of the terminal device on the sum of transmit powers of any group of coherent antenna groups can reach the maximum output power corresponding to the power class of the terminal device;

capability of the terminal device on the sum of transmit powers of all ACs or all PAs or all antenna ports can reach the maximum output power corresponding to the power class of the terminal device;

capability of the terminal device on the transmit power of at least one AC can reach the maximum output power corresponding to the power class of the terminal device;

capability of the terminal device on the sum of transmit powers of at least N ACs can reach the maximum output power corresponding to the power class of the terminal device, where N is a positive integer;

capability of the terminal device on each AC can reach one $M^{th}$ of the maximum output power corresponding to the power class of the terminal device, where M is a positive integer;

capability of the terminal device on the sum of transmit powers of any Q ACs can reach the maximum output power corresponding to the power class of the terminal device, where Q is a positive integer;

capability of the terminal device on the transmit power of at least one PA can reach the maximum output power corresponding to the power class of the terminal device;

capability of the terminal device on the sum of transmit powers of at least N PAs of the terminal device can reach the maximum output power corresponding to the power class of the terminal device, where N is a positive integer;

capability of the terminal device on the transmit power of each PA can reach one $M^{th}$ of the maximum output power corresponding to the power class of the terminal device, where M is a positive integer;

capability of the terminal device on the sum of transmit powers of any Q PAs can reach the maximum output power corresponding to the power class of the terminal device, where Q is a positive integer;

capability of the terminal device on the transmit power of at least one antenna port can reach the maximum output power corresponding to the power class of the terminal device;

capability of the terminal device on the sum of transmit powers of at least N antenna ports can reach the maximum output power corresponding to the power class of the terminal device, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer;

capability of the terminal device on the transmit power of at least one AC can reach the maximum output power corresponding to the power class of the terminal device for the uplink signal in the codebook-based uplink transmission mode;

capability of the terminal device on the sum of transmit powers of at least N ACs can reach the maximum output power corresponding to the power class of the terminal device for the uplink signal in the codebook-based uplink transmission mode, where N is a positive integer;

capability of the terminal device on the transmit power of each AC can reach one $M^{th}$ of the maximum output power corresponding to the power class of the terminal device for the uplink signal in the codebook-based uplink transmission mode, where M is a positive integer;

capability of the terminal device on the sum of transmit powers of any Q ACs can reach the maximum output power corresponding to the power class of the terminal device for the uplink signal in the codebook-based uplink transmission mode, where Q is a positive integer;

capability of the terminal device on the transmit power of at least one PA can reach the maximum output power corresponding to the power class of the terminal device for the uplink signal in the codebook-based uplink transmission mode;

capability of the terminal device on the sum of transmit powers of at least N PAs can reach the maximum output power corresponding to the power class of the terminal device for the uplink signal in the codebook-based uplink transmission mode, where N is a positive integer;

capability of the terminal device on the transmit power of each PA can reach one $M^{th}$ of the maximum output power corresponding to the power class of the terminal device for the uplink signal in the codebook-based uplink transmission mode, where M is a positive integer;

capability of the terminal device on the sum of transmit powers of any Q PAs can reach the maximum output power corresponding to the power class of the terminal device for the uplink signal in the codebook-based uplink transmission mode, and Q is a positive integer;

capability of the terminal device on the transmit power of at least one antenna port can reach the maximum output power corresponding to the power class of the terminal device for the uplink signal in the codebook-based uplink transmission mode;

capability of the terminal device on the sum of transmit powers of at least N antenna ports can reach the maximum output power corresponding to the power class of the terminal device for the uplink signal in the codebook-based uplink transmission mode, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer.

In one embodiment, the N is the number of antenna ports corresponding to the uplink MIMO; the M is the maximum number of antenna ports that the terminal device can transmit coherently.

In one embodiment, the processor is specifically configured to:

determine the power control scaling rule according to the power capability and at least one of following parameters, where the parameters include:

the number of antenna ports configured by the network device for transmission of the uplink signal;

a precoding matrix corresponding to the uplink signal;

a codebook subset restriction type corresponding to the uplink signal;

the number of transmission layers corresponding to the uplink signal;

maximum power of uplink transmission.

In one embodiment, the parameters include a precoding matrix corresponding to the uplink signal, and the processor is specifically configured to:

determine the power control scaling rule according to the power capability and the number of coherent antenna groups associated with non-zero elements in the precoding matrix corresponding to the uplink signal; or determine the power control scaling rule according to the power capability and a codeword coherent transmission type corresponding to the precoding matrix corresponding to the uplink signal; or determine the power control scaling rule according to the power capability, the number of coherent antenna groups associated with non-zero elements in the precoding matrix corresponding to the uplink signal, and the number of antenna ports configured by the network device for transmission of the uplink signal; or determine the power control scaling rule according to the power capability, a codeword coherent transmission type corresponding to the precoding matrix corresponding to the uplink signal, and the number of antenna ports configured by the network device for transmission of the uplink signal; or determine the power control scaling rule according to the power capability, a codeword coherent transmission type corresponding to the precoding matrix corresponding to the uplink signal, and the number of transmission layers corresponding to the uplink signal; or determine the power control scaling rule according to the power capability, a coherent transmission type corresponding to the precoding matrix corresponding to the uplink signal, the number of transmission layers corresponding to the uplink signal, and the number of antenna ports configured by the network device for transmission of the uplink signal.

In one embodiment, the parameters include a codebook subset restriction type corresponding to the uplink signal, and determining the power control scaling rule according to the power capability and at least one parameter includes:

determining the power control scaling rule according to the power capability, the codebook subset restriction type corresponding to the uplink signal, and the number of antenna ports configured by the network device for transmission of the uplink signal; or determining the power control scaling rule according to the power capability, the codebook subset restriction type corresponding to the uplink signal, the number of transmission layers corresponding to the uplink signal, and the number of antenna ports configured by the network device for transmission of the uplink signal; or determining the power control scaling rule according to the power capability, the codebook subset restriction type corresponding to the uplink signal, and a coherent transmission type corresponding to the precoding matrix corresponding to the uplink signal; or determining the power control scaling rule according to the power capability, the codebook subset restriction type corresponding to the uplink signal, a coherent transmission type corresponding to the precoding matrix corresponding to the uplink signal, and the number of antenna ports configured by the network device for transmission of the uplink signal; or determining the power control scaling rule according to the power capability, the codebook subset restriction type corresponding to the uplink signal, a coherent transmission type corresponding to the precoding matrix corresponding to the uplink signal, the number of transmission layers corresponding to the uplink signal, and the number of antenna ports configured by the network device for transmission of the uplink signal.

In one embodiment, the power control scaling rule is at least one of:

not scaling the transmit power, calculated according to high-level parameters, of the uplink signal;

scaling the transmit power, calculated according to high-level parameters, of the uplink signal with a power control scaling factor.

In one embodiment, the processor is specifically configured to:

when the power capability is that the transmit power of each antenna port or AC or PA of the terminal device reaches a maximum output power requirement corresponding to a power class of the terminal device, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the first instruction message instructs the terminal device to transmit the uplink signal at full power, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the transmit power of each antenna port or AC or PA of the terminal device reaches one half of the maximum output power requirement corresponding to a power class of the terminal device, the number of antenna ports configured by the network device for an uplink transmission mode of the uplink signal is greater than 1, and an indicated precoding matrix corresponds to a precoding matrix of single-layer NC transmission, the power control scaling rule is scaling the transmit power, calculated according to high-level parameters, of the uplink signal with a power control scaling factor of ½; or when the power capability is that the transmit power of each antenna port or AC or PA of the terminal device reaches a quarter of the maximum output power requirement corresponding to a power class of the terminal device, the number of antenna ports configured by the network device for an uplink transmission mode of the uplink signal is greater than 1, and an indicated precoding matrix corresponds to a precoding matrix of three-layer NCtransmission, the power control scaling rule is scaling the transmit power, calculated according to high-level parameters, of the uplink signal with a power control scaling factor of ¾; or when the power capability is that the transmit power of each antenna port or AC or PA of the terminal device reaches a quarter of the maximum output power requirement corresponding to a power class of the terminal device, or a single antenna port or AC or PA of the terminal device does not reach a specific requirement, or the terminal device does not report the capability of each antenna port or AC or PA, or a communication protocol does not formulate a performance requirement for each antenna port or AC or PA of the terminal device, the power control scaling rule is scaling the transmit power, calculated according to high-level parameters, of the uplink signal with a ratio of an actual number of ports for sending signals to the total number of ports configured by the network device for a transmission mode corresponding to the uplink signal; or when the power capability is that the transmit power of each antenna port, or AC, or PA of the terminal device reaches the maximum power of uplink transmission, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of single-layer NC transmission, the power control scaling rule is scaling the transmit power, calculated according to high-level parameters, of the uplink signal with a power control scaling factor of ½; or when the power capability is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of three-layer NC transmission, the power control scaling rule is scaling the transmit power, calculated according to high-level parameters, of the uplink signal with a power control scaling factor of ¾; or when the power capability is that the transmit power of each antenna port, or AC, or PA of the terminal device reaches a quarter of the maximum power of uplink transmission, or a single antenna port of the terminal device does not reach a specific requirement, or the terminal device does not report the capability of each antenna port, or a communication protocol does not formulate a performance requirement for each antenna port, or AC, or PA of the terminal device, the power control scaling rule is scaling the transmit power, calculated according to high-level parameters, of the uplink signal with a ratio of an actual number of ports for sending signals to the total number of ports configured by the network device for a transmission mode corresponding to the uplink signal.

In one embodiment, the processor is specifically configured to:

determine the power control scaling factor according to the power capability of the terminal device, where:

when a precoding matrix of the uplink signal is non-coherent transmission precoding matrix, the power control scaling factor is $$\beta = \min\left\{\frac{\rho_0}{\rho}, \frac{\rho}{R}\right\};$$

or when a precoding matrix of the uplink signal is partial coherent transmission precoding matrix, the power control scaling factor is $$\beta = \min\left\{\frac{\rho_0}{\rho}, \frac{\rho}{R}\right\};$$

or when a precoding matrix of the uplink signal is full-coherent transmission precoding matrix, the power control scaling factor is $\beta=1$;

where R is the number of transmission layers of the uplink signal, $\rho_0$ is the number of ports of non-zero transmission corresponding to the precoding matrix of the uplink signal, and $\rho$ is the number of antenna ports configured by the network device for the uplink signal transmission.

In one embodiment, the processor is specifically configured to:

determine the power control scaling factor according to the power capability of the terminal device, where:
the power control scaling factor is $$\beta = \min\left\{1, \frac{\rho}{G}\right\};$$

where $\rho$ is the number of antenna ports configured by the network device for the uplink signal MIMO transmission, and G is a coefficient related to the power capability of the terminal device; or
the power control scaling factor is $$\beta = \max\left\{1, \frac{K}{R}\right\}\frac{\rho_0}{\rho},$$

and R is the number of transmission layers of the uplink signal, K is a coefficient, $\rho_0$ is the number of ports of non-zero transmission corresponding to the precoding matrix of the uplink signal, and $\rho$ is the number of antenna ports configured by the network device for transmission of the uplink signal; or
the power control scaling factor is $$\beta = \frac{G}{G_0}\frac{\rho_0}{\rho},$$

where R is the number of transmission layers of the uplink signal, $G_0$ is the number of coherent antenna groups corresponding to the precoding matrix of the uplink signal, G is the maximum number of coherent antenna groups, indicated by the network device to the terminal device, corresponding to all precoding matrices in a codebook corresponding to the codebook subset restriction type of the uplink signal, $\rho_0$ is the number of ports of non-zero transmission corresponding to the precoding matrix of the uplink signal, and $\rho$ is the number of antenna ports configured by the network device for the uplink signal transmission.

In one embodiment, the K is a coefficient related to the number of antenna ports of the uplink signal and the codebook subset restriction type corresponding to the uplink signal; or
the K is a coefficient related to the power capability of the terminal device.

In a fifth aspect, a terminal device is provided, which includes:
a determining device configured to determine a power control scaling rule of an uplink signal according to a power capability of a terminal device, and/or determine the power control scaling rule according to a first instruction message from a network device;
a processing device configured to process transmit power of the uplink signal according to the scaling rule, and determine transmit power on each antenna port of the uplink signal according to the processed transmit power.

In one embodiment, the power capability of the terminal device includes:
default power capability; or power capability indicated by a power capability indication message sent by the terminal device to the network device.

In one embodiment, the power capability indication message includes a first signaling parameter, and the first signaling parameter includes multiple candidate values or multiple states, where the different candidate values indicate different power capabilities, and the different states indicate different power capabilities.

In one embodiment, the power capability indication message includes at least one of:
type information of the terminal device;
power class information of the terminal device;
coherent capability information of antennas of the terminal device;
codebook subset type supported by the terminal device.

In one embodiment, the power capability includes at least one of:
capability of the terminal device on transmit power of an AC;
capability of the terminal device on transmit power of an antenna port;
capability of the terminal device on transmit power of a PA;
capability of the terminal device on supporting full power transmission for one or more layers when the uplink signal is in a codebook-based uplink transmission mode;
indicated capability on whether the terminal device supports UL full power transmission;
indicated capability on whether the terminal device supports full power transmission for the uplink signal in a codebook-based uplink transmission mode;
indicated capability on whether the terminal device supports full power transmission with single-layer transmission for the uplink signal in a codebook-based uplink transmission mode;
indicated capability on whether the terminal device supports full power transmission for the uplink signal in a non-codebook based uplink transmission mode;
indicated capability on whether the terminal device supports full power transmission with single-layer transmission for the uplink signal in a non-codebook based uplink transmission mode;
indicated capability on whether the terminal device can use a codebook beyond its antenna coherence capability.

In one embodiment, the power capability includes:
capability of the terminal device on transmit power of each AC; or
capability of the terminal device on transmit power of each AC for the uplink signal in the codebook-based uplink transmission mode; or
capability of the terminal device on transmit power of each AC corresponding to a coherent antenna group; or
capability of the terminal device on transmit power of each AC corresponding to a coherent antenna group for the uplink signal in the codebook-based uplink transmission mode; or
capability of the terminal device on transmit power of each PA; or
capability of the terminal device on transmit power of each PA for the uplink signal in the codebook-based uplink transmission mode; or
capability of the terminal device on transmit power of each PA corresponding to a coherent antenna group; or
capability of the terminal device on transmit power of each PA corresponding to a coherent antenna group for the uplink signal in the codebook-based uplink transmission mode; or
capability of the terminal device on transmit power of each antenna port; or capability of the terminal device on transmit power of each antenna port for the uplink signal in the codebook-based uplink transmission mode; or capability of the terminal device on transmit power of each antenna corresponding to a coherent antenna group; or capability of the terminal device on transmit power of each antenna corresponding to a coherent antenna group for the uplink signal in the codebook-based uplink transmission mode; or capability of the terminal device on transmit power corresponding to each coherent antenna group; or capability of the terminal device on transmit power corresponding to each coherent antenna group for the uplink signal in the codebook-based uplink transmission mode.

In one embodiment, the power capability includes at least one of:

capability of the terminal device on the sum of transmit powers of any group of coherent antenna groups can reach the maximum output power corresponding to the power class of the terminal device;

capability of the terminal device on the sum of transmit powers of all ACs or all PAs or all antenna ports can reach the maximum output power corresponding to the power class of the terminal device;

capability of the terminal device on the transmit power of at least one AC can reach the maximum output power corresponding to the power class of the terminal device;

capability of the terminal device on the sum of transmit powers of at least N ACs can reach the maximum output power corresponding to the power class of the terminal device, where N is a positive integer;

capability of the terminal device on each AC can reach one $M^{th}$ of the maximum output power corresponding to the power class of the terminal device, where M is a positive integer;

capability of the terminal device on the sum of transmit powers of any K ACs can reach the maximum output power corresponding to the power class of the terminal device, where K is a positive integer;

capability of the terminal device on the transmit power of at least one PA can reach the maximum output power corresponding to the power class of the terminal device;

capability of the terminal device on the sum of transmit powers of at least N PAs of the terminal device can reach the maximum output power corresponding to the power class of the terminal device, where N is a positive integer;

capability of the terminal device on the transmit power of each PA can reach one $M^{th}$ of the maximum output power corresponding to the power class of the terminal device, where M is a positive integer;

capability of the terminal device on the sum of transmit powers of any K PAs can reach the maximum output power corresponding to the power class of the terminal device, where K is a positive integer;

capability of the terminal device on the transmit power of at least one antenna port can reach the maximum output power corresponding to the power class of the terminal device;

capability of the terminal device on the sum of transmit powers of at least N antenna ports can reach the maximum output power corresponding to the power class of the terminal device, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any K antenna ports can reach the maximum output power corresponding to the power class of the terminal device for the uplink signal in the codebook-based uplink transmission mode, where K is a positive integer;

capability of the terminal device on the transmit power of at least one AC can reach the maximum output power corresponding to the power class of the terminal device for the uplink signal in the codebook-based uplink transmission mode;

capability of the terminal device on the sum of transmit powers of at least N ACs can reach the maximum output power corresponding to the power class of the terminal device for the uplink signal in the codebook-based uplink transmission mode, where N is a positive integer;

capability of the terminal device on the transmit power of each AC can reach one Mtn of the maximum output power corresponding to the power class of the terminal device for the uplink signal in the codebook-based uplink transmission mode, where M is a positive integer;

capability of the terminal device on the sum of transmit powers of any Q ACs can reach the maximum output power corresponding to the power class of the terminal device for the uplink signal in the codebook-based uplink transmission mode, where Q is a positive integer;

capability of the terminal device on the transmit power of at least one PA can reach the maximum output power corresponding to the power class of the terminal device for the uplink signal in the codebook-based uplink transmission mode;

capability of the terminal device on the sum of transmit powers of at least N PAs can reach the maximum output power corresponding to the power class of the terminal device for the uplink signal in the codebook-based uplink transmission mode, where N is a positive integer;

capability of the terminal device on the transmit power of each PA can reach one Mtn of the maximum output power corresponding to the power class of the terminal device for the uplink signal in the codebook-based uplink transmission mode, where M is a positive integer;

capability of the terminal device on the sum of transmit powers of any Q PAs can reach the maximum output power corresponding to the power class of the terminal device for the uplink signal in the codebook-based uplink transmission mode, and Q is a positive integer;

capability of the terminal device on the transmit power of at least one antenna port can reach the maximum output power corresponding to the power class of the terminal device for the uplink signal in the codebook-based uplink transmission mode;

capability of the terminal device on the sum of transmit powers of at least N antenna ports can reach the maximum output power corresponding to the power class of the terminal device for the uplink signal in the codebook-based uplink transmission mode, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer.

In one embodiment, the N is the number of antenna ports corresponding to the uplink MIMO; the M is the maximum number of antenna ports that the terminal device can transmit coherently.

In one embodiment, the power capability indication message does not contain the power class of the terminal device, and the determining device is specifically configured to:

determine the power control scaling rule of the uplink signal according to the power capability and the power class of the terminal device;

where the power class of the terminal device is indicated by the network device, or reported by the terminal device.

In one embodiment, the determining device is specifically configured to:

determine the power control scaling rule according to the power capability and at least one of following parameters, where the parameters include:

the number of antenna ports configured by the network device for the uplink signal transmission;

a precoding matrix corresponding to the uplink signal;

a codebook subset restriction type corresponding to the uplink signal;

the number of transmission layers corresponding to the uplink signal;

maximum power of uplink transmission.

In one embodiment, the parameters include a precoding matrix corresponding to the uplink signal, and the determining device is specifically configured to:

determine the power control scaling rule according to the power capability and the number of coherent antenna groups associated with non-zero elements in the precoding matrix corresponding to the uplink signal; or determine the power control scaling rule according to the power capability and a codeword coherent transmission type corresponding to the precoding matrix corresponding to the uplink signal; or determine the power control scaling rule according to the power capability, the number of coherent antenna groups associated with non-zero elements in the precoding matrix corresponding to the uplink signal, and the number of antenna ports configured by the network device for transmission of the uplink signal; or determine the power control scaling rule according to the power capability, a codeword coherent transmission type corresponding to the precoding matrix corresponding to the uplink signal, and the number of antenna ports configured by the network device for transmission of the uplink signal; or determine the power control scaling rule according to the power capability, a codeword coherent transmission type corresponding to the precoding matrix corresponding to the uplink signal, and the number of transmission layers corresponding to the uplink signal; or determine the power control scaling rule according to the power capability, a coherent transmission type corresponding to the precoding matrix corresponding to the uplink signal, the number of transmission layers corresponding to the uplink signal, and the number of antenna ports configured by the network device for transmission of the uplink signal.

In one embodiment, the parameters include a codebook subset restriction type corresponding to the uplink signal, and determining the power control scaling rule according to the power capability and at least one parameter includes:

determining the power control scaling rule according to the power capability, the codebook subset restriction type corresponding to the uplink signal, and the number of antenna ports configured by the network device for transmission of the uplink signal; or determining the power control scaling rule according to the power capability, the codebook subset restriction type corresponding to the uplink signal, the number of transmission layers corresponding to the uplink signal, and the number of antenna ports configured by the network device for transmission of the uplink signal; or determining the power control scaling rule according to the power capability, the codebook subset restriction type corresponding to the uplink signal, and a coherent transmission type corresponding to the precoding matrix corresponding to the uplink signal; or determining the power control scaling rule according to the power capability, the codebook subset restriction type corresponding to the uplink signal, a coherent transmission type corresponding to the precoding matrix corresponding to the uplink signal, and the number of antenna ports configured by the network device for transmission of the uplink signal; or determining the power control scaling rule according to the power capability, the codebook subset restriction type corresponding to the uplink signal, a coherent transmission type corresponding to the precoding matrix corresponding to the uplink signal, the number of transmission layers corresponding to the uplink signal, and the number of antenna ports configured by the network device for transmission of the uplink signal.

In one embodiment, the determining device is specifically configured to:

determine the power control scaling rule as a first power control scaling rule when the power capability and the at least one parameter satisfy a first preset condition.

In one embodiment, the determining device is specifically configured to:

determine the power control scaling rule as a second power control scaling rule when the power capability satisfies a second preset condition.

In one embodiment, the determining device is specifically further configured to:

receive a codebook subset restriction parameter from the network device, where the codebook subset restriction parameter carries the first instruction message.

In one embodiment, the first instruction message carries a first parameter, the first parameter indicates the type of the power control scaling rule, and different types correspond to different power control scaling rules.

In one embodiment, the first instruction message carries a second parameter, the second parameter indicates whether the terminal device uses full power to transmit an uplink signal.

In one embodiment, the determining device is specifically configured to:

determine the power control scaling rule as a third power control scaling rule if the first instruction message satisfies a third preset condition.

In one embodiment, the power control scaling rule is at least one of:

not scaling the transmit power, calculated according to high-level parameters, of the uplink signal;

scaling the transmit power, calculated according to high-level parameters, of the uplink signal with a power control scaling factor.

In one embodiment, the processing device is specifically configured to that:

the second preset condition is that the transmit power of each antenna port or AC or PA of the terminal device reaches a maximum output power requirement corresponding to a power class of the terminal device, and the power control scaling rule is not scaling the transmit power, calculated according to high-level parameters, of the uplink signal or scaling the transmit power, calculated according to high-level parameters, of the uplink signal with a power control scaling factor of 1; or the third preset condition is that the first instruction message instructs the terminal device to transmit the uplink signal at full power, and the power control scaling rule is not scaling the transmit power, calculated according to high-level parameters, of the uplink signal or scaling the transmit power, calculated according to high-level parameters, of the uplink signal with a power control scaling factor of 1; or the first preset condition is that the transmit power of each antenna port or AC or PA of the terminal device reaches one half of the maximum output power requirement corresponding to a power class of the terminal device, the number of antenna ports configured by the network device for an uplink transmission mode of the uplink signal is greater than 1, and an indicated precoding matrix corresponds to a precoding matrix of single-layer NC transmission, and the power control scaling rule is scaling the transmit power, calculated according to high-level parameters, of the uplink signal with a power control scaling factor of ½; or the first preset condition is that the transmit power of each antenna port or AC or PA of the terminal device reaches a quarter of the maximum output power requirement corresponding to a power class of the terminal device, the number of antenna ports configured by the network device for an uplink transmission mode of the uplink signal is greater than 1, and an indicated precoding matrix corresponds to a precoding matrix of three-layer NC transmission, and the power control scaling rule is scaling the transmit power, calculated according to high-level parameters, of the uplink signal with a power control scaling factor of ¾; or the second preset condition is that the transmit power of each antenna port or AC or PA of the terminal device reaches a quarter of the maximum output power requirement corresponding to a power class of the terminal device, or a single antenna port or AC or PA of the terminal device does not reach a specific requirement, or the terminal device does not report the capability of each antenna port or AC or PA, or a communication protocol does not formulate a performance requirement for each antenna port or AC or PA of the terminal device, and the power control scaling rule is scaling the transmit power, calculated according to high-level parameters, of the uplink signal with a ratio of an actual number of ports for sending signals to the total number of ports configured by the network device for a transmission mode corresponding to the uplink signal; or the second preset condition is that the transmit power of each antenna port, or AC, or PA of the terminal device reaches the maximum power of uplink transmission, and the power control scaling rule is not scaling the transmit power, calculated according to high-level parameters, of the uplink signal or scaling the transmit power, calculated according to high-level parameters, of the uplink signal with a power control scaling factor of 1; or the first preset condition is that the power capability of the terminal device is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of single-layer NC transmission, and the power control scaling rule is scaling the transmit power, calculated according to high-level parameters, of the uplink signal with a power control scaling factor of ½; or the first preset condition is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of three-layer NC transmission, and the power control scaling rule is scaling the transmit power, calculated according to high-level parameters, of the uplink signal with a power control scaling factor of ¾; or the second preset condition is that the transmit power of each antenna port, or AC, or PA of the terminal device reaches a quarter of the maximum power of uplink transmission, or a single antenna port of the terminal device does not reach a specific requirement, or the terminal device does not report the capability of each antenna port, or a communication protocol does not formulate a performance requirement for each antenna port, or AC, or PA of the terminal device, and the power control scaling rule is scaling the transmit power, calculated according to high-level parameters, of the uplink signal with a ratio of an actual number of ports for sending signals to the total number of ports configured by the network device for a transmission mode corresponding to the uplink signal.

In one embodiment, the processing device is specifically configured to:

scale the transmit power, calculated according to high-level parameters, of the uplink signal with a power control scaling factor, where:

when a precoding matrix of the uplink signal is non-coherent transmission precoding matrix, the power control scaling factor is $$\beta = \min\left\{\frac{\rho_0}{\rho}, \frac{\rho}{R}\right\};$$

or when a precoding matrix of the uplink signal is partial coherent transmission precoding matrix, the power control scaling factor is $$\beta = \min\left\{\frac{\rho_0}{\rho}, \frac{\rho}{2R}\right\};$$

or when a precoding matrix of the uplink signal is full-coherent transmission precoding matrix, the power control scaling factor is $\beta=1$;

where R is the number of transmission layers of the uplink signal, $\rho_0$ is the number of ports of non-zero transmission corresponding to the precoding matrix of the uplink signal, and $\rho$ is the number of antenna ports configured by the network device for the uplink signal transmission.

In one embodiment, the processing device is specifically configured to:

scale the transmit power, calculated according to high-level parameters, of the uplink signal with a power control scaling factor, where:

the power control scaling factor is $$\beta = \min\left\{1, \frac{\rho}{G}\right\};$$

where ρ is the number of antenna ports configured by the network device for the uplink signal MIMO transmission, and G is a coefficient related to the power capability of the terminal device; or the power control scaling factor is is $$\beta = \max\left\{1, \frac{K}{R}\right\}\frac{\rho_0}{\rho},$$

and R is the number of transmission layers of the uplink signal, K is a coefficient, $\rho_0$ is the number of ports of non-zero transmission corresponding to the precoding matrix of the uplink signal, and $\rho$ is the number of antenna ports configured by the network device for the uplink signal transmission; or the power control scaling factor is $$\beta = \frac{G}{G_0}\frac{\rho_0}{\rho},$$

where R is the number of transmission layers of the uplink signal, $G_0$ is the number of coherent antenna groups corresponding to the precoding matrix of the uplink signal, G is the maximum number of coherent antenna groups, indicated by the network device to the terminal device, corresponding to all precoding matrices in a codebook corresponding to the codebook subset restriction type of the uplink signal, $\rho_0$ is the number of ports of non-zero transmission corresponding to the precoding matrix of the uplink signal, and $\rho$ is the number of antenna ports configured by the network device for transmission of the uplink signal.

In one embodiment, the K is a coefficient related to the number of antenna ports of the uplink signal and the codebook subset restriction type corresponding to the uplink signal; or the K is a coefficient related to the power capability of the terminal device.

In a sixth aspect, a network device is provided, which includes:

a first determining device configured to determine a power control scaling rule of an uplink signal;

an instruction device configured to instruct the terminal device to send an uplink signal;

a second determining device configured to determine scheduling information of the uplink signal according to the power control scaling rule.

In one embodiment, the first determining device is specifically configured to:

determine the power control scaling rule of the uplink signal according to a power capability of the terminal device.

In one embodiment, the first determining device is further configured to:

send a first instruction message to the terminal device, where the first instruction message indicates the power control scaling rule of the uplink signal.

In one embodiment, the first determining device is further configured to:

determine a first instruction message of the uplink signal according to the power capability of the terminal device.

In one embodiment, the first determining device is further configured to:

send a codebook subset restriction parameter to the terminal device, where the codebook subset restriction parameter carries the first instruction message.

In one embodiment, the scheduling information of the uplink signal includes at least one of:

precoding and layer number indication information;
SRS indication information;
Modulation and Coding Level (MCS) information.

In one embodiment, the power capability of the terminal device includes:

default power capability; or
power capability indicated by a power capability indication message sent by the terminal device to the network device.

In one embodiment, the power capability indication message includes a first signaling parameter, and the first signaling parameter includes multiple candidate values or multiple states, where the different candidate values indicate different power capabilities, and the different states indicate different power capabilities.

In one embodiment, the power capability indication message includes at least one of:

type information of the terminal device;
power class information of the terminal device;
coherence capability information of antennas of the terminal device or codebook subset type supported by the terminal device.

In one embodiment, the power capability includes at least one of:

capability of the terminal device on transmit power of an AC;
capability of the terminal device on transmit power of an antenna port;
capability of the terminal device on transmit power of a PA;
capability of the terminal device on supporting full power transmission for one or more layers when the uplink signal is in a codebook-based uplink transmission mode;
indicated capability on whether the terminal device supports UL full power transmission;
indicated capability on whether the terminal device supports full power transmission for the uplink signal in a codebook-based uplink transmission mode;
indicated capability on whether the terminal device supports full power transmission with single-layer transmission for the uplink signal in a codebook-based uplink transmission mode;
indicated capability on whether the terminal device supports full power transmission for the uplink signal in a non-codebook based uplink transmission mode;
indicated capability on whether the terminal device supports full power transmission with single-layer transmission for the uplink signal in a non-codebook based uplink transmission mode;
indicated capability on whether the terminal device can use a codebook beyond its antenna coherence capability.

In one embodiment, the power capability includes:

capability of the terminal device on transmit power of each AC; or capability of the terminal device on transmit power of each AC for the uplink signal in the codebook-based uplink transmission mode; or capability of the terminal device on transmit power of each AC corresponding to a coherent antenna group; or capability of the terminal device on transmit power of each AC corresponding to a coherent antenna group for the uplink signal in the codebook-based uplink transmission mode; or capability of the terminal device on transmit power of each PA; or capability of the terminal device on transmit power of each PA for the uplink signal in the codebook-based uplink transmission mode; or capability of the terminal device on transmit power of each PA corresponding to a coherent antenna group; or capability of the terminal device on transmit power of each PA corresponding to a coherent antenna group for the uplink signal in the codebook-based uplink transmission mode; or capability of the terminal device on transmit power of each antenna port; or capability of the terminal device on transmit power of each antenna port for the uplink signal in the codebook-based uplink transmission mode; or capability of the terminal device on transmit power of each antenna corresponding to a coherent antenna group; or capability of the terminal device on transmit power of each antenna corresponding to a coherent antenna group for the uplink signal in the codebook-based uplink transmission mode; or capability of the terminal device on transmit power corresponding to each coherent antenna group; or capability of the terminal device on transmit power corresponding to each coherent antenna group for the uplink signal in the codebook-based uplink transmission mode.

In one embodiment, the power capability includes at least one of:

capability of the terminal device on the sum of transmit powers of any group of coherent antenna groups can reach the maximum output power corresponding to the power class of the terminal device;

capability of the terminal device on the sum of transmit powers of all ACs or all PAs or all antenna ports can reach the maximum output power corresponding to the power class of the terminal device;

capability of the terminal device on the transmit power of at least one AC can reach the maximum output power corresponding to the power class of the terminal device;

capability of the terminal device on the sum of transmit powers of at least N ACs can reach the maximum output power corresponding to the power class of the terminal device, where N is a positive integer;

capability of the terminal device on each AC can reach one $M^{th}$ of the maximum output power corresponding to the power class of the terminal device, where M is a positive integer;

capability of the terminal device on the sum of transmit powers of any Q ACs can reach the maximum output power corresponding to the power class of the terminal device, where Q is a positive integer;

capability of the terminal device on the transmit power of at least one PA can reach the maximum output power corresponding to the power class of the terminal device;

capability of the terminal device on the sum of transmit powers of at least N PAs of the terminal device can reach the maximum output power corresponding to the power class of the terminal device, where N is a positive integer;

capability of the terminal device on the transmit power of each PA can reach one $M^{th}$ of the maximum output power corresponding to the power class of the terminal device, where M is a positive integer;

capability of the terminal device on the sum of transmit powers of any Q PAs can reach the maximum output power corresponding to the power class of the terminal device, where Q is a positive integer;

capability of the terminal device on the transmit power of at least one antenna port can reach the maximum output power corresponding to the power class of the terminal device;

capability of the terminal device on the sum of transmit powers of at least N antenna ports can reach the maximum output power corresponding to the power class of the terminal device, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer;

capability of the terminal device on the transmit power of at least one AC can reach the maximum output power corresponding to the power class of the terminal device for the uplink signal in the codebook-based uplink transmission mode;

capability of the terminal device on the sum of transmit powers of at least N ACs can reach the maximum output power corresponding to the power class of the terminal device for the uplink signal in the codebook-based uplink transmission mode, where N is a positive integer;

capability of the terminal device on the transmit power of each AC can reach one $M^{th}$ of the maximum output power corresponding to the power class of the terminal device for the uplink signal in the codebook-based uplink transmission mode, where M is a positive integer;

capability of the terminal device on the sum of transmit powers of any Q ACs can reach the maximum output power corresponding to the power class of the terminal device for the uplink signal in the codebook-based uplink transmission mode, where Q is a positive integer;

capability of the terminal device on the transmit power of at least one PA can reach the maximum output power corresponding to the power class of the terminal device for the uplink signal in the codebook-based uplink transmission mode;

capability of the terminal device on the sum of transmit powers of at least N PAs can reach the maximum output power corresponding to the power class of the terminal device for the uplink signal in the codebook-based uplink transmission mode, where N is a positive integer;

capability of the terminal device on the transmit power of each PA can reach one $M^{th}$ of the maximum output power corresponding to the power class of the terminal device for the uplink signal in the codebook-based uplink transmission mode, where M is a positive integer;

capability of the terminal device on the sum of transmit powers of any Q PAs can reach the maximum output power corresponding to the power class of the terminal device for the uplink signal in the codebook-based uplink transmission mode, and Q is a positive integer;

capability of the terminal device on the transmit power of at least one antenna port can reach the maximum output power corresponding to the power class of the terminal device for the uplink signal in the codebook-based uplink transmission mode;

capability of the terminal device on the sum of transmit powers of at least N antenna ports can reach the maximum output power corresponding to the power class of the terminal device for the uplink signal in the codebook-based uplink transmission mode, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer.

In one embodiment, the N is the number of antenna ports corresponding to the uplink MIMO; the M is the maximum number of antenna ports that the terminal device can transmit coherently.

In one embodiment, the first determining device is specifically configured to:

determine the power control scaling rule according to the power capability and at least one of following parameters, where the parameters include:

the number of antenna ports configured by the network device for transmission of the uplink signal;

a precoding matrix corresponding to the uplink signal;

a codebook subset restriction type corresponding to the uplink signal;

the number of transmission layers corresponding to the uplink signal;

maximum power of uplink transmission.

In one embodiment, the parameters include a precoding matrix corresponding to the uplink signal, and the first determining device is specifically configured to:

determine the power control scaling rule according to the power capability and the number of coherent antenna groups associated with non-zero elements in the precoding matrix corresponding to the uplink signal; or determine the power control scaling rule according to the power capability and a codeword coherent transmission type corresponding to the precoding matrix corresponding to the uplink signal; or determine the power control scaling rule according to the power capability, the number of coherent antenna groups associated with non-zero elements in the precoding matrix corresponding to the uplink signal, and the number of antenna ports configured by the network device for transmission of the uplink signal; or determine the power control scaling rule according to the power capability, a codeword coherent transmission type corresponding to the precoding matrix corresponding to the uplink signal, and the number of antenna ports configured by the network device for transmission of the uplink signal; or determine the power control scaling rule according to the power capability, a codeword coherent transmission type corresponding to the precoding matrix corresponding to the uplink signal, and the number of transmission layers corresponding to the uplink signal; or determine the power control scaling rule according to the power capability, a coherent transmission type corresponding to the precoding matrix corresponding to the uplink signal, the number of transmission layers corresponding to the uplink signal, and the number of antenna ports configured by the network device for transmission of the uplink signal.

In one embodiment, the parameters include a codebook subset restriction type corresponding to the uplink signal, and the first determining device is specifically configured to:

determine the power control scaling rule according to the power capability, the codebook subset restriction type corresponding to the uplink signal, and the number of antenna ports configured by the network device for transmission of the uplink signal; or determine the power control scaling rule according to the power capability, the codebook subset restriction type corresponding to the uplink signal, the number of transmission layers corresponding to the uplink signal, and the number of antenna ports configured by the network device for transmission of the uplink signal; or determine the power control scaling rule according to the power capability, the codebook subset restriction type corresponding to the uplink signal, and a coherent transmission type corresponding to the precoding matrix corresponding to the uplink signal; or determine the power control scaling rule according to the power capability, the codebook subset restriction type corresponding to the uplink signal, a coherent transmission type corresponding to the precoding matrix corresponding to the uplink signal, and the number of antenna ports configured by the network device for transmission of the uplink signal; or determine the power control scaling rule according to the power capability, the codebook subset restriction type corresponding to the uplink signal, a coherent transmission type corresponding to the precoding matrix corresponding to the uplink signal, the number of transmission layers corresponding to the uplink signal, and the number of antenna ports configured by the network device for transmission of the uplink signal.

In one embodiment, the power control scaling rule is at least one of:

not scaling the transmit power, calculated according to high-level parameters, of the uplink signal;

scaling the transmit power, calculated according to high-level parameters, of the uplink signal with a power control scaling factor.

In one embodiment, the first determining device is specifically configured to that:

when the power capability is that the transmit power of each antenna port or AC or PA of the terminal device reaches a maximum output power requirement corresponding to a power class of the terminal device, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the first instruction message instructs the terminal device to transmit the uplink signal at full power, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the transmit power of each antenna port or AC or PA of the terminal device reaches one half of the maximum output power requirement corresponding to a power class of the terminal device, the number of antenna ports configured by the network device for an uplink transmission mode of the uplink signal is greater than 1, and an indicated precoding matrix corresponds to a precoding matrix of single-layer non-coherent (NC) transmission, the power control scaling rule is scaling the transmit power, calculated according to high-level parameters, of the uplink signal with a power control scaling factor of ½; or when the power capability is that the transmit power of each antenna port or AC or PA of the terminal device reaches a quarter of the maximum output power requirement corresponding to a power class of the terminal device, the number of antenna ports configured by the network device for an uplink transmission mode of the uplink signal is greater than 1, and an indicated precoding matrix corresponds to a precoding matrix of three-layer NC transmission, the power control scaling rule is scaling the transmit power, calculated according to high-level parameters, of the uplink signal with a power control scaling factor of ¾; or when the power capability is that the transmit power of each antenna port or AC or PA of the terminal device reaches a quarter of the maximum output power requirement corresponding to a power class of the terminal device, or a single antenna port or AC or PA of the terminal device does not reach a specific requirement, or the terminal device does not report the capability of each antenna port or AC or PA, or a communication protocol does not formulate a performance requirement for each antenna port or AC or PA of the terminal device, the power control scaling rule is scaling the transmit power, calculated according to high-level parameters, of the uplink signal with a ratio of an actual number of ports for sending signals to the total number of ports configured by the network device for a transmission mode corresponding to the uplink signal; or when the power capability is that the transmit power of each antenna port, or AC, or PA of the terminal device reaches the maximum power of uplink transmission, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of single-layer NC transmission, the power control scaling rule is scaling the transmit power, calculated according to high-level parameters, of the uplink signal with a power control scaling factor of ½; or when the power capability is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of three-layer NC transmission, the power control scaling rule is scaling the transmit power, calculated according to high-level parameters, of the uplink signal with a power control scaling factor of ¾; or when the power capability is that the transmit power of each antenna port, or AC, or PA of the terminal device reaches a quarter of the maximum power of uplink transmission, or a single antenna port of the terminal device does not reach a specific requirement, or the terminal device does not report the capability of each antenna port, or a communication protocol does not formulate a performance requirement for each antenna port, or AC, or PA of the terminal device, the power control scaling rule is scaling the transmit power, calculated according to high-level parameters, of the uplink signal with a ratio of an actual number of ports for sending signals to the total number of ports configured by the network device for a transmission mode corresponding to the uplink signal.

In one embodiment, the first determining device is specifically configured to:

determine the power control scaling factor according to the power capability of the terminal device, where:

when a precoding matrix of the uplink signal is non-coherent transmission precoding matrix, the power control scaling factor is $$\beta = \min\left\{\frac{\rho_0}{\rho}, \frac{\rho}{R}\right\};$$

or when a precoding matrix of the uplink signal is partial coherent transmission precoding matrix, the power control scaling factor is $$\beta = \min\left\{\frac{\rho_0}{\rho}, \frac{\rho}{2R}\right\};$$

or when a precoding matrix of the uplink signal is full-coherent transmission precoding matrix, the power control scaling factor is $\beta=1$;

where R is the number of transmission layers of the uplink signal, $\rho_0$ is the number of ports of non-zero transmission corresponding to the precoding matrix of the uplink signal, and $\rho$ is the number of antenna ports configured by the network device for the uplink signal transmission.

In one embodiment, the first determining device is specifically configured to:

determine the power control scaling factor according to the power capability of the terminal device, where:

the power control scaling factor is $$\beta = \min\left\{1, \frac{\rho}{G}\right\};$$

where $\rho$ is the number of antenna ports configured by the network device for the uplink signal MIMO transmission, and G is a coefficient related to the power capability of the terminal device; or the power control scaling factor is $$\beta = \max\left\{1, \frac{K}{R}\right\}\frac{\rho_0}{\rho},$$

where R is the number of transmission layers of the uplink signal, K is a coefficient, $\rho_0$ is the number of ports of non-zero transmission corresponding to the precoding matrix of the uplink signal, and $P$ is the number of antenna ports configured by the network device for transmission of the uplink signal; or the power control scaling factor is $$\beta = \frac{G}{G_0} \frac{\rho_0}{\rho},$$

and R is the number of transmission layers of the uplink signal, $G_0$ is the number of coherent antenna groups corresponding to the precoding matrix of the uplink signal, G is the maximum number of coherent antenna groups, indicated by the network device to the terminal device, corresponding to all precoding matrices in a codebook corresponding to the codebook subset restriction type of the uplink signal, $P_0$ is the number of ports of non-zero transmission corresponding to the precoding matrix of the uplink signal, and $P$ is the number of antenna ports configured by the network device for transmission of the uplink signal.

In one embodiment, the K is a coefficient related to the number of antenna ports of the uplink signal and the codebook subset restriction type corresponding to the uplink signal; or the K is a coefficient related to the power capability of the terminal device.

In a seventh aspect, a computer storage medium with a computer program stored thereon is provided, where the computer program, when executed by a processor, implements the method as described in any one of the first or second aspect.

The embodiments of the present application provide an uplink power control method, a terminal device and a network device. In the method, the power control scaling rule of the uplink signal is determined according to the power capability of the terminal device, and/or the power control scaling rule is determined according to the first instruction message from the network device, to scale the power of the uplink signal according to the scaling rule, so that the terminal device with the partial antenna coherent transmission capability and non-coherent transmission capability can perform the low-rank transmission at the maximum transmit power, thereby improving the performance of the terminal device at the edge of the cell.

DETAILED DESCRIPTION OF THE EMBODIMENTS

Figure 1:
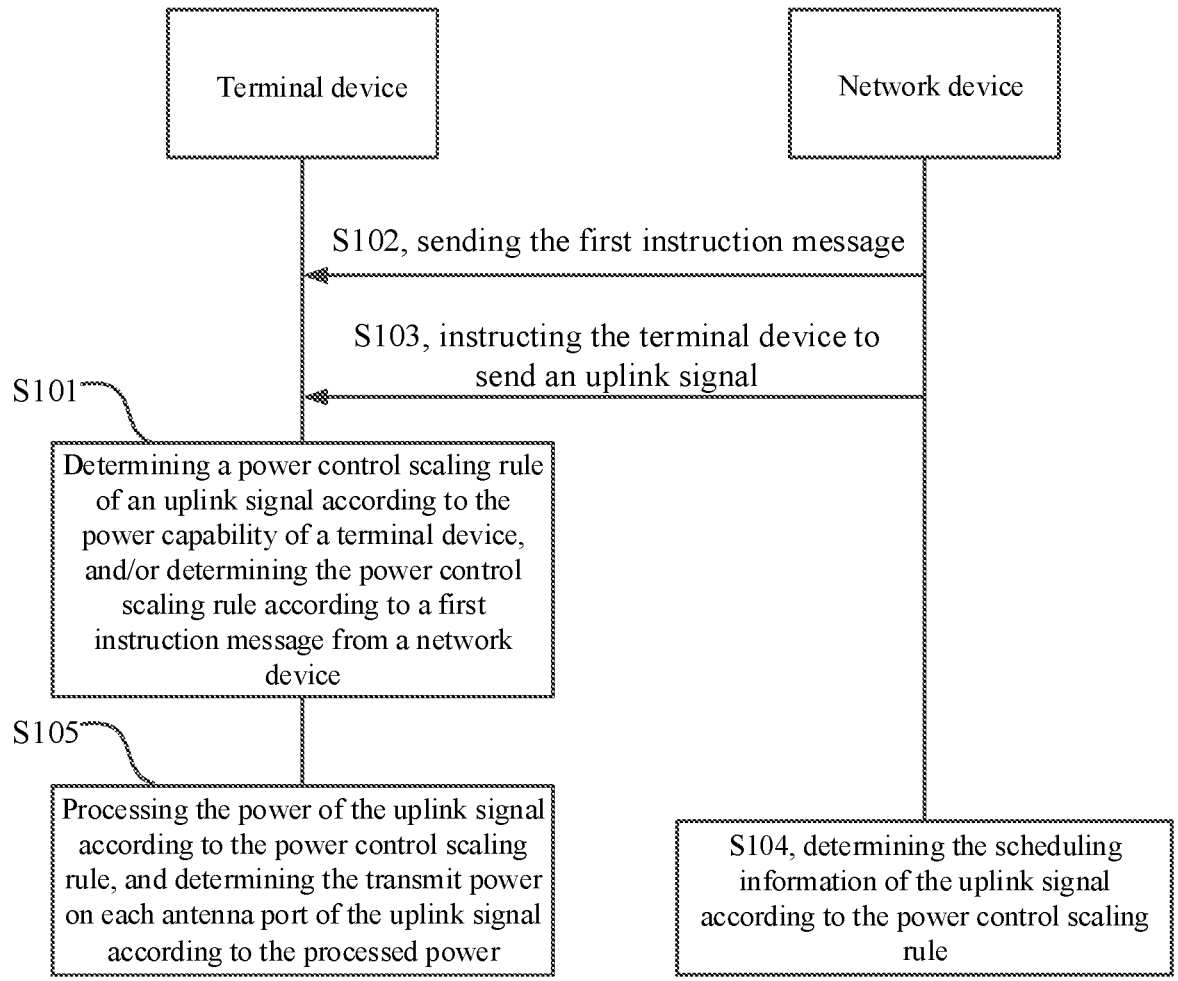
FIG. 1 is a schematic diagram of the flow of an uplink power control method provided by an embodiment of the present application.

The embodiments of the application will be described clearly and completely below in combination with the accompanying drawings in the embodiments of the application.

The background art of the embodiments of the present application will be introduced below.

The Physical Uplink Shared Channel (PUSCH) of the 3GPP NR Release 15 and Release 16 versions of the NR system supports two uplink transmission schemes: codebook-based transmission and non-codebook based transmission. The codebook-based uplink transmission scheme is a multi-antenna transmission technology that determines the precoding matrix of the uplink transmission based on a fixed codebook.

In the NR system, the procedure of the codebook-based uplink transmission scheme is roughly as follows: a UE sends a Sounding Reference Signal (SRS) for acquiring the Channel State Information (CSI) of the codebook-based uplink transmission scheme to a base station. The base station performs the uplink channel detection according to the SRS sent by the UE, performs the resource scheduling for the UE, and determines the SRS resources corresponding to the uplink transmission, the number of layers of the uplink transmission and the precoding matrix, and further determines the Modulation and Coding (MCS) of the uplink transmission according to the precoding matrix and channel information. Then the base station notifies the UE of the PUSCH resource allocation and corresponding MCS, Transmit Precoding Matrix Indicator (TPMI), the number of transmission layers and the corresponding SRS resource indicator (SRI). The UE modulates and encodes the data according to the MCS indicated by the base station, and uses the SRI, TPMI, and number of transmission layers indicated by the base station to determine the precoding matrix and the number of transmission layers used when sending the data, and then precodes and sends the data. The PUSCH demodulation pilot and the PUSCH data use the same precoding method. The base station estimates the uplink channel based on the demodulated pilot signal and performs the data detection.

For the MIMO transmission of the UE, the characteristics of the transmission antenna and radio frequency are quite different from those of the base station, and the codebook design needs to fully consider the correlation characteristics between the antennas. When two antenna ports satisfy the coherence condition, the UE can use the two antenna ports to perform the data transmission of the same layer at the same time through precoding, to obtain the array gain. However, due to the influence of factors such as the mutual coupling effect of antenna elements, feeder differences, and changes in the phase and gain of the amplifier of the radio frequency path, there are inevitably differences in power and phase among actual antenna ports of the UE. Limited by cost and design, not all UEs can calibrate each antenna port to a degree that meets the coherent transmission requirement. For the UEs that cannot achieve antenna coherent transmission, there may be a large difference between the phase difference among UE antennas when the base station calculates the TPMI and the phase difference among antennas when the UE performs the PUSCH transmission after receiving the TPMI. If the TPMI indicates that the antennas that cannot transmit coherently are used for the transmission of the same data layer, the optimal uplink transmission precoding of the UE may not be the precoding indicated by the TPMI, that is, the UE uses the precoding indicated by the base station through the TPMI for the PUSCH transmission, which cannot achieve the better performance.

Therefore, the base station can send the codebook subset restriction signaling to the UE based on the antenna coherent transmission capability of the UE to restrict the UE from using a part of precoding matrices for uplink transmission.

The NR system defines three types of UE's antenna coherent transmission capabilities, namely: full-coherent, that is, all antennas can transmit coherently; partial-coherent, that is, the antennas in the same coherent transmission group can transmit coherently but the coherent transmission cannot be performed among coherent transmission groups, and each coherent transmission group contains two antennas; and non-coherent, that is, no antenna can transmit coherently.

The antenna coherent transmission capability of the UE (or the coherent capability of antennas of the UE) is indicated by the codebook subset type parameter supported by the UE, i.e., pusch-TransCoherence parameter of UE capability parameter MIMO-ParametersPerBand (see 3GPP protocol TS38.306 and TS38.331). The pusch-TransCoherence defines the uplink codebook subset type supported by the UE when precoding the PUSCH, and its value can be nonCoherent, partialNonCoherent, or fullCoherent. When the value of pusch-TransCoherence is nonCoherent, the UE only supports a codebook subset for non-coherent transmission. Since the codewords in the codebook subset for non-coherent transmission are all codewords of non-coherent transmission type, it can be considered that pusch-TransCoherence taking the value of nonCoherent corresponds to the fact that all antennas of the terminal are unable to transmit coherently (correspondingly, the antenna coherent transmission capability of the UE is non-coherent). When the value of pusch-TransCoherence is partialNonCoherent, the UE only supports a codebook subset for non-coherent transmission and a codebook subset for partial coherent transmission. Since the codewords in the codebook subset for partial coherent transmission are all codewords of partial coherent transmission type, it can be considered that pusch-TransCoherence taking the value of partialNonCoherent corresponds to the fact that the antennas in the same coherent transmission group of the terminal can transmit coherently (correspondingly, the antenna coherent transmission capability of the terminal is partial coherent). When the value of pusch-TransCoherence is fullCoherent, the UE supports a codebook subset for non-coherent transmission, a codebook subset for partial coherent transmission, and a codebook subset for fully coherent transmission, that is, all codewords in the codebook. At this time, it can be considered that pusch-TransCoherence taking the value of fullCoherent corresponds to the fact that all antennas of the terminal can transmit coherently (correspondingly, the coherence capability of antennas of the terminal is full coherent).

In the LTE and NR systems, the process of adopting the multi-antenna power allocation mode of the PUSCH of the uplink MIMO is: the UE performs the power scaling on the transmit power calculated by the uplink power control formula according to the ratio of the number of ports that transmit signals actually to the total number of ports configured by the network device for the transmission mode corresponding to the PUSCH, and then divides the scaled power evenly among the antenna ports that transmit signals actually.

For ease of understanding, for example, it is assumed that the uplink transmission is configured with 4 antenna ports, the precoding matrix indicated by the base station is as shown in formula (1), and the transmit power calculated by the UE according to the PUSCH power control formula is P, then the actual transmit power of the PUSCH is P/2. The transmit power of each of the first antenna port and the third antenna port is P/4. Such scaling does not require that each antenna port of the UE can reach the maximum transmit power, allowing the UE to use the lower-cost radio frequency components to implement multi-antenna functions.

$$\frac{1}{2}\begin{bmatrix}1\\0\\1\\0\end{bmatrix} \quad (1)$$

From the perspective of UE performance, when the UE is located at the edge of a cell or the channel conditions are poor, the base station usually configures the UE with the transmission with a low number of transmission layers (or rank) and the UE transmits the data with the maximum transmit power as possible. Under the codebook design of the NR system, for the codebook-based uplink transmission, there are always some antenna ports without PUSCH transmission when the UE with the partial antenna coherent transmission capability and non-coherent transmission capability performs the low-rank transmission.

Thus, the current uplink MIMO multi-antenna power allocation mechanism cannot ensure that the UE with the partial antenna coherent transmission capability and non-coherent transmission capability can reach the maximum transmit power during the low-rank transmission under the codebook-based uplink transmission scheme, thereby reducing the performance of the UE at the edge of the cell and affecting the coverage of the cell.

In view of this, the embodiments of the present application provide an uplink power control method, a terminal device and a network device. In the method, the power control scaling rule of the uplink signal is determined according to the power capability of the terminal device, and/or the power control scaling rule is determined according to the first instruction message from the network device, to scale the power of the uplink signal according to the scaling rule, so that the terminal device with the partial antenna coherent transmission capability and non-coherent transmission capability can reach the maximum transmit power during the low-rank transmission, thereby improving the performance of the terminal device at the edge of the cell.

The embodiments of the application will be introduced below with reference to the drawings of the specification.

Referring to FIG. 1, an embodiment of the present application provides an uplink power control method, and the process of this method is described as follows. Since the uplink power control method involves the interaction process between a terminal device and a network device, the processes performed by the terminal device and the network device will be described together in the following flow description.

S101, determining a power control scaling rule of an uplink signal according to the power capability of a terminal device, and/or determining the power control scaling rule according to a first instruction message from a network device, where the first instruction message indicates the power control scaling rule.

Under the codebook design of the NR system, for the codebook-based uplink transmission, there are always some antenna ports without uplink signal transmission when the terminal device with the partial antenna coherent transmission capability and non-coherent transmission capability performs the low-rank transmission, so the performance of the terminal device at the edge of the cell cannot be guaranteed. Therefore, in the embodiment of the present application, the terminal device can determine the power of the uplink signal according to the power capability of the terminal device, to ensure as much as possible that the terminal device with partial antenna coherent transmission capability and non-coherent transmission capability can reach the maximum transmission power during the low-rank transmission to improve the performance of the terminal device at the edge of the cell.

Specifically, the terminal device may determine the power control scaling rule of the uplink signal in two ways as follows.

In a first way: the terminal device determines the power control scaling rule of the uplink signal according to the power capability of the terminal device.

In a second way: the terminal device determines the power control scaling rule according to the first instruction message from the network device.

Here, the power capability of the terminal device may include the following types.

Type 1: default power capability.

For example, the power capability can be specified by the communication protocol for at least one antenna connector or the number of antenna ports of the terminal device. For example, the maximum transmission power requirement can be specified by the communication protocol for a single Antenna Connector (AC) of the terminal device. Or, the communication protocol requires each AC of the terminal device can reach the maximum transmit power requirement. For another example, the communication protocol requires that at least one AC of the terminal device can reach the maximum transmission power requirement. For another example, the communication protocol requires that each AC of the terminal device can reach one half of the maximum transmission power requirement. For another example, the communication protocol requires that each antenna connector of the terminal device can reach a quarter of the maximum transmit power requirement, and so on.

The default power capability may also be the power capability defaulted by the network device when the terminal device does not report the power capability to the network device.

Type 2: the power capability indicated by a power capability indication message sent by the terminal device to the network device.

The terminal device may report the power capability to the network device, that is, the terminal device may send a power capability indication message for indicating the power capability to the network device, where the power capability indication message carries the information for indicating the power capability.

In possible embodiments, the terminal device may report the power capability to the network device in any one of direct indication ways as follows.

(1) The power capability indication message reported by the terminal device to the network device includes a first signaling parameter of the terminal device, where the first signaling parameter includes multiple candidate values, and different candidate values indicate different power capabilities.

For example, the first signaling parameter may be the parameter powercapability, and a set of candidate values included may be {"fullPower", "ParitalPower", "limitedPower"}. The value "fullPower" means that the transmit power of each AC (or antenna port, or power amplifier) of the terminal device can reach the maximum power requirement. The value "ParitalPower" means that the transmit power of each AC (or antenna port, or power amplifier) of the terminal device can reach one half of the maximum power requirement, or the sum of transmit powers of any two ACs of the terminal device can reach the maximum transmission power requirement. The value "limitedPower" means that the transmit power of each AC (or antenna port, or power amplifier) of the terminal device can reach a quarter of the maximum power requirement, or the capability of a single AC (or antenna port, or power amplifier) of the terminal device does not reach the specific requirement.

For another example, a set of candidate values included in the first signaling parameter may be {"fullPower", "limitedPower"}. The value "fullPower" means that the transmit power of each AC (or antenna port, or power amplifier) of the terminal device can reach the maximum power requirement. The value "limitedPower" means that the capability of a single AC (or antenna port, or power amplifier) of the terminal device does not reach the specific requirement. Of course, the first parameter signaling may also be represented by other ways, and a set of candidate values included in the first signaling parameter may also be {"fullPower", "ParitalPower"}, etc., which will not be repeated here.

(2) The power capability indication message reported by the terminal device to the network device includes a first signaling parameter of the terminal device, where the first signaling parameter includes multiple states, and different states indicate different power capabilities.

For example, the first signaling parameter occupies 2 bits and contains 4 states. State 0 means that the transmit power of each AC (or antenna port, or power amplifier) of the terminal device can reach the maximum power requirement. State 1 means that the transmit power of each AC (or antenna port, or power amplifier) of the terminal device can reach one half of the maximum power requirement. State 2 means that the transmit power of each AC (or antenna port, or power amplifier) of the terminal device can reach a quarter of the maximum power requirement, or the capability of a single AC (or antenna port, or power amplifier) of the terminal device does not reach the specific requirement. For another example, the signaling parameter is indicated by 1 bit, in this case, one state means that the transmission power of each AC (or antenna port, or power amplifier) of the terminal device can reach the maximum power requirement, and the other state means that the capability of a single AC (or antenna port, or power amplifier) of the terminal device does not reach the specific requirement.

As a possible implementation, if the terminal device reports a power capability indication message of the terminal device to the network device, the power capability indication message corresponds to a power capability of the terminal device. If the terminal device does not report this power capability indication message, it indicates a default capability of the terminal device, for example, the capability of a single AC (or antenna port, or power amplifier) of the terminal device does not reach the specific requirement.

In a possible embodiment, the power capability reported by the terminal device to the network device may also be indirectly indicated as follows.

The power capability indication message reported by the terminal device to the network device may include at least one of: the type information of the terminal device, the power class information of the terminal device, and the coherent capability information of antennas of the terminal device. The examples are as follows.

(1) The power capability indication message reported by the terminal device to the network device may include type information of supported protocol of the terminal device, where this type information may indicate the power capability. In a possible embodiment, the power capability indication message reported by the terminal device to the network device may include type information of the power capability of the terminal device, where the type information may also indicate the power capability.

For example, the type indicated by the type information of the supported protocol of the terminal device reported by the terminal device to the network device, is R16. If the communication protocol requires that the capability of each AC, or the capability of each antenna port, or the capability of each power amplifier of the terminal device of R16 can reach the maximum power requirement corresponding to the power class of the terminal device, it is equivalent to indirectly indicating that the capability of each AC, or the capability of each antenna port, or the capability of each power amplifier of the terminal device can reach the maximum power requirement corresponding to the power class of the terminal device.

If the communication protocol requires that the capability of each AC, or the capability of each antenna port, or the capability of each power amplifier of the terminal device of R16 can reach one half of the maximum power requirement corresponding to the power class of the terminal device, it is equivalent to indirectly indicating that the capability of each AC, or the capability of each antenna port, or the capability of each power amplifier of the terminal device can reach one half of the maximum power requirement corresponding to the power class of the terminal device.

If the communication protocol does not require the capability of each AC, or the capability of each antenna port, or the capability of each power amplifier of the terminal device of R16, it is equivalent to indirectly indicating that the capability of a single AC, or the capability of a single antenna port, or the capability of single power amplifier of the terminal device does not reach the specific requirement.

If the power capability indication message reported by the terminal device to the network device includes the type information of power capability of the terminal device, it is equivalent to indirectly indicating the power capability of the terminal device.

(2) The power capability indication message reported by the terminal device to the network device includes the power class information of the terminal device, where the power class information can indicate the power class and indirectly indicate the power capability.

The communication protocol specifies the maximum power requirement of each AC or antenna port or power amplifier of the terminal device with regard to the power class of the terminal device. If the maximum power requirement is the maximum output power requirement formulated by the communication protocol for the power class of the terminal device, the terminal device can obtain the relationship between the transmit power and the maximum power requirement of each AC, or antenna port, or power amplifier of the terminal device according to the maximum power requirement of the AC, or antenna port, or power amplifier of the terminal device and the maximum output power requirement formulated by the communication protocol for the power class of the terminal device.

If the communication protocol requires that the capability of each AC, or antenna port, or power amplifier of the terminal device at this power class can reach the maximum output power requirement corresponding to the power class of the terminal device, it is equivalent to indirectly indicating that the capability of each AC, or antenna port, or power amplifier of the terminal device can reach the maximum power requirement corresponding to the power class of the terminal device.

If the communication protocol requires that the capability of each AC, or antenna port, or power amplifier of the terminal device at this power class can reach one half of the maximum power requirement corresponding to the power class of the terminal device, it is equivalent to indirectly indicating that the capability of each AC, or antenna port, or power amplifier of the terminal device can reach one half of the maximum power requirement corresponding to the power class of the terminal device.

If the communication protocol does not require the capability of each AC, or antenna port, or power amplifier of the terminal device at this power class, it is equivalent to indirectly indicating that the capability of a single AC, or antenna port, or power amplifier of the terminal device does not reach the specific requirement.

(3) The power capability indication message reported by the terminal device to the network device includes the coherent capability information of antennas of the terminal device, where the coherent capability information indicates the power capability. In a possible embodiment, the coherent capability information may be implemented in the form of codebook subset capability parameter. That is, the power capability indication message includes a codebook subset capability parameter to indicate the coherent capability information.

For example, if the coherent capability information reported by the terminal device is "nonCoherent", it corresponds to indicating to the network device that "the transmit power of each AC, or antenna port, or power amplifier of the terminal device can reach the maximum power requirement". If the coherent capability information reported by the terminal device is "partialAndNonCoherent", it corresponds to indicating to the network device that "the transmit power of each AC, or antenna port, or power amplifier of the terminal device can reach one half of the maximum power requirement". If the coherent capability information reported by the terminal device is "fullyAndPartialAndNonCoherent", it corresponds to indicating to the network device that "the transmit power of each AC, or antenna port, or power amplifier of the terminal device can reach a quarter of the maximum power requirement".

If the coherent capability reported by the terminal device is "fullyAndPartialAndNonCoherent", it corresponds to indicating to the network device that "the capability of a single AC, or antenna port, or power amplifier of the terminal device does not reach the specific requirement".

Type 3: at least one of the power capabilities as follows.

(1) The transmit power capability of the AC of the terminal device, which, in a possible embodiment, may include:

transmit power capability of each AC of the terminal device; or transmit power capability of each AC of the terminal device for the uplink signal in the codebook-based uplink transmission mode; or transmit power capability of each AC corresponding to a coherent transmission antenna group of the terminal device; or transmit power capability of each AC corresponding to a coherent transmission antenna group of the terminal device for the uplink signal in the codebook-based uplink transmission mode.

(2) The transmit power capability of the power amplifier (PA) of the terminal device, which, in a possible embodiment, may include:

transmit power capability of each PA of the terminal device; or transmit power capability of each PA of the terminal device for the uplink signal in the codebook-based uplink transmission mode; or transmit power capability of each PA corresponding to a coherent transmission antenna group of the terminal device; or transmit power capability of each PA corresponding to a coherent transmission antenna group of the terminal device for the uplink signal in the codebook-based uplink transmission mode.

(3) The transmit power capability of the antenna port of the terminal device, which, in a possible embodiment, may include:

transmit power capability of each antenna port of the terminal device; or transmit power capability of each antenna port of the terminal device for the uplink signal in the codebook-based uplink transmission mode; or transmit power capability of each antenna corresponding to a coherent transmission antenna group of the terminal device; or transmit power capability of each antenna corresponding to a coherent transmission antenna group of the terminal device for the uplink signal in the codebook-based uplink transmission mode; or transmit power capability corresponding to each coherent transmission antenna group of the terminal device; or transmit power capability corresponding to each coherent transmission antenna group of the terminal device for the uplink signal in the codebook-based uplink transmission mode.

(4) The capability of the terminal device to achieve full power transmission of the uplink signal at several layers in a codebook-based uplink transmission mode.

(5) The capability indicating whether the terminal device can realize the full power transmission of the uplink signal, that is, the capability indicating that the terminal device can realize the full power transmission of the uplink signal, or the capability indicating that the terminal device cannot realize the full power transmission of the uplink signal.

(6) The capability indicating whether the terminal device can realize the full power transmission of the uplink signal in a codebook-based uplink transmission mode, that is, the capability indicating that the terminal device can realize the full power transmission of the uplink signal in the codebook-based uplink transmission mode, or the capability indicating that the terminal device cannot realize the full power transmission of the uplink signal in the codebook-based uplink transmission mode.

(7) The capability indicating whether the terminal device can realize the full power transmission of the uplink signal during single-layer transmission in a codebook-based uplink transmission mode, that is, the capability indicating that the terminal device can realize the full power transmission of the uplink signal during single-layer transmission in the codebook-based uplink transmission mode, or the capability indicating that the terminal device cannot realize the full power transmission of the uplink signal during single-layer transmission in the codebook-based uplink transmission mode.

(8) The capability indicating whether the terminal device can realize the full power transmission of the uplink signal in a non-codebook based uplink transmission mode, that is, the capability indicating that the terminal device can realize the full power transmission of the uplink signal in the non-codebook based uplink transmission mode, or the capability indicating that the terminal device cannot realize the full power transmission of the uplink signal in the non-codebook based uplink transmission mode.

(9) The capability indicating whether the terminal device can realize the full power transmission of the uplink signal during single-layer transmission in a non-codebook based uplink transmission mode, that is, the capability indicating that the terminal device can realize the full power transmission of the uplink signal during single-layer transmission in the non-codebook based uplink transmission mode, or the capability indicating that the terminal device cannot realize the full power transmission of the uplink signal during single-layer transmission in the non-codebook based uplink transmission mode.

In a possible embodiment, the power capability may include at least one of the following capabilities.

(1) the capability that the sum of transmit powers of any group of coherent antenna groups of the terminal device can reach the maximum output power corresponding to the power class of the terminal device.

(2) the capability that the sum of transmit powers of all ACs, or the sum of transmit powers of all PAs, or the sum of transmit powers of all antenna ports of the terminal device can reach the maximum output power corresponding to the power class of the terminal device.

(3) the capability that the transmit power of at least one AC of the terminal device can reach the maximum output power corresponding to the power class of the terminal device.

(4) the capability that the sum of transmit powers of at least N ACs of the terminal device can reach the maximum output power corresponding to the power class of the terminal device, where N is a positive integer.

(5) the capability that each AC of the terminal device can reach one $M^{th}$ of the maximum output power corresponding to the power class of the terminal device, where M is a positive integer.

(6) the capability that the sum of transmit powers of any Q ACs of the terminal device can reach the maximum output power corresponding to the power class of the terminal device, where Q is a positive integer.

(7) the capability that the transmit power of at least one PA of the terminal device can reach the maximum output power corresponding to the power class of the terminal device.

(8) the capability that the sum of transmit powers of at least N PAs of the terminal device can reach the maximum output power corresponding to the power class of the terminal device, where N is a positive integer.

(9) the capability that each PA of the terminal device can reach one $M^{th}$ of the maximum output power corresponding to the power class of the terminal device, where M is a positive integer.

(10) the capability that the sum of transmit powers of any Q PAs of the terminal device can reach the maximum output power corresponding to the power class of the terminal device, where Q is a positive integer.

(11) the capability that the transmit power of at least one antenna port of the terminal device can reach the maximum output power corresponding to the power class of the terminal device.

(12) the capability that the sum of transmit powers of at least N antenna ports of the terminal device can reach the maximum output power corresponding to the power class of the terminal device, where N is a positive integer, for example, N is 2, 4, 8, 16, etc. In one embodiment, N is the number of antenna ports corresponding to the uplink signal MIMO.

(13) the capability that each antenna port of the terminal device for the uplink signal in the codebook-based uplink transmission mode can reach one $M^{th}$ of the maximum output power corresponding to the power class of the terminal device, where M is a positive integer.

(14) the capability that the sum of transmit powers of any Q antenna ports of the terminal device for the uplink signal in the codebook-based uplink transmission mode can reach the maximum output power corresponding to the power class of the terminal device, where Q is a positive integer.

(15) the capability that the transmit power of at least one AC of the terminal device for the uplink signal in the codebook-based uplink transmission mode can reach the maximum output power corresponding to the power class of the terminal device.

(16) the capability that the sum of transmit powers of at least N ACs of the terminal device for the uplink signal in the codebook-based uplink transmission mode can reach the maximum output power corresponding to the power class of the terminal device, and N is a positive integer, for example, N is 2, 4, 8, 16, etc. In one embodiment, N is the number of antenna ports corresponding to the uplink signal MIMO.

(17) the capability that each AC of the terminal device for the uplink signal in the codebook-based uplink transmission mode can reach one $M^{th}$ of the maximum output power corresponding to the power class of the terminal device, where M is a positive integer.

(18) the capability that the sum of transmit powers of any Q ACs of the terminal device for the uplink signal in the codebook-based uplink transmission mode can reach the maximum output power corresponding to the power class of the terminal device, where Q is a positive integer.

(19) the capability that the transmit power of at least one PA of the terminal device for the uplink signal in the codebook-based uplink transmission mode can reach the maximum output power corresponding to the power class of the terminal device.

(20) the capability that the sum of transmit powers of at least N PAs of the terminal device for the uplink signal in the codebook-based uplink transmission mode can reach the maximum output power corresponding to the power class of the terminal device, where N is a positive integer, for example, N is 2, 4, 8, 16, etc. In one embodiment, N is the number of antenna ports corresponding to the uplink signal MIMO.

(21) the capability that each PA of the terminal device for the uplink signal in the codebook-based uplink transmission mode can reach one $M^{th}$ of the maximum output power corresponding to the power class of the terminal device, where M is a positive integer.

(22) the capability that the sum of transmit powers of any Q PAs of the terminal device for the uplink signal in the codebook-based uplink transmission mode can reach the maximum output power corresponding to the power class of the terminal device, where Q is a positive integer.

(23) the capability that the transmit power of at least one antenna port of the terminal device for the uplink signal in the codebook-based uplink transmission mode can reach the maximum output power corresponding to the power class of the terminal device.

(24) the capability that the sum of transmit powers of at least N antenna ports of the terminal device for the uplink signal in the codebook-based uplink transmission mode can reach the maximum output power corresponding to the power class of the terminal device, where N is a positive integer, for example, N is 2, 4, 8, 16, etc. In one embodiment, N is the number of antenna ports corresponding to the uplink signal MIMO.

(25) the capability that each antenna port of the terminal device for the uplink signal in the codebook-based uplink transmission mode can reach one $M^{th}$ of the maximum output power corresponding to the power class of the terminal device, where M is a positive integer.

(26) the capability that the sum of transmit powers of any Q antenna ports of the terminal device for the uplink signal in the codebook-based uplink transmission mode can reach the maximum output power corresponding to the power class of the terminal device, where Q is a positive integer.

Here, N in the above (1)-(26) is a positive integer, for example, N is 2, 4, 8, 16, etc. In one embodiment, N is the number of antenna ports corresponding to the uplink signal MIMO. M is, for example, a positive integer such as 1, 2, 4, 8, 16, etc. In one embodiment, M is determined according to the coherent transmission capability of the terminal device. For example, M is the maximum number of antenna ports through which the terminal device can perform coherent transmission. For example, in the current NR system where the uplink signal is a PUSCH in the codebook-based uplink transmission mode, if the number of antenna ports configured by the network device is 4, the maximum number of antenna ports through which the terminal device with partial coherent transmission capability can perform coherent transmission is 2, M may be 2. The maximum number of antenna ports through which the terminal device with non-coherent transmission capability can perform coherent transmission is 1, M may be 1. The maximum number of antenna ports through which the terminal device with fully coherent transmission capability can perform coherent transmission is 4, M may be 4. Q can be any positive integer.

It should be noted that the default power capability in the first type of power capability may be any one or more of the default third type of power capability. The second type of power capability indicated by the power capability indication message sent by the terminal device to the network device may be any one or more of the third type of power capability.

In one embodiment, there are different power control scaling rules when the terminal device indicates different power capabilities.

In an embodiment of the present application, after determining the power capability, the terminal device can determine the power control scaling rule according to the power capability.

In an embodiment of the present application, some possible power control scaling rules include: not scaling the transmit power of the uplink signal calculated according to high-level parameters; or scaling the transmit power of the uplink signal calculated according to high-level parameters by a power control scaling factor. For example, the transmit power of the uplink signal calculated according to high-level parameters is scaled by a power control scaling factor of 1; the transmit power of the uplink signal calculated according to high-level parameters is scaled by a power control scaling factor of ½; the transmit power of the uplink signal calculated according to high-level parameters is scaled by a power control scaling factor of ¾; the transmit power of the uplink signal calculated according to high-level parameters is scaled by a ratio of the number of ports that send signals actually to the total number of ports configured by the network device for the transmission mode corresponding to the uplink signal; when the number of antenna ports configured by the network device for the uplink transmission mode of the uplink signal is greater than 1 and the indicated precoding matrix corresponds to single-layer NC (non-coherent) codewords, the power control scaling rule is scaling the transmit power of the uplink signal calculated according to high-level parameters by a power control scaling factor of ½; when the number of antenna ports configured by the network device for the uplink transmission mode of the uplink signal is greater than 1 and the indicated precoding matrix corresponds to three-layer NC codewords, the transmit power of the uplink signal calculated according to high-level parameters is scaled by a power control scaling factor of ¾; when the number of antenna ports configured by the network device for the uplink transmission mode of the uplink signal is greater than 1 and the indicated precoding matrix corresponds to single-layer NC codewords, the transmit power of the uplink signal calculated according to high-level parameters is scaled by a power control scaling factor of ½; when the number of antenna ports configured by the network device for the uplink transmission mode of the uplink signal is greater than 1 and the indicated precoding matrix corresponds to three-layer NC codewords, the transmit power of the uplink signal calculated according to high-level parameters is scaled by a power control scaling factor of ¾.

In a possible embodiment, if the power capability indication message does not contain the power class information of the terminal device, the terminal device may determine the power control scaling rule of the uplink signal according to the power capability and the power class of the terminal device, where the power class of the terminal device is indicated by the network device, or reported by the terminal device, which may specifically include the following cases.

It is assumed that the power capability reported by the terminal device is that the terminal device contains two PAs, and the power capability of the two PAs is {23 dBm+23 dBm}; and the power class of the terminal device is Class 3, i.e., the maximum output power requirement is 23 dBm, then the power capability of the terminal device is that the power of each PA of the terminal device can reach the maximum output power of the power class corresponding to the terminal. In this case, the power control scaling rule for when the power capability of the terminal device is that the power of each PA of the terminal device can reach the maximum output power of the power class corresponding to the terminal can be used. For example, the following power control scaling rule is adopted: not scaling the transmit power of the uplink signal calculated according to high-level parameters, or scaling the transmit power of the uplink signal calculated according to high-level parameters by a power control scaling factor of 1.

It is assumed that the power capability reported by the terminal device is that the terminal device contains two PAs, and the power capability of the two PAs is {20 dBm+20 dBm}; and the power class of the terminal device is Class 3, i.e., the maximum output power requirement is 23 dBm. Then the power capability of the terminal device is that the power of each PA of the terminal device can reach ½ of the maximum output power of the power class corresponding to the terminal device. In this case, the power control scaling rule for when the power capability of the terminal device is that the power of each PA of the terminal device can reach ½ of the maximum output power of the power class corresponding to the terminal device can be used. For example, the following power control scaling rule is adopted: when the number of antenna ports configured by the network device for the uplink transmission mode of the uplink signal is 2 and the indicated precoding matrix corresponds to single-layer non-coherent transmission codewords, the transmit power of the uplink signal calculated according to the high-level parameters is scaled by a power control scaling factor of ½; when the precoding matrix corresponds to other codewords, the transmit power of the uplink signal calculated according to the high-level parameters is not scaled. When the number of antenna ports configured by the network device for the uplink transmission mode of the uplink signal is 4 and the indicated precoding matrix corresponds to single-layer non-coherent transmission codewords, the transmit power of the uplink signal calculated according to the high-level parameters is scaled by a power control scaling factor of ½; when the precoding matrix corresponds to other codewords, the transmit power of the uplink signal calculated according to the high-level parameters is not scaled.

In a possible embodiment, the terminal device may determine the power control scaling rule according to the power capability and at least one of the following parameters. The following parameters may include: the number of antenna ports configured by the network device for uplink signal transmission, the precoding matrix corresponding to the uplink signal, the codebook subset restriction type corresponding to the uplink signal, the number of transmission layers corresponding to the uplink signal, and the maximum power of the uplink transmission.

For example, in a possible embodiment, if the parameters include the precoding matrix corresponding to the uplink signal, the terminal device may determine the power control scaling rule according to the power capability of the terminal device and the number of coherent antenna groups associated with non-zero elements in the precoding matrix corresponding to the uplink signal.

In a possible embodiment, the terminal device may determine the power control scaling rule according to the power capability and the codeword coherent transmission type corresponding to the precoding matrix corresponding to the uplink signal.

In a possible embodiment, the terminal device may determine the power control scaling rule according to the power capability, the number of coherent antenna groups associated with non-zero elements in the precoding matrix corresponding to the uplink signal, and the number of antenna ports configured by the network device for the uplink signal transmission.

In a possible embodiment, the terminal device may determine the power control scaling rule according to the power capability, the codeword coherent transmission type corresponding to the precoding matrix corresponding to the uplink signal, and the number of antenna ports configured for the uplink signal transmission.

In a possible embodiment, the terminal device may determine the power control scaling rule according to the power capability, the codeword coherent transmission type corresponding to the precoding matrix corresponding to the uplink signal, and the number of transmission layers corresponding to the uplink signal.

In a possible embodiment, the terminal device may determine the power control scaling rule according to the power capability, the coherent transmission type corresponding to the precoding matrix corresponding to the uplink signal, the number of transmission layers corresponding to the uplink signal, and the number of antenna ports configured by the network device for the uplink signal transmission.

In a possible embodiment, if the parameters include the codebook subset restriction type corresponding to the uplink signal, the terminal device may determine the power control scaling rule according to the power capability, the codebook subset restriction type corresponding to the uplink signal, and the number of antenna ports configured by the network device for the uplink signal transmission.

In a possible embodiment, the terminal device may determine the power control scaling rule according to the power capability, the codebook subset restriction type corresponding to the uplink signal, the number of transmission layers corresponding to the uplink signal, and the number of antenna ports configured by the network device for the uplink signal transmission.

In a possible embodiment, the terminal device may determine the power control scaling rule according to the power capability, the codebook subset restriction type corresponding to the uplink signal, and the coherent transmission type corresponding to the precoding matrix corresponding to the uplink signal.

In a possible embodiment, the terminal device may determine the power control scaling rule according to the power capability, the codebook subset restriction type corresponding to the uplink signal, the coherent transmission type corresponding to the precoding matrix corresponding to the uplink signal, and the number of antenna ports configured by the network device for the uplink signal transmission.

In a possible embodiment, the terminal device may determine the power control scaling rule according to the power capability, the codebook subset restriction type corresponding to the uplink signal, the coherent transmission type corresponding to the precoding matrix corresponding to the uplink signal, the number of transmission layers corresponding to the uplink signal, and the number of antenna ports configured by the network device for the uplink signal transmission.

For example, the terminal device may determine the power control scaling rule according to the power capability and the maximum power of uplink transmission, which may be as follows.

It is assumed that the power capability reported by the terminal device is that the terminal contains two PAs, and the power capability of the two PAs is {23 dBm+23 dBm}; and the maximum power of uplink transmission is 23 dBm. Then the power capability of the terminal device is that the power of each PA of the terminal and can reach the maximum power of uplink transmission. In this case, the power control scaling rule for when the power capability of the terminal device is that the power of each PA of the terminal device can reach the maximum power of uplink transmission can be used. For example, the following power control scaling rule is adopted: not scaling the transmit power of the uplink signal calculated according to high-level parameters, or scaling the transmit power of the uplink signal calculated according to high-level parameters by a power control scaling factor of 1.

It is assumed that the power capability reported by the terminal device is that the terminal contains two PAs, and the power capability of the two PAs is {20 dBm+20 dBm}; and the maximum power of uplink transmission is 23 dBm. Then the power capability of the terminal device is that the power of each PA of the terminal can reach $\frac{1}{2}$ of the maximum power of uplink transmission. In this case, the power control scaling rule for when the power capability of the terminal device is that the power of each PA of the terminal device can reach $\frac{1}{2}$ of the maximum power of uplink transmission can be used. For example, the following power control scaling rule is adopted: when the number of antenna ports configured by the network device for the uplink transmission mode of the uplink signal is 2 and the indicated precoding matrix corresponds to single-layer non-coherent transmission codewords, the transmit power of the uplink signal calculated according to the high-level parameters is scaled by a power control scaling factor of $\frac{1}{2}$; when the precoding matrix corresponds to other codewords, the transmit power of the uplink signal calculated according to the high-level parameters is not scaled. When the number of antenna ports configured by the network device for the uplink transmission mode of the uplink signal is 4 and the indicated precoding matrix corresponds to single-layer non-coherent transmission codewords, the transmit power of the uplink signal calculated according to the high-level parameters is scaled by a power control scaling factor of $\frac{1}{2}$; when the precoding matrix corresponds to other codewords, the transmit power of the uplink signal calculated according to the high-level parameters is not scaled.

For the second way: the terminal device determines the power control scaling rule according to the first instruction message from the network device, there are further embodiments provided by this application as follows.

S102, a network device may determine the power control scaling rule of the uplink signal according to the power capability of a terminal device, and then may send a first instruction message to the terminal device to inform the terminal device of the power control scaling rule. The first instruction message indicates the power control scaling rule, and/or, the first instruction message is a message indicating the power capability.

In a possible embodiment, the first instruction message instructs the terminal device to determine the power control scaling rule according to at least one of the following parameters. The parameters may include: the number of antenna ports configured by the network device for uplink signal transmission, the precoding matrix corresponding to the uplink signal, the codebook subset restriction type corresponding to the uplink signal, the number of transmission layers corresponding to the uplink signal, and the maximum power of the uplink transmission.

Correspondingly, the network side device determines the power control scaling rule according to at least one of the following parameters. The parameters may include: the number of antenna ports configured by the network device for uplink signal transmission, the precoding matrix corresponding to the uplink signal, the codebook subset restriction type corresponding to the uplink signal, the number of transmission layers corresponding to the uplink signal, and the maximum power of the uplink transmission.

In a possible embodiment, the terminal device determines the power control scaling rule according to the indication of the first instruction message and at least one of the following parameters. The parameters may include: the number of antenna ports configured by the network device for uplink signal transmission, the precoding matrix corresponding to the uplink signal, the codebook subset restriction type corresponding to the uplink signal, the number of transmission layers corresponding to the uplink signal, and the maximum power of the uplink transmission.

For example, in a possible embodiment, if the parameters include the precoding matrix corresponding to the uplink signal, the terminal device may determine the power control scaling rule according to the first instruction message and the number of coherent antenna groups associated with non-zero elements in the precoding matrix corresponding to the uplink signal.

In a possible embodiment, the terminal device may determine the power control scaling rule according to the first instruction message and the codeword coherent transmission type corresponding to the precoding matrix corresponding to the uplink signal.

In a possible embodiment, the terminal device may determine the power control scaling rule according to the first instruction message, the number of coherent antenna groups associated with non-zero elements in the precoding matrix corresponding to the uplink signal, and the number of antenna ports configured by the network device for the uplink signal transmission.

In a possible embodiment, the terminal device may determine the power control scaling rule according to the first instruction message, the codeword coherent transmission type corresponding to the precoding matrix corresponding to the uplink signal, and the number of antenna ports configured for the uplink signal transmission.

In a possible embodiment, the terminal device may determine the power control scaling rule according to the first instruction message, the codeword coherent transmission type corresponding to the precoding matrix corresponding to the uplink signal, and the number of transmission layers corresponding to the uplink signal.

In a possible embodiment, the terminal device may determine the power control scaling rule according to the first instruction message, the coherent transmission type corresponding to the precoding matrix corresponding to the uplink signal, the number of transmission layers corresponding to the uplink signal, and the number of antenna ports configured by the network device for the uplink signal transmission.

In a possible embodiment, if the parameters include the codebook subset restriction type corresponding to the uplink signal, the terminal device may determine the power control scaling rule according to the first instruction message, the codebook subset restriction type corresponding to the uplink signal, and the number of antenna ports configured by the network device for the uplink signal transmission.

In a possible embodiment, the terminal device may determine the power control scaling rule according to the first instruction message, the codebook subset restriction type corresponding to the uplink signal, the number of transmission layers corresponding to the uplink signal, and the number of antenna ports configured by the network device for the uplink signal transmission.

In a possible embodiment, the terminal device may determine the power control scaling rule according to the first instruction message, the codebook subset restriction type corresponding to the uplink signal, and the coherent transmission type corresponding to the precoding matrix corresponding to the uplink signal.

In a possible embodiment, the terminal device may determine the power control scaling rule according to the first instruction message, the codebook subset restriction type corresponding to the uplink signal, the coherent transmission type corresponding to the precoding matrix corresponding to the uplink signal, and the number of antenna ports configured by the network device for the uplink signal transmission.

In a possible embodiment, the terminal device may determine the power control scaling rule according to the first instruction message, the codebook subset restriction type corresponding to the uplink signal, the coherent transmission type corresponding to the precoding matrix corresponding to the uplink signal, the number of transmission layers corresponding to the uplink signal, and the number of antenna ports configured by the network device for the uplink signal transmission.

In a possible embodiment, the network device may determine the power control scaling rule according to the number of coherent antenna groups associated with non-zero elements in the precoding matrix corresponding to the uplink signal.

In a possible embodiment, the network device may determine the power control scaling rule according to the codeword coherent transmission type corresponding to the precoding matrix corresponding to the uplink signal.

In a possible embodiment, the network device may determine the power control scaling rule according to the number of coherent antenna groups associated with non-zero elements in the precoding matrix corresponding to the uplink signal and the number of antenna ports configured by the network device for the uplink signal transmission.

In a possible embodiment, the network device may determine the power control scaling rule according to the codeword coherent transmission type corresponding to the precoding matrix corresponding to the uplink signal and the number of antenna ports configured for the uplink signal transmission.

In a possible embodiment, the network device may determine the power control scaling rule according to the codeword coherent transmission type corresponding to the precoding matrix corresponding to the uplink signal and the number of transmission layers corresponding to the uplink signal.

In a possible embodiment, the network device may determine the power control scaling rule according to the coherent transmission type corresponding to the precoding matrix corresponding to the uplink signal, the number of transmission layers corresponding to the uplink signal, and the number of antenna ports configured by the network device for the uplink signal transmission.

In a possible embodiment, the network device may determine the power control scaling rule according to the codebook subset restriction type corresponding to the uplink signal and the number of antenna ports configured by the network device for uplink signal transmission.

In a possible embodiment, the network device may determine the power control scaling rule according to the codebook subset restriction type corresponding to the uplink signal, the number of transmission layers corresponding to the uplink signal, and the number of antenna ports configured by the network device for the uplink signal transmission.

In a possible embodiment, the network device may determine the power control scaling rule according to the codebook subset restriction type corresponding to the uplink signal and the coherent transmission type corresponding to the precoding matrix corresponding to the uplink signal.

In a possible embodiment, the network device may determine the power control scaling rule according to the codebook subset restriction type corresponding to the uplink signal, the coherent transmission type corresponding to the precoding matrix corresponding to the uplink signal, and the number of antenna ports configured by the network device for the uplink signal transmission.

In a possible embodiment, the network device may determine the power control scaling rule according to the codebook subset restriction type corresponding to the uplink signal, the coherent transmission type corresponding to the precoding matrix corresponding to the uplink signal, the number of transmission layers corresponding to the uplink signal, and the number of antenna ports configured by the network device for the uplink signal transmission.

S103, the network device instructs the terminal device to send an uplink signal. Here, S102 is not essential and, where it exists, there is no precedence order between S102 and S103.

In a possible embodiment, the network device may send a codebook subset restriction parameter to the terminal device, where the codebook subset restriction parameter carries the first instruction message.

In a possible embodiment, the first instruction message may carry a first parameter, and the first parameter indicates the type of the power control scaling rule, and different types correspond to different power control scaling rules. Alternatively, the first instruction message may carry a second parameter, and the second parameter indicates whether the terminal device transmits an uplink signal at full power.

S104, the network device determines the scheduling information of the uplink signal according to the power control scaling rule. The scheduling information of the uplink signal includes at least one of: precoding, layer number indication information (for example, indicated by "Precoding information and number of layers" in DCI format 0_1 of the 3GPP NR system), SRS indication information (for example, indicated by "SRS resource indicator" in DCI format 0_1 of the 3GPP NR system), and Modulation and Coding level (MCS) information.

In one embodiment, different first instruction messages correspond to different power control scaling rules.

In an embodiment of the present application, after determining the power capability, the terminal device can determine the power control scaling rule according to the power capability. Alternatively, if the terminal device receives the first instruction message sent by the network device, it may determine the power control scaling rule according to the first instruction message. Specifically, after determining the power capability, the terminal device may judge whether the power capability and at least one of the above-mentioned parameters satisfy the first preset condition when determining the power control scaling rule according to the power capability, and may determine the power control scaling rule as a first power control scaling rule if the first preset condition is satisfied. Alternatively, the terminal device may judge whether the power capability satisfies the second preset condition, and may determine the power control scaling rule as a second power control scaling rule if the second preset condition is satisfied.

Specifically, when determining the power control scaling rule according to the first instruction message, the terminal device may judge whether the first instruction message satisfies the third preset condition, and determine the power control scaling rule as a power control scaling rule if the first instruction message satisfies the third preset condition.

Here, the first preset condition may be: the transmit power of each antenna port or AC or PA of the terminal device can reach the maximum output power requirement corresponding to the power class of the terminal device. Or, the terminal device can transmit the uplink signal at full power. Or, the transmit power of each antenna port or AC or PA of the terminal device can reach one half of the maximum output power requirement corresponding to the power class of the terminal device, the number of antenna ports configured by the network device for the uplink transmission mode of the uplink signal is greater than 1, and the indicated precoding matrix corresponds to single-layer NC codewords. Or, the terminal device can transmit the uplink signal at full power, the number of antenna ports configured by the network device for the uplink transmission mode of the uplink signal is greater than 1, and the indicated precoding matrix corresponds to single-layer NC codewords. Or, the transmit power of each antenna port or AC or PA of the terminal device can reach a quarter of the maximum output power requirement corresponding to the power class of the terminal device, the number of antenna ports configured by the network device for the uplink transmission mode of the uplink signal is greater than 1, and the indicated precoding matrix corresponds to three-layer NC codewords, etc. Or, the terminal device can transmit the uplink signal at full power, the number of antenna ports configured by the network device for the uplink transmission mode of the uplink signal is greater than 1, and the indicated precoding matrix corresponds to three-layer NC codewords, etc. The second preset condition may be: the transmit power of each antenna port or AC or PA of the terminal device can reach the maximum output power requirement corresponding to the power class of the terminal device. Or, the terminal device can transmit the uplink signal at full power. Or, the terminal device cannot transmit the uplink signal at full power. Or, the transmit power of each antenna port or AC or PA of the terminal device can reach a quarter of the maximum output power requirement corresponding to the power class of the terminal device. Or, a single antenna port or AC or PA of the terminal device does not reach the specific requirement. Or, the terminal device does not report the capability of each antenna port or AC or PA. Or, the communication protocol does not specify the performance requirement for the capability of each antenna port or AC or PA of the terminal device. Or, the transmit power of each antenna port or AC or PA of the terminal device can reach the maximum power of uplink transmission. Or, the transmit power of each antenna port or AC or PA of the terminal device can reach a quarter of the maximum power of uplink transmission. Or, a single antenna port of the terminal device does not reach the specific requirement. Or, the terminal device does not report the capability of each antenna port. Or, the communication protocol does not specify the performance requirement for the capability of each antenna port or AC or PA of the terminal device. The above are only examples of the first preset condition and second preset condition.

For ease of understanding, the following describes how the terminal device processes the transmit power of the uplink signal when the specific conditions are met as an example.

S105, processing the power of the uplink signal according to the power control scaling rule, and determining the transmit power on each antenna port of the uplink signal according to the processed power.

The terminal device scales the power of the uplink signal according to the power control scaling rule determined according to whether the power capability and/or the parameters satisfy the first preset condition or the second preset condition.

In a possible embodiment, the first preset condition is that the transmit power of each antenna port or AC or PA of the terminal device can reach one half of the maximum output power requirement corresponding to a power class of the terminal device, the number of antenna ports configured by the network device for an uplink transmission mode of the uplink signal is greater than 1, and the indicated precoding matrix corresponds to single-layer NC codewords, and the power control scaling rule is scaling the transmit power of the uplink signal calculated according to high-level parameters by a power control scaling factor of ½.

In a possible embodiment, the first preset condition is that the transmit power of each antenna port or AC or PA of the terminal device can reach a quarter of the maximum output power requirement corresponding to a power class of the terminal device, the number of antenna ports configured by the network device for an uplink transmission mode of the uplink signal is greater than 1, and the indicated precoding matrix corresponds to three-layer NC codewords, and the power control scaling rule is scaling the transmit power of the uplink signal calculated according to high-level parameters by a power control scaling factor of ¾.

In a possible embodiment, the first preset condition is that the power capability of the terminal device is that the transmit power of each antenna port or AC or PA of the terminal device can reach one half of the maximum power of uplink transmission, the number of antenna ports configured by the network device for an uplink transmission mode of the uplink signal is greater than 1, and the indicated precoding matrix corresponds to single-layer NC codewords, and the power control scaling rule is scaling the transmit power of the uplink signal calculated according to high-level parameters by a power control scaling factor of ½.

In a possible embodiment, the first preset condition is that the transmit power of each antenna port or AC or PA of the terminal device can reach one half of the maximum power of uplink transmission, the number of antenna ports configured by the network device for an uplink transmission mode of the uplink signal is greater than 1, and the indicated precoding matrix corresponds to three-layer NC codewords, and the power control scaling rule is scaling the transmit power of the uplink signal calculated according to high-level parameters by a power control scaling factor of ¾.

In a possible embodiment, the second preset condition is that the transmit power of each antenna port or AC or PA of the terminal device can reach a maximum output power requirement corresponding to a power class of the terminal device, and the power control scaling rule is not scaling the transmit power of the uplink signal calculated according to high-level parameters or the power control scaling rule is scaling the transmit power of the uplink signal calculated according to high-level parameters by a power control scaling factor of 1.

In a possible embodiment, the second preset condition is that the transmit power of each antenna port or AC or PA of the terminal device can reach a quarter of the maximum output power requirement corresponding to a power class of the terminal device, or a single antenna port or AC or PA of the terminal device does not reach a specific requirement, or the terminal device does not report the capability of each antenna port or AC or PA, or a communication protocol does not formulate a performance requirement for each antenna port or AC or PA of the terminal device, and the power control scaling rule is scaling the transmit power of the uplink signal calculated according to high-level parameters by a ratio of the number of ports that send signals actually to the total number of ports configured by the network device for a transmission mode corresponding to the uplink signal.

In a possible embodiment, the second preset condition is that the transmit power of each antenna port or AC or PA of the terminal device can reach the maximum power of uplink transmission, and the power control scaling rule is not scaling the transmit power of the uplink signal calculated according to high-level parameters or the power control scaling rule is scaling the transmit power of the uplink signal calculated according to high-level parameters by a power control scaling factor of 1.

In a possible embodiment, the second preset condition is that the transmit power of each antenna port or AC or PA of the terminal device can reach a quarter of the maximum power of uplink transmission, or a single antenna port of the terminal device does not reach a specific requirement, or the terminal device does not report the capability of each antenna port, or a communication protocol does not formulate a performance requirement for each antenna port or AC or PA of the terminal device, and the power control scaling rule is scaling the transmit power of the uplink signal calculated according to high-level parameters by a ratio of the number of ports that send signals actually to the total number of ports configured by the network device for a transmission mode corresponding to the uplink signal.

In a possible embodiment, the third preset condition is that the first instruction message instructs the terminal device to transmit the uplink signal at full power, and the power control scaling rule is not scaling the transmit power of the uplink signal calculated according to high-level parameters or the power control scaling rule is scaling the transmit power of the uplink signal calculated according to high-level parameters by a power control scaling factor of 1.

In a possible embodiment, the terminal device may scale the transmit power of the uplink signal calculated according to high-level parameters by the power control scaling factor in the following power control scaling rule.

(1) If the precoding matrix of the uplink signal is non-coherent transmission codewords, the power control scaling factor is:

$$\beta = \min\left\{\frac{\rho_0}{\rho}, \frac{P}{R}\right\};$$

if the precoding matrix of the uplink signal is partial coherent transmission codewords, the power control scaling factor is:

$$\beta = \min\left\{\frac{\rho_0}{\rho}, \frac{P}{2R}\right\},$$

otherwise, β=1.

In (1), R is the number of transmission layers of the uplink signal, $\rho_0$ is the number of ports of non-zero transmission corresponding to the precoding matrix of the uplink signal, and $\rho$ is the number of antenna ports configured by the network device for the uplink signal transmission.

In one embodiment, when the capability reported by the terminal device to the network device or the power capability specified by the communication protocol is the capability that the transmit power of each antenna port (or each AC, or each PA) of the terminal device can reach the maximum power requirement or the terminal device can perform uplink transmission at full power, the terminal device adopts the power control scaling rule in (1) described above.

(2) The power control scaling factor is:

$$\beta = \min\left\{1, \frac{P}{G}\right\}.$$

Here, $\rho$ is the number of antenna ports configured by the network device for the uplink signal transmission, and G is a coefficient related to the power capability of the terminal device.

In one embodiment, when the power capability of the terminal device is the capability that the transmit power of each antenna port (or each AC, or each PA) of the terminal device can reach the maximum power requirement or the terminal device can perform uplink transmission at full power, G=1. When the power capability of the terminal device is the capability that the sum of the transmit powers of any two antenna ports (or any two ACs, or any two PAs) of the terminal device can reach the maximum power requirement, G=2.

(3) The power control scaling factor is $$\beta = \max\left\{1, \frac{K}{R}\right\}\frac{\rho_0}{\rho},$$

where R is the number of transmission layers of the uplink signal, K is a coefficient, $\rho_0$ is the number of ports of non-zero transmission corresponding to the precoding matrix of the uplink signal, and $\rho$ is the number of antenna ports configured by the network device for the uplink signal transmission. K is a coefficient related to the number of antenna ports of the uplink signal and the codebook subset restriction type corresponding to the uplink signal. For example, K is a coefficient related to the power capability of the terminal device.

In one embodiment, K is a coefficient related to the number of antenna ports of the uplink signal and the codebook subset restriction type corresponding to the uplink signal. When the uplink signal is transmitted with 2 antenna ports or 4 antenna ports, the value of K can be as shown in Table 1.

TABLE 1

| ULCodebookSubset | $\rho$ | K |
| --- | --- | --- |
| fullAndPartialAndNonCoherent | 2 | 1 |
| fullAndPartialAndNonCoherent | 4 | 1 |
| partialCoherent | 4 | 2 |
| nonCoherent | 2 | 2 |
| nonCoherent | 4 | 4 |

In this case, the power control scaling factor of the uplink signal indicated by each precoding matrix is as shown in Table 2 below:

TABLE 2

| ULCodebookSubset | Rank | Non-coherent TPMI | Partial coherent TPMI | Fully coherent TPMI |
| --- | --- | --- | --- | --- |
| nonCoherent | 1 | 1 | — | — |
| | 2 | 1 | — | — |
| | 3 | 1 | — | — |
| | 4 | 1 | — | — |
| partialCoherent | 1 | 1/2 | 1 | — |
| | 2 | 1/2 | 1 | — |
| | 3 | 3/4 | 1 | — |
| | 4 | 1 | 1 | — |
| fullAndPartialAndNonCoherent | 1 | 1/4 | 1/2 | 1 |
| | 2 | 1/2 | 1 | 1 |
| | 3 | 3/4 | 1 | 1 |
| | 4 | 1 | 1 | 1 |

In Table 2, Non-coherent TPMI is a codeword for non-coherent transmission, Partial coherent TPMI is a codeword for partial coherent transmission, and Fully coherent TPMI is a codeword for fully coherent transmission.

In one embodiment, when the power capability reported by the terminal device to the network device or the default power capability of the terminal device is the capability that the transmit power of each antenna port (or each AC, or each PA) of the terminal device can reach the maximum power requirement or the terminal device can perform uplink transmission at full power, the terminal device adopts the power control scaling rule in (3) described above.

In one embodiment, the value of K is related to the power capability of the terminal device. For example, when the power capability of the terminal device is the capability that the transmit power of each antenna port (or each AC, or each PA) of the terminal device can reach the maximum power requirement, the value of K in Table 1 above is used.

In one embodiment, if the power capability reported by the terminal device to the network device or the default power capability of the terminal device is that the transmit power of each antenna port of the terminal device can reach one half of the power requirement, or the sum of the transmit powers of any two antenna ports of the terminal device can reach the maximum transmit power requirement, the value of K is as shown in Table 3 when the uplink signal is transmitted with 2 antenna ports or 4 antenna ports.

TABLE 3

| ULCodebookSubset | $\rho$ | K |
| --- | --- | --- |
| fullAndPartialAndNonCoherent | 2 | 1 |
| fullAndPartialAndNonCoherent | 4 | 1 |
| partialCoherent | 4 | 2 |
| nonCoherent | 2 | 2 |
| nonCoherent | 4 | 2 |

In this case, the power control scaling factor of the uplink signal under each precoding matrix indicator in the case of 4 antenna ports is as shown in Table 4.

TABLE 4

| ULCodebookSubset | Rank | Non-coherent TPMI | Partial coherent TPMI | Fully coherent TPMI |
| --- | --- | --- | --- | --- |
| nonCoherent | 1 | 1/2 | — | — |
| | 2 | 1/2 | — | — |
| | 3 | 3/4 | — | — |
| | 4 | 1 | — | — |
| partialCoherent | 1 | 1/2 | 1 | — |
| | 2 | 1/2 | 1 | — |
| | 3 | 3/4 | 1 | — |
| | 4 | 1 | 1 | — |
| fullAndPartialAndNonCoherent | 1 | 1/4 | 1/2 | 1 |
| | 2 | 1/2 | 1 | 1 |
| | 3 | 3/4 | 1 | 1 |
| | 4 | 1 | 1 | 1 |

In Table 4, Non-coherent TPMI is a codeword for non-coherent transmission, Partial coherent TPMI is a codeword for partial coherent transmission, and Fully coherent TPMI is a codeword for fully coherent transmission.

In one embodiment, when a single antenna port or AC of the terminal device does not need to meet a specific power requirement, the value of K is fixed to 1.

(4) The power control scaling factor is $$\beta = \frac{G}{G_0}\frac{\rho_0}{\rho},$$

where $G_0$ is the number of coherent antenna groups corresponding to the precoding matrix of the uplink signal, G is the maximum number of coherent antenna groups corresponding to all codewords in a codebook corresponding to the codebook subset restriction type of the uplink signal indicated by the network device to the terminal device, $\rho_0$ is the number of ports of non-zero transmission corresponding to the precoding matrix of the uplink signal, and $\rho$ is the number of antenna ports configured by the network device for the uplink signal transmission.

In one embodiment, when the uplink signal is transmitted with 2 antenna ports or 4 antenna ports, the value of $G_0$ may be as shown in Table 5 below. ULCodebookSubset in Table 5 is an indication parameter of the codebook subset restriction type corresponding to the uplink signal of the terminal device indicated by the network device to the terminal device (for example, indicated by the RRC signaling parameter ULCodebookSubset in the NR system).

TABLE 5

| ULCodebookSubset | ρ | $G_0$ |
| --- | --- | --- |
| fullAndPartialAndNonCoherent | 2 | 1 |
| fullAndPartialAndNonCoherent | 4 | 1 |
| partialCoherent | 4 | 2 |
| nonCoherent | 2 | 2 |
| nonCoherent | 4 | 4 |

Under this rule, the power control scaling factor of the uplink signal indicated by each precoding matrix in the case of 4 antenna ports is as shown in Table 6 below.

TABLE 6

| ULCodebookSubset | Rank | Non-coherent TPMI | Partial coherent TPMI | Fully coherent TPMI |
| --- | --- | --- | --- | --- |
| nonCoherent | 1 | 1 | — | — |
|  | 2 | 1 | — | — |
|  | 3 | 1 | — | — |
|  | 4 | 1 | — | — |
| partialCoherent | 1 | 1/2 | 1 | — |
|  | 2 | 1/2 | 1 | — |
|  | 3 | 3/4 | 1 | — |
|  | 4 | 1 | 1 | — |
| fullAndPartialAndNonCoherent | 1 | 1/4 | 1/2 | 1 |
|  | 2 | 1/2 | 1 | 1 |
|  | 3 | 3/4 | 1 | 1 |
|  | 4 | 1 | 1 | 1 |

In Table 6, Non-coherent TPMI is a codeword for non-coherent transmission, Partial coherent TPMI is a codeword for partial coherent transmission, and Fully coherent TPMI is a codeword for fully coherent transmission.

In one embodiment, when the power capability reported by the terminal device to the network device or the default power capability of the terminal device is the capability that the transmit power of each antenna port (or each AC, or each PA) of the terminal device can reach the maximum power requirement or the terminal device can perform the uplink transmission at full power, the terminal device adopts the power control scaling rule in (4) described above.

In the embodiments of the present application, one antenna port of the terminal device may correspond to one AC or correspond to multiple ACs, which is not limited in the embodiments of the present application. When one antenna port of the terminal device corresponds to multiple ACs, "the power capability of the terminal device is the capability that the maximum transmit power of each antenna port of the terminal device can reach the maximum power requirement" can be understood us "the power capability of the terminal device is the capability that the total output maximum transmit power of the multiple ACs corresponding to each antenna port of the terminal device can reach the maximum power requirement". In one embodiment, one antenna port of the terminal device corresponds to one AC, and "the power capability of the terminal device is the capability that the maximum transmission power of each antenna port of the terminal device can reach the maximum power requirement" described above means "the power capability of the terminal device is the capability that the maximum transmission power of each AC of the terminal device can reach the maximum power requirement".

In one embodiment, the above power control scaling rule of the uplink signal may also be independent of the power capability of the antenna port of the terminal device, but rather related to the power capability of the AC.

In an embodiment of the present application, the above maximum power requirement may be the maximum output power requirement corresponding to the power class of the terminal device. In one embodiment, the above maximum power requirement may also be the maximum output power requirement of the sum of output powers of all ACs corresponding to the power class of the terminal device. For example, for the PUSCH of the NR system, TS38.101 defines the maximum output power requirement corresponding to the power class of the terminal device. For example, the maximum output power requirement of the terminal device at each power class under each frequency band is defined in sections 6.2.1, 6.2D.1, etc., where it is 23 dBm at power class 3.

In an embodiment of the present application, the first instruction message sent by the network device may be used to indicate the following power control scaling rules, which specifically include the following modes.

(1) The first instruction message instructs the terminal device not to scale the transmit power of the uplink signal calculated according to high-level parameters or to scale the transmit power of the uplink signal calculated according to high-level parameters by a coefficient of 1 when determining the transmit power of the uplink signal. (Correspondingly, the network device assumes that the uplink signals corresponding to all precoding have the same transmit power, and the network device can perform the precoding selection, scheduling, etc. of the uplink signal based on the corresponding assumption of transmit power).

(2) The first instruction message indicates that when the number of antenna ports configured by the network device for the uplink transmission mode of the uplink signal is greater than 1 and the indicated precoding matrix corresponds to single-layer NC codewords, the terminal scales the transmit power of the uplink signal calculated according to the high-level parameters by a scaling factor of ½ when determining the transmit power of the uplink signal; otherwise, the transmit power of the uplink signal calculated according to the high-level parameters is not scaled or is scaled by a factor of 1. (Correspondingly, when the network device assumes that the precoding matrix corresponds to the single-layer NC codewords, the transmit power of the uplink signal is one half of the transmit power of other codewords.)

(3) The first instruction message instructs the terminal device to scale the transmit power of the uplink signal calculated according to the high-level parameters by a ratio of the number of ports that send signals actually to the total number of ports configured by the network device for the transmission mode corresponding to the uplink signal when determining the transmission power of the uplink signal. (Correspondingly, the network device assumes that the transmit power corresponding to the precoding matrix is proportional to the number of non-zero ports in the precoding matrix and the total number of ports configured by the network device for the transmission mode corresponding to the uplink signal.)

(4) The first instruction message indicates that when the number of antenna ports configured by the network device for the uplink transmission mode of the uplink signal is greater than 1 and the indicated precoding matrix corresponds to single-layer NC codewords, the terminal scales the transmit power of the uplink signal calculated according to the high-level parameters by a scaling factor of ½ when determining the transmit power of the uplink signal; when the number of antenna ports configured by the network device for the uplink transmission mode of the uplink signal is greater than 1 and the indicated precoding matrix corresponds to NC codewords of rank 3, the terminal scales the transmit power of the uplink signal calculated according to the high-level parameters by a scaling factor of ¾ when determining the transmit power of the uplink signal; otherwise, the transmit power of the uplink signal calculated according to the high-level parameters is not scaled or is scaled by a factor of 1. (Correspondingly, the network device assumes that the transmit power corresponding to the single-layer NC codewords should be scaled by ½, the transmit power corresponding to NC codewords corresponding to the rank 3 should be scaled by ¾, and the transmit power corresponding to other codewords is not scaled.)

(5) The first instruction message indicates that the number of antenna ports configured by the network device for the uplink transmission mode of the uplink signal is greater than 1. If the codebook subset restriction parameter "codebooksubset" of the uplink signal indicated by the network device is configured as "nonCoherent", then the UE does not scale the transmit power of the uplink signal calculated according to the high-level parameters, or scales it by a factor of 1. If the codebook subset restriction parameter "codebooksubset" of the uplink signal indicated by the network device is configured as "partialAndNonCoherent", when the precoding matrix indicated by the network device for the uplink signal corresponds to the single-layer NC codewords, the terminal scales the transmit power of the uplink signal calculated according to the high-level parameters by a scaling factor of ½ when determining the transmit power of the uplink signal; when the precoding matrix indicated by the network device for the uplink signal corresponds to NC codewords of rank 3, the terminal scales the transmit power of the uplink signal calculated according to the high-level parameters by a scaling factor of ¾ when determining the transmit power of the uplink signal; when the network device indicates other codewords, the transmit power of the uplink signal calculated according to the high-level parameters is not scaled or is scaled by a factor of 1. If the codebook subset restriction parameter "codebooksubset" is configured as "fullyAndPartialAndNonCoherent", the terminal scales the transmit power of the uplink signal calculated according to the high-level parameters by a ratio of the number of ports that send signals actually to the total number of ports configured by the network device for the transmission mode corresponding to the uplink signal when determining the transmission power of the uplink signal.

Here, the mode (4) and mode (5) directly indicate the power control scaling factors under various precoding indication information. In one embodiment, these power control scaling factors are determined according to the number of non-zero ports included in the precoding matrix of the uplink signal indicated by the network device, the total number of ports configured by the network device for the transmission mode corresponding to the uplink signal, and the number of transmission layers of the uplink signal indicated by the network device. In one embodiment, these power scaling factors are determined according to the number of coherent antenna groups associated with the precoding matrix of the uplink signal indicated by the network device, the total number of coherent antenna groups corresponding to the uplink signal transmission indicated by the network device, and the number of non-zero elements contained in the precoding matrix of the uplink signal indicated by the network device.

(6) If the precoding matrix of the uplink signal is non-coherent transmission codewords, the power control scaling factor is:

$$\beta = \min\left\{\frac{\rho_0}{\rho}, \frac{\rho}{R}\right\};$$

if the precoding matrix of the uplink signal is partial coherent transmission codewords, the power control scaling factor is:

$$\beta = \min\left\{\frac{\rho_0}{\rho}, \frac{\rho}{2R}\right\},$$

otherwise, $\beta=1$.

Here, R is the number of transmission layers of the uplink signal, $\rho_0$ is the number of ports of non-zero transmission corresponding to the precoding matrix of the uplink signal, and $\rho$ is the number of antenna ports configured by the network device for the uplink signal transmission.

(7) The power control scaling factor is:

$$\beta = \min\left\{1, \frac{\rho}{G}\right\}.$$

Here, $\rho$ is the number of antenna ports configured by the network device for the uplink signal transmission, and G is a coefficient related to the power capability of the terminal device.

In one embodiment, when the first instruction message instructs the terminal device to transmit at full uplink power, G=1. In one embodiment, when the first instruction message indicates that the sum of transmit powers of any two antenna ports (or any two ACs, or any two PAs) of the terminal device can reach the maximum power requirement, G=2.

(8) The power control scaling factor is $$\beta = \max\left\{1, \frac{K}{R}\right\}\frac{\rho_0}{\rho}.$$

R is the number of transmission layers of the uplink signal, K is a coefficient, $\rho_0$ is the number of ports of non-zero transmission corresponding to the precoding matrix of the uplink signal, and $\rho$ is the number of antenna ports configured by the network device for the uplink signal transmission. K is a coefficient related to the number of antenna ports of the uplink signal and the codebook subset restriction type corresponding to the uplink signal. For example, K is a coefficient related to the power capability of the terminal device.

In one embodiment, K is a coefficient related to the number of antenna ports of the uplink signal and the codebook subset restriction type corresponding to the uplink signal. When the uplink signal is transmitted with 2 antenna ports or 4 antenna ports, the value of K can be as shown in Table 1.

Under this rule, the power control scaling factor of the uplink signal indicated by each precoding matrix is as shown in Table 2, where Non-coherent TPMI is a codeword for non-coherent transmission, Partial coherent TPMI is a codeword for partial coherent transmission, and Fully coherent TPMI is a codeword for fully coherent transmission.

In one embodiment, when the first instruction message indicates that the terminal device can perform uplink transmission at full power, the terminal device adopts the power control scaling rule of (8) described above.

In one embodiment, the value of K is related to the power capability of the terminal device. For example, when the power capability of the terminal device is the capability that the transmit power of each antenna port (or each AC, or each PA) of the terminal device can reach the maximum power requirement, the value of K in Table 1 above is used.

In one embodiment, if the first instruction message indicates the capability that the transmit power of each antenna port of the terminal device can reach one half of the power requirement, or the sum of the transmit powers of any two antenna ports of the terminal device can reach the maximum transmit power requirement, the value of K is as shown in Table 3 when the uplink signal is transmitted with 2 antenna ports or 4 antenna ports.

Under this rule, the power control scaling factor of the uplink signal indicated by each precoding matrix in the case of 4 antenna ports is as shown in Table 4.

In one embodiment, when a single antenna port or AC of the terminal device does not need to meet a specific power requirement, the value of K is fixed to 1.

(9) The power control scaling factor is $$\beta = \frac{G}{G_0} \frac{\rho_0}{\rho}.$$

$G_0$ is the number of coherent antenna groups corresponding to the precoding matrix of the uplink signal, G is the maximum number of coherent antenna groups corresponding to all codewords in a codebook corresponding to the codebook subset restriction type of the uplink signal indicated by the network device to the terminal device, $\rho_0$ is the number of ports of non-zero transmission corresponding to the precoding matrix of the uplink signal, and ρ is the number of antenna ports configured by the network device for the uplink signal transmission.

In one embodiment, when the uplink signal is transmitted with 2 antenna ports or 4 antenna ports, the value of $G_0$ may be as shown in Table 5 above. ULCodebookSubset in Table 5 is an indication parameter of the codebook subset restriction type corresponding to the uplink signal indicated by the network device to the terminal device (e.g., indicated by the RRC signaling parameter ULCodebookSubset in the NR system).

Under this rule, the power control scaling factor of the uplink signal indicated by each precoding matrix in the case of 4 antenna ports is as shown in Table 6.

In one embodiment, when the first instruction message indicates that the transmit power of each antenna port (or each AC, or each PA) of the terminal device can reach the maximum power requirement or the terminal device can achieve the uplink transmission at full power, the terminal device adopts the power control scaling rule of (9) described above.

In a possible embodiment, the first instruction message is carried by the codebook subset restriction parameter (the high-level parameter "codebooksubset" in the 3GPP NR system) of the uplink signal sent by the network device for the terminal device. A possible power control scaling rule is: if the "codebooksubset" is "fullyAndPartialAndNonCoherent", the power control scaling rule corresponds to the above mode (3); if the "codebooksubset" is "partialAndNonCoherent", the power control scaling rule corresponds to the above mode (2); if "codebooksubset" is "nonCoherent", the power control scaling rule corresponds to the above mode (1). Another possible way is: if "codebooksubset" is "partialAndNonCoherent", the power control scaling rule may correspond to the above mode (1). If "codebooksubset" is "nonCoherent", the power control scaling rule may correspond to the above mode (1).

Compared with the existing uplink signal power control scheme, the advantage of the embodiments of the present application is: for the terminal device with the strong capability of antenna port or AC, when the terminal device performs the codebook-based uplink transmission, if the network device indicates NC codewords or PC (Partial Coherent) codewords, terminal device can perform uplink transmission at greater transmission power, which can improve the uplink transmission performance of the terminal device.

It should be noted that the embodiment of the present application can be used as a scaling rule for the transmit power of the uplink signal calculated according to the high-level parameters due to the MIMO transmission. In the current 3GPP NR system, the transmit power of the uplink signal calculated according to the high-layer signaling may correspond to $P_{PUSCH,b,f,c}$ (i, j, $q_d$, l) calculated in section 7.1.1 of TS38.213.

After the terminal device processes the power of the uplink signal according to the scaling rule, some further process of the scaled power obtained after the processing may be required. For example, the terminal device may determine the transmit power on each antenna port of the uplink signal according to the processed power. In this case, there is one or more antenna ports. For example, the terminal device evenly divides the obtained scaled power directly to each antenna port of non-zero transmission. For another example, if the uplink signal is transmitted simultaneously with signals of other carriers, the terminal device also needs to allocate the power by priorities according to the power allocation rule when the signals are transmitted simultaneously, then obtain the actual transmit power of the uplink signal and then evenly divides it to each antenna port of non-zero transmission.

It should be noted that the uplink signal in the embodiments of the present application may be a PUSCH or other uplink signal, e.g., Physical Uplink Control Channel (PUCCH), SRS (Sounding Reference Signal), and so on.

In an embodiment of the present application, the maximum power of uplink transmission may be at least in following way: in the 3GPP NR system, P-Max is the maximum transmit power of the uplink transmission configured by the network device for the terminal device, or the maximum transmit power of the uplink transmission specified by the protocol (see TS38.331, TS38.101 of 3GPP protocol). The maximum power of uplink transmission in the embodiment of the present application may correspond to the P-max. In one embodiment, the maximum power of uplink transmission in the embodiment of the present application corresponds to the maximum power corresponding to the uplink signal configured by the network device for the terminal. For example, when the uplink signal is a PUSCH, the maximum power of uplink transmission is the maximum transmit power configured by the network device for the PUSCH; when the uplink signal is a PUCCH, the maximum power of uplink transmission is the maximum transmit power configured by the network device for the PUCCH. Of course, the maximum power of uplink transmission may be configured through other parameters in other communication systems.

The power class of the terminal device may be at least in following way: the power class of the terminal device defined in the 3GPP protocol specification, for example, the protocols TS36.101, TS38.101-1, TS38.01-2, and TS38.101-3 define some power classes of terminal devices with some performance requirements formulated. The 3GPP NR system defaults the power class of the terminal device to the power class 3. If the terminal device supports other power class, it can report its power class to the network device through the indication information. In the NR system, the terminal device reports its power class to the network device through the parameters ue-CA-PowerClass-N, ue-PowerClass, etc. The "maximum output power corresponding to the power class of the terminal device" in the embodiment of the present application may correspond to the requirement for the maximum output power corresponding to the power class of the terminal device in the standard specification. For example, the maximum output power at each power class is stipulated in section 6.2 of TS38.101-1. For example, it is 23 dBm at the power class 3, and Class 3 also corresponds to 23 dBm in the UL MIMO. Of course, there may be other definitions for the power class in other systems. For example, the definition of the power class in the LTE system is different from the definition of the power class in the NR system.

The coherence capability of antennas of the terminal device or the codebook subset type supported by the terminal device may be at least in following way: the coherence capability of antennas of the terminal device can be reported by the terminal device to the network device through a parameter. This parameter may give a direct indication of the antennas of the terminal device that can transmit coherently and the grouping of the antennas for coherent transmission, or may give an indirect indication. For example, in the 3GPP NR system, the terminal device can be indicated by the parameter "pusch-TransCoherence" in the capability parameter "MIMO-ParametersPerBand" of the terminal device (see 3GPP protocol TS38.306 and TS38.331). The "pusch-TransCoherence" defines the uplink codebook subset type supported by the terminal device when precoding the PUSCH, and its value can be nonCoherent, partialNonCoherent, or fullCoherent. When the value of "pusch-TransCoherence" is nonCoherent, the terminal device only supports a codebook subset for non-coherent transmission. Since the codewords in the codebook subset for non-coherent transmission are all codewords of non-coherent transmission type, it can be considered that "pusch-TransCoherence" takes the value nonCoherent, which corresponds to all antennas of the terminal device not being able to transmit coherently (correspondingly, the coherent capability of antennas is: all the antennas cannot transmit coherently). When the value of "pusch-TransCoherence" is partialNonCoherent, the terminal device only supports a codebook subset for non-coherent transmission and a codebook subset for partial coherent transmission. Since the codewords in the codebook subset for partial coherent transmission are all codewords of partial coherent transmission type, it can be considered that "pusch-TransCoherence" takes the value partialNonCoherent, which corresponds to the antennas in the same coherent transmission group of the terminal device being able to transmit coherently (correspondingly, the coherent capability of antennas of the terminal device is: partial antennas can transmit coherently). When the value of "pusch-TransCoherence" is fullCoherent, the terminal device supports a codebook subset for non-coherent transmission, a codebook subset for partial coherent transmission, and a codebook subset for fully coherent transmission, that is, all codewords in the codebook. At this time, it can be considered that "pusch-TransCoherence" takes the value fullCoherent, which corresponds to all antennas of the terminal device being able to transmit coherently (correspondingly, the coherent capability of antennas of the terminal device is: all the antennas can transmit coherently).

In summary, in the embodiments of the present application, the power control scaling rule of the uplink signal is determined according to the power capability of the terminal device, and/or the power control scaling rule is determined according to the first instruction message from the network device, to scale the power of the uplink signal according to the scaling rule, so that the UE with the partial antenna coherent transmission capability and non-coherent transmission capability can reach the maximum transmit power during the low-rank transmission, thereby improving the performance of the UE at the edge of the cell.

It should be noted that, in the embodiments of the present application, the codewords in the uplink codebook can be divided into at least three coherent types (or called coherent transmission types), which are: fully coherent, partial coherent and non-coherent codewords (or called fully coherent transmission codewords, partial coherent transmission codewords and non-coherent transmission codewords). Here, any column in the partial coherent transmission codewords has only non-zero elements corresponding to the same coherent transmission antenna group (in the 3GPP NR system, the first and third antennas form a coherent transmission antenna group, and the second and fourth antennas form another coherent transmission antenna group); any column in the non-coherent transmission codewords has only non-zero elements corresponding to one antenna; all the elements in at least one column in the fully coherent transmission codewords are non-zero. For ease of understanding, the following tables list the uplink codebooks in the 3GPP NR system and give the specific codeword types.

For example, in the following table, the codewords with TPMI index of 0 to 1 are codewords for non-coherent transmission; and other codewords are codewords for fully coherent transmission.

TABLE 6.3.1.5-1

Precoding matrix W for single-layer transmission using two antenna ports.
(3GPP protocol TS38.211)

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

For example, in the following table, the codewords with TPMI index of 0 to 3 are codewords for non-coherent transmission; the codewords with TPMI index of 4 to 11 are codewords for partial coherent transmission; and other codewords are codewords for fully coherent transmission.

TABLE 6.3.1.5-2

Precoding matrix W for single-layer transmission using four antenna ports with transform precoding enabled. (3GPP protocol TS38.211)

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

For example, in the following table, the codewords with TPMI index of 0 to 3 are codewords for non-coherent transmission; the codewords with TPMI index of 4 to 11 are codewords for partial coherent transmission; and other codewords are codewords for fully coherent transmission.

TABLE 6.3.1.5-3

Precoding matrix W for single-layer transmission using four antenna ports with transform precoding disabled. (3GPP protocol TS38.211)

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |

TABLE 6.3.1.5-3-continued

Precoding matrix W for single-layer transmission using four antenna ports with transform precoding disabled. (3GPP protocol TS38.211)

| TPMI index | W (ordered from left to right in increasing order of TPMI index) |
|---|---|
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

For example, in the following table, the codewords with TPMI index of 0 are codewords for non-coherent transmission; and the codewords with TPMI index of 1 to 2 are codewords for fully coherent transmission.

TABLE 6.3.1.5-4

Precoding matrix W for two-layer transmission using two antenna ports with transform precoding disabled. (3GPP protocol TS38.211)

| TPMI index | W (ordered from left to right in increasing order of TPMI index) |
|---|---|
| 0-2 | $\frac{1}{\sqrt{2}}\begin{bmatrix}1 & 0\\0 & 1\end{bmatrix}$ $\frac{1}{2}\begin{bmatrix}1 & 1\\1 & -1\end{bmatrix}$ $\frac{1}{2}\begin{bmatrix}1 & 1\\j & -j\end{bmatrix}$ |

For example, in the following table, the codewords with TPMI index of 0 to 5 are codewords for non-coherent transmission; the codewords with TPMI index of 6 to 13 are codewords for partial coherent transmission; and other codewords are codewords for fully coherent transmission.

TABLE 6.3.1.5-5

Precoding matrix W for two-layer transmission using four antenna ports with transform precoding disabled. (3GPP protocol TS38.211)

| TPMI index | W (ordered from left to right in increasing order of TPMI index) |
|---|---|
| 0-3 | $\frac{1}{2}\begin{bmatrix}1 & 0\\0 & 1\\0 & 0\\0 & 0\end{bmatrix}$ $\frac{1}{2}\begin{bmatrix}1 & 0\\0 & 0\\0 & 1\\0 & 0\end{bmatrix}$ $\frac{1}{2}\begin{bmatrix}1 & 0\\0 & 0\\0 & 0\\0 & 1\end{bmatrix}$ $\frac{1}{2}\begin{bmatrix}0 & 0\\1 & 0\\0 & 1\\0 & 0\end{bmatrix}$ |
| 4-7 | $\frac{1}{2}\begin{bmatrix}0 & 0\\1 & 0\\0 & 0\\0 & 1\end{bmatrix}$ $\frac{1}{2}\begin{bmatrix}0 & 0\\0 & 0\\1 & 0\\0 & 1\end{bmatrix}$ $\frac{1}{2}\begin{bmatrix}1 & 0\\0 & 1\\1 & 0\\0 & -j\end{bmatrix}$ $\frac{1}{2}\begin{bmatrix}1 & 0\\0 & 1\\1 & 0\\0 & j\end{bmatrix}$ |
| 8-11 | $\frac{1}{2}\begin{bmatrix}1 & 0\\0 & 1\\-j & 0\\0 & 1\end{bmatrix}$ $\frac{1}{2}\begin{bmatrix}1 & 0\\0 & 1\\-j & 0\\0 & -1\end{bmatrix}$ $\frac{1}{2}\begin{bmatrix}1 & 0\\0 & 1\\-1 & 0\\0 & -j\end{bmatrix}$ $\frac{1}{2}\begin{bmatrix}1 & 0\\0 & 1\\-1 & 0\\0 & j\end{bmatrix}$ |
| 12-15 | $\frac{1}{2}\begin{bmatrix}1 & 0\\0 & 1\\j & 0\\0 & 1\end{bmatrix}$ $\frac{1}{2}\begin{bmatrix}1 & 0\\0 & 1\\j & 0\\0 & -1\end{bmatrix}$ $\frac{1}{2\sqrt{2}}\begin{bmatrix}1 & 1\\1 & 1\\1 & -1\\1 & -1\end{bmatrix}$ $\frac{1}{2\sqrt{2}}\begin{bmatrix}1 & 1\\1 & 1\\j & -j\\j & -j\end{bmatrix}$ |

TABLE 6.3.1.5-5-continued

Precoding matrix W for two-layer transmission using four antenna ports with transform precoding disabled. (3GPP protocol TS38.211)

| TPMI index | W (ordered from left to right in increasing order of TPMI index) |
|---|---|
| 16-19 | $\frac{1}{2\sqrt{2}}\begin{bmatrix} 1 & 1 \\ j & j \\ 1 & -1 \\ j & -j \end{bmatrix} \quad \frac{1}{2\sqrt{2}}\begin{bmatrix} 1 & 1 \\ j & j \\ j & -j \\ -1 & 1 \end{bmatrix} \quad \frac{1}{2\sqrt{2}}\begin{bmatrix} 1 & 1 \\ -1 & -1 \\ 1 & -1 \\ -1 & 1 \end{bmatrix} \quad \frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix} \quad \frac{1}{2\sqrt{2}}\begin{bmatrix} 1 & 1 \\ -j & -j \\ j & -j \\ 1 & -1 \end{bmatrix}$ — — |

For example, in the following table, the codewords with TPMI index of 0 are codewords for non-coherent transmission; the codewords with TPMI index of 1 to 2 are codewords for partial coherent transmission; and other codewords are codewords for fully coherent transmission.

TABLE 6.3.1.5.4-6

Precoding matrix W for three-layer transmission using four antenna ports with transform precoding disabled. (3GPP protocol TS38.211)

| TPMI index | W (ordered from left to right in increasing order of TPMI index) |
|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix} \quad \frac{1}{2}\begin{bmatrix} 1 & 0 & 0 \\ 0 & 1 & 0 \\ 1 & 0 & 0 \\ 0 & 0 & 1 \end{bmatrix} \quad \frac{1}{2}\begin{bmatrix} 1 & 0 & 0 \\ 0 & 1 & 0 \\ -1 & 0 & 0 \\ 0 & 0 & 1 \end{bmatrix} \quad \frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix} \quad \frac{1}{2\sqrt{3}}\begin{bmatrix} 1 & 1 & 1 \\ -1 & 1 & -1 \\ 1 & 1 & -1 \\ -1 & 1 & 1 \end{bmatrix} \quad \frac{1}{2\sqrt{3}}\begin{bmatrix} 1 & 1 & 1 \\ -1 & 1 & -1 \\ j & j & -j \\ -j & j & j \end{bmatrix}$ — |

For example, in the following table, the codewords with TPMI index of 0 are codewords for non-coherent transmission; the codewords with TPMI index of 1 to 2 are codewords for partial coherent transmission; and other codewords are codewords for fully coherent transmission.

TABLE 6.3.1.5-7

Precoding matrix W for four-layer transmission using four antenna ports with transform precoding disabled. (3GPP protocol TS38.211)

| TPMI index | W (ordered from left to right in increasing order of TPMI index) |
|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad \frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix} \quad \frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix} \quad \frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ — — — |

The devices provided by the embodiments of the application will be introduced below with reference to the drawings of the specification.

Figure 2:
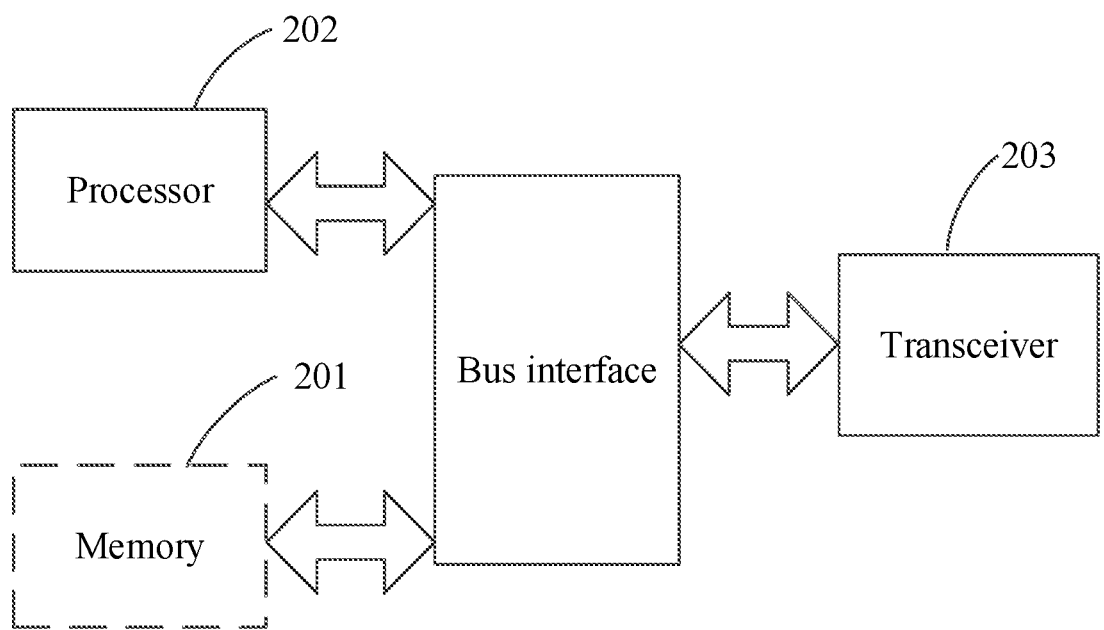
FIG. 2 is a structural schematic diagram of a terminal device provided by an embodiment of the present application.

Referring to FIG. 2, based on the same inventive concept, an embodiment of the present application provides a terminal device, which includes a memory 201, a processor 202 and a transceiver 203. The memory 201 and the transceiver 203 may be connected to the processor 202 through a bus interface (taking this as an example in FIG. 2), or may be connected to the processor 202 through special connection lines.

Here, the memory 201 may be configured to store programs. The transceiver 203 is configured to receive and send the data under the control of the processor 202. The processor 202 may be configured to read the programs in the memory 201 to perform the process of:

determining a power control scaling rule of an uplink signal according to the power capability of a terminal device, and/or determining the power control scaling rule according to a first instruction message from a network device;

processing the transmit power of the uplink signal according to the scaling rule, and determining the transmit power on each antenna port of the uplink signal according to the processed transmit power.

In one embodiment, the power capability of the terminal device includes:

default power capability; or power capability indicated by a power capability indication message sent by the terminal device to the network device.

In one embodiment, the power capability indication message includes a first signaling parameter, and the first signaling parameter includes multiple candidate values or multiple states, where different candidate values indicate different power capabilities, and different states indicate different power capabilities.

In one embodiment, the power capability indication message includes at least one of:

type information of the terminal device;

power class information of the terminal device;

coherent capability information of antennas of the terminal device;

codebook subset type supported by the terminal device.

In one embodiment, the power capability includes at least one of:

capability of the terminal device on transmit power of an Antenna Connector (AC);

capability of the terminal device on transmit power of an antenna port;

capability of the terminal device on transmit power of a Power Amplifier (PA);

capability of the terminal device on supporting full power transmission for one or more layers when the uplink signal is in a codebook-based uplink transmission mode;

indicated capability on whether the terminal device supports UL full power transmission;

indicated capability on whether the terminal device supports full power transmission for the uplink signal in a codebook-based uplink transmission mode;

indicated capability on whether the terminal device supports full power transmission with single-layer transmission for the uplink signal in a codebook-based uplink transmission mode;

indicated capability on whether the terminal device supports full power transmission for the uplink signal in a non-codebook based uplink transmission mode;

indicated capability on whether the terminal device supports full power transmission with single-layer transmission for the uplink signal in a non-codebook based uplink transmission mode;

indicated capability on whether the terminal device can use a codebook beyond its antenna coherence capability.

In one embodiment, the power capability includes:

capability of the terminal device on transmit power of each AC; or capability of the terminal device on transmit power of each AC for the uplink signal in the codebook-based uplink transmission mode; or capability of the terminal device on transmit power of each AC corresponding to a coherent antenna group; or capability of the terminal device on transmit power of each AC corresponding to a coherent antenna group for the uplink signal in the codebook-based uplink transmission mode; or capability of the terminal device on transmit power of each PA; or capability of the terminal device on transmit power of each PA for the uplink signal in the codebook-based uplink transmission mode; or capability of the terminal device on transmit power of each PA corresponding to a coherent antenna group; or capability of the terminal device on transmit power of each PA corresponding to a coherent antenna group for the uplink signal in the codebook-based uplink transmission mode; or capability of the terminal device on transmit power of each antenna port; or capability of the terminal device on transmit power of each antenna port for the uplink signal in the codebook-based uplink transmission mode; or capability of the terminal device on transmit power of each antenna corresponding to a coherent antenna group; or capability of the terminal device on transmit power of each antenna corresponding to a coherent antenna group for the uplink signal in the codebook-based uplink transmission mode; or capability of the terminal device on transmit power corresponding to each coherent antenna group; or capability of the terminal device on transmit power corresponding to each coherent antenna group for the uplink signal in the codebook-based uplink transmission mode.

In one embodiment, the power capability includes at least one of:

capability of the terminal device on the sum of transmit powers of any group of coherent antenna groups can reach the maximum output power corresponding to the power class of the terminal device;

capability of the terminal device on the sum of transmit powers of all ACs or all PAs or all antenna ports can reach the maximum output power corresponding to the power class of the terminal device;

capability of the terminal device on the transmit power of at least one AC can reach the maximum output power corresponding to the power class of the terminal device;

capability of the terminal device on the sum of transmit powers of at least N ACs can reach the maximum output power corresponding to the power class of the terminal device, where N is a positive integer;

capability of the terminal device on each AC can reach one $M^{th}$ of the maximum output power corresponding to the power class of the terminal device, where M is a positive integer;

capability of the terminal device on the sum of transmit powers of any Q ACs can reach the maximum output power corresponding to the power class of the terminal device, where Q is a positive integer;

capability of the terminal device on the transmit power of at least one PA can reach the maximum output power corresponding to the power class of the terminal device;

capability of the terminal device on the sum of transmit powers of at least N PAs of the terminal device can reach the maximum output power corresponding to the power class of the terminal device, where N is a positive integer;

capability of the terminal device on the transmit power of each PA can reach one $M^{th}$ of the maximum output power corresponding to the power class of the terminal device, where M is a positive integer;

capability of the terminal device on the sum of transmit powers of any Q PAs can reach the maximum output power corresponding to the power class of the terminal device, where Q is a positive integer;

capability of the terminal device on the transmit power of at least one antenna port can reach the maximum output power corresponding to the power class of the terminal device;

capability of the terminal device on the sum of transmit powers of at least N antenna ports can reach the maximum output power corresponding to the power class of the terminal device, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer;

capability of the terminal device on the transmit power of at least one AC can reach the maximum output power corresponding to the power class of the terminal device for the uplink signal in the codebook-based uplink transmission mode;

capability of the terminal device on the sum of transmit powers of at least N ACs can reach the maximum output power corresponding to the power class of the terminal device for the uplink signal in the codebook-based uplink transmission mode, where N is a positive integer;

capability of the terminal device on the transmit power of each AC can reach one $M^{th}$ of the maximum output power corresponding to the power class of the terminal device for the uplink signal in the codebook-based uplink transmission mode, where M is a positive integer;

capability of the terminal device on the sum of transmit powers of any Q ACs can reach the maximum output power corresponding to the power class of the terminal device for the uplink signal in the codebook-based uplink transmission mode, where Q is a positive integer;

capability of the terminal device on the transmit power of at least one PA can reach the maximum output power corresponding to the power class of the terminal device for the uplink signal in the codebook-based uplink transmission mode;

capability of the terminal device on the sum of transmit powers of at least N PAs can reach the maximum output power corresponding to the power class of the terminal device for the uplink signal in the codebook-based uplink transmission mode, where N is a positive integer;

capability of the terminal device on the transmit power of each PA can reach one $M^{th}$ of the maximum output power corresponding to the power class of the terminal device for the uplink signal in the codebook-based uplink transmission mode, where M is a positive integer;

capability of the terminal device on the sum of transmit powers of any Q PAs can reach the maximum output power corresponding to the power class of the terminal device for the uplink signal in the codebook-based uplink transmission mode, and Q is a positive integer;

capability of the terminal device on the transmit power of at least one antenna port can reach the maximum output power corresponding to the power class of the terminal device for the uplink signal in the codebook-based uplink transmission mode;

capability of the terminal device on the sum of transmit powers of at least N antenna ports can reach the maximum output power corresponding to the power class of the terminal device for the uplink signal in the codebook-based uplink transmission mode, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer.

In one embodiment, N is the number of antenna ports corresponding to the uplink MIMO; M is the maximum number of antenna ports that the terminal device can transmit coherently.

In one embodiment, the power capability indication message does not contain the power class of the terminal device, and determining the power control scaling rule of the uplink signal according to the power capability includes:

determining the power control scaling rule of the uplink signal according to the power capability and the power class of the terminal device;

where the power class of the terminal device is indicated by the network device, or reported by the terminal device.

In one embodiment, determining the power control scaling rule of the uplink signal according to the power capability, includes:

determining the power control scaling rule according to the power capability and at least one of the following parameters, and the parameters include:

the number of antenna ports configured by the network device for the uplink signal transmission;

a precoding matrix corresponding to the uplink signal;

a codebook subset restriction type corresponding to the uplink signal;

the number of transmission layers corresponding to the uplink signal;

maximum power of uplink transmission.

In one embodiment, the parameters include a precoding matrix corresponding to the uplink signal, and determining the power control scaling rule according to the power capability and the at least one parameter includes:

determining the power control scaling rule according to the power capability and the number of coherent antenna groups associated with non-zero elements in the precoding matrix corresponding to the uplink signal; or determining the power control scaling rule according to the power capability and a codeword coherent transmission type corresponding to the precoding matrix corresponding to the uplink signal; or determining the power control scaling rule according to the power capability, the number of coherent antenna groups associated with non-zero elements in the precoding matrix corresponding to the uplink signal, and the number of antenna ports configured by the network device for transmission of the uplink signal; or determining the power control scaling rule according to the power capability, a codeword coherent transmission type corresponding to the precoding matrix corresponding to the uplink signal, and the number of antenna ports configured for transmission of the uplink signal; or determining the power control scaling rule according to the power capability, a codeword coherent transmission type corresponding to the precoding matrix corresponding to the uplink signal, and the number of transmission layers corresponding to the uplink signal; or determining the power control scaling rule according to the power capability, a coherent transmission type corresponding to the precoding matrix corresponding to the uplink signal, the number of transmission layers corresponding to the uplink signal, and the number of antenna ports configured by the network device for transmission of the uplink signal.

In one embodiment, the parameters include the codebook subset restriction type corresponding to the uplink signal, and the processor 202 is specifically configured to:

determine the power control scaling rule according to the power capability, the codebook subset restriction type corresponding to the uplink signal, and the number of antenna ports configured by the network device for transmission of the uplink signal; or determine the power control scaling rule according to the power capability, the codebook subset restriction type corresponding to the uplink signal, the number of transmission layers corresponding to the uplink signal, and the number of antenna ports configured by the network device for transmission of the uplink signal; or determine the power control scaling rule according to the power capability, the codebook subset restriction type corresponding to the uplink signal, and a coherent transmission type corresponding to the precoding matrix corresponding to the uplink signal; or determine the power control scaling rule according to the power capability, the codebook subset restriction type corresponding to the uplink signal, a coherent transmission type corresponding to the precoding matrix corresponding to the uplink signal, and the number of antenna ports configured by the network device for transmission of the uplink signal; or determine the power control scaling rule according to the power capability, the codebook subset restriction type corresponding to the uplink signal, a coherent transmission type corresponding to the precoding matrix corresponding to the uplink signal, the number of transmission layers corresponding to the uplink signal, and the number of antenna ports configured by the network device for transmission of the uplink signal.

In one embodiment, the processor 202 is specifically configured to:

determine the power control scaling rule as a first power control scaling rule when the power capability and the at least one parameter satisfy a first preset condition.

In one embodiment, the processor 202 is specifically configured to:

determine the power control scaling rule as a second power control scaling rule when the power capability satisfies a second preset condition.

In one embodiment, the processor 202 is specifically further configured to:

receive a codebook subset restriction parameter from the network device, where the codebook subset restriction parameter carries the first instruction message.

In one embodiment, the first instruction message carries a first parameter, the first parameter indicates the type of the power control scaling rule, and different types correspond to different power control scaling rules.

In one embodiment, the first instruction message carries a second parameter, the second parameter indicates whether the terminal device uses the full power to transmit an uplink signal.

In one embodiment, determining the power control scaling rule according to the first instruction message, includes:

determining the power control scaling rule as a third power control scaling rule when the first instruction message satisfies a third preset condition.

In one embodiment, the power control scaling rule is at least one of:

not scaling the transmit power, calculated according to high-level parameters, of the uplink signal;

scaling the transmit power, calculated according to high-level parameters, of the uplink signal with a power control scaling factor.

In one embodiment, the processor 202 is specifically configured to that:

the second preset condition is that the transmit power of each antenna port or AC or PA of the terminal device reaches a maximum output power requirement corresponding to a power class of the terminal device, and the power control scaling rule is not scaling the transmit power, calculated according to high-level parameters, of the uplink signal or scaling the transmit power, calculated according to high-level parameters, of the uplink signal with a power control scaling factor of 1; or the third preset condition is that the first instruction message instructs the terminal device to transmit the uplink signal at full power, and the power control scaling rule is not scaling the transmit power, calculated according to high-level parameters, of the uplink signal or scaling the transmit power, calculated according to high-level parameters, of the uplink signal with a power control scaling factor of 1; or the first preset condition is that the transmit power of each antenna port or AC or PA of the terminal device reaches one half of the maximum output power requirement corresponding to a power class of the terminal device, the number of antenna ports configured by the network device for an uplink transmission mode of the uplink signal is greater than 1, and an indicated precoding matrix corresponds to a precoding matrix of single-layer NC transmission, and the power control scaling rule is scaling the transmit power, calculated according to high-level parameters, of the uplink signal with a power control scaling factor of ½; or the first preset condition is that the transmit power of each antenna port or AC or PA of the terminal device reaches a quarter of the maximum output power requirement corresponding to a power class of the terminal device, the number of antenna ports configured by the network device for an uplink transmission mode of the uplink signal is greater than 1, and an indicated precoding matrix corresponds to a precoding matrix of three-layer NC transmission, and the power control scaling rule is scaling the transmit power, calculated according to high-level parameters, of the uplink signal with a power control scaling factor of ¾; or the second preset condition is that the transmit power of each antenna port or AC or PA of the terminal device reaches a quarter of the maximum output power requirement corresponding to a power class of the terminal device, or a single antenna port or AC or PA of the terminal device does not reach a specific requirement, or the terminal device does not report the capability of each antenna port or AC or PA, or a communication protocol does not formulate a performance requirement for each antenna port or AC or PA of the terminal device, and the power control scaling rule is scaling the transmit power, calculated according to high-level parameters, of the uplink signal with a ratio of an actual number of ports for sending signals to the total number of ports configured by the network device for a transmission mode corresponding to the uplink signal; or the second preset condition is that the transmit power of each antenna port, or AC, or PA of the terminal device reaches the maximum power of uplink transmission, and the power control scaling rule is not scaling the transmit power, calculated according to high-level parameters, of the uplink signal or scaling the transmit power, calculated according to high-level parameters, of the uplink signal with a power control scaling factor of 1; or the first preset condition is that the power capability of the terminal device is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of single-layer NC transmission, and the power control scaling rule is scaling the transmit power, calculated according to high-level parameters, of the uplink signal with a power control scaling factor of ½; or the first preset condition is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of three-layer NC transmission, and the power control scaling rule is scaling the transmit power, calculated according to high-level parameters, of the uplink signal with a power control scaling factor of ¾; or the second preset condition is that the transmit power of each antenna port, or AC, or PA of the terminal device reaches a quarter of the maximum power of uplink transmission, or a single antenna port of the terminal device does not reach a specific requirement, or the terminal device does not report the capability of each antenna port, or a communication protocol does not formulate a performance requirement for each antenna port, or AC, or PA of the terminal device, and the power control scaling rule is scaling the transmit power, calculated according to high-level parameters, of the uplink signal with a ratio of an actual number of ports for sending signals to the total number of ports configured by the network device for a transmission mode corresponding to the uplink signal.

In one embodiment, the processor 202 is specifically configured to:

scale the transmit power, calculated according to high-level parameters, of the uplink signal with a power control scaling factor, where:

when a precoding matrix of the uplink signal is non-coherent transmission precoding matrix, the power control scaling factor is $$\beta = \min\left\{\frac{\rho_0}{\rho}, \frac{\rho}{R}\right\};$$

or when a precoding matrix of the uplink signal is partial coherent transmission precoding matrix, the power control scaling factor is $$\beta = \min\left\{\frac{\rho_0}{\rho}, \frac{\rho}{2R}\right\};$$

or when a precoding matrix of the uplink signal is full-coherent transmission precoding matrix the power control scaling factor is $\beta=1$;

where R is the number of transmission layers of the uplink signal, $\rho_0$ is the number of ports of non-zero transmission corresponding to the precoding matrix of the uplink signal, and $\rho$ is the number of antenna ports configured by the network device for the uplink signal transmission.

In one embodiment, the processor 202 is specifically configured to:

scale the transmit power, calculated according to high-level parameters, of the uplink signal with a power control scaling factor, and:

the power control scaling factor is $$\beta = \min\left\{1, \frac{\rho}{G}\right\};$$

where $\rho$ is the number of antenna ports configured by the network device for the uplink signal MIMO transmission, and G is a coefficient related to the power capability of the terminal device; or the power control scaling factor is $$\beta = \max\left\{1, \frac{K}{R}\right\}\frac{\rho_0}{\rho},$$

where R is the number of transmission layers of the uplink signal, K is a coefficient, $\rho_0$ is the number of ports of non-zero transmission corresponding to the precoding matrix of the uplink signal, and $\rho$ is the number of antenna ports configured by the network device for the uplink signal transmission; or the power control scaling factor is $$\beta = \frac{G}{G_0}\frac{\rho_0}{\rho},$$

where R is the number of transmission layers of the uplink signal, $G_0$ is the number of coherent antenna groups corresponding to the precoding matrix of the uplink signal, G is the maximum number of coherent antenna groups, indicated by the network device to the terminal device, corresponding to all precoding matrices in a codebook corresponding to the codebook subset restriction type of the uplink signal, $\rho_0$ is the number of ports of non-zero transmission corresponding to the precoding matrix of the uplink signal, and $\rho$ is the number of antenna ports configured by the network device for transmission of the uplink signal.

In one embodiment, K is a coefficient related to the number of antenna ports of the uplink signal and the codebook subset restriction type corresponding to the uplink signal; or K is a coefficient related to the power capability of the terminal device.

Here, in FIG. 2, the bus architecture may include any numbers of interconnected buses and bridges, and specifically link various circuits of one or more processors represented by the processor 202 and the memory represented by the memory 201. The bus architecture may further link various other circuits such as peripheral device, voltage regulator and power management circuit, which are all well known in the art and thus will not be further described again herein. The bus interface provides an interface. The transceiver 203 may be a plurality of elements, i.e., include a transmitter and a receiver, and provide the devices for communicating with various other devices over the transmission media. The processor 202 is responsible for managing the bus architecture and general processing, and the memory 201 may store the data used by the processor 202 when performing the operations.

In one embodiment, the memory 201 may include a Read Only Memory (ROM), a Random Access Memory (RAM), and a magnetic disk memory. The memory 201 is used to store the data required by the processor 202 when running, that is, store the instructions that can be executed by at least one processor 202. The at least one processor 202 performs the signal processing method of the wireless communication system provided by the embodiment shown in FIG. 1 by executing the instructions stored in the memory 201. Here, the number of memories 201 is one or more. Here, the memory 201 is shown together in FIG. 2, but it should be known that the memory 201 is not a mandatory functional module, so it is shown by broken lines in FIG. 2.

Figure 3:
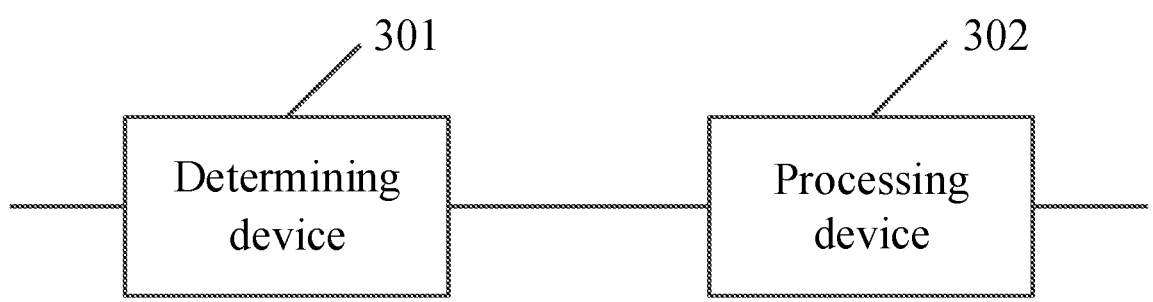
FIG. 3 is a structural schematic diagram of another terminal device provided by an embodiment of the present application.

Referring to FIG. 3, based on the same inventive concept, an embodiment of the present application provides a terminal device, which includes a determining device 301 and a processing device 302.

Here, the determining device 301 is configured to determine a power control scaling rule of an uplink signal according to a power capability of a terminal device, and/or determine the power control scaling rule according to a first instruction message from a network device. The processing device 302 is configured to process the transmit power of the uplink signal according to the scaling rule, and determine the transmit power on each antenna port of the uplink signal according to the processed transmit power.

In one embodiment, the power capability of the terminal device includes:

default power capability; or power capability indicated by a power capability indication message sent by the terminal device to the network device.

In one embodiment, the power capability indication message includes a first signaling parameter, and the first signaling parameter includes multiple candidate values or multiple states, where different candidate values indicate different power capabilities, and different states indicate different power capabilities.

In one embodiment, the power capability indication message includes at least one of:

type information of the terminal device;

power class information of the terminal device;

coherent capability information of antennas of the terminal device;

codebook subset type supported by the terminal device.

In one embodiment, the power capability includes at least one of:

capability of the terminal device on transmit power of an Antenna Connector (AC);

capability of the terminal device on transmit power of an antenna port;

capability of the terminal device on transmit power of a Power Amplifier (PA);

capability of the terminal device on supporting full power transmission for one or more layers when the uplink signal is in a codebook-based uplink transmission mode;

indicated capability on whether the terminal device supports UL full power transmission;

indicated capability on whether the terminal device supports full power transmission for the uplink signal in a codebook-based uplink transmission mode;

indicated capability on whether the terminal device supports full power transmission with single-layer transmission for the uplink signal in a codebook-based uplink transmission mode;

indicated capability on whether the terminal device supports full power transmission for the uplink signal in a non-codebook based uplink transmission mode;

indicated capability on whether the terminal device supports full power transmission with single-layer transmission for the uplink signal in a non-codebook based uplink transmission mode;

indicated capability on whether the terminal device can use a codebook beyond its antenna coherence capability.

In one embodiment, the power capability includes:

capability of the terminal device on transmit power of each AC; or capability of the terminal device on transmit power of each AC for the uplink signal in the codebook-based uplink transmission mode; or capability of the terminal device on transmit power of each AC corresponding to a coherent antenna group; or capability of the terminal device on transmit power of each AC corresponding to a coherent antenna group for the uplink signal in the codebook-based uplink transmission mode; or capability of the terminal device on transmit power of each PA; or capability of the terminal device on transmit power of each PA for the uplink signal in the codebook-based uplink transmission mode; or capability of the terminal device on transmit power of each PA corresponding to a coherent antenna group; or capability of the terminal device on transmit power of each PA corresponding to a coherent antenna group for the uplink signal in the codebook-based uplink transmission mode; or capability of the terminal device on transmit power of each antenna port; or capability of the terminal device on transmit power of each antenna port for the uplink signal in the codebook-based uplink transmission mode; or capability of the terminal device on transmit power of each antenna corresponding to a coherent antenna group; or capability of the terminal device on transmit power of each antenna corresponding to a coherent antenna group for the uplink signal in the codebook-based uplink transmission mode; or capability of the terminal device on transmit power corresponding to each coherent antenna group; or capability of the terminal device on transmit power corresponding to each coherent antenna group for the uplink signal in the codebook-based uplink transmission mode.

In one embodiment, the power capability includes at least one of:

capability of the terminal device on the sum of transmit powers of any group of coherent antenna groups can reach the maximum output power corresponding to the power class of the terminal device;

capability of the terminal device on the sum of transmit powers of all ACs or all PAs or all antenna ports can reach the maximum output power corresponding to the power class of the terminal device;

capability of the terminal device on the transmit power of at least one AC can reach the maximum output power corresponding to the power class of the terminal device;

capability of the terminal device on the sum of transmit powers of at least N ACs can reach the maximum output power corresponding to the power class of the terminal device, where N is a positive integer;

capability of the terminal device on each AC can reach one $M^{th}$ of the maximum output power corresponding to the power class of the terminal device, where M is a positive integer;

capability of the terminal device on the sum of transmit powers of any K ACs can reach the maximum output power corresponding to the power class of the terminal device, where K is a positive integer;

capability of the terminal device on the transmit power of at least one PA can reach the maximum output power corresponding to the power class of the terminal device;

capability of the terminal device on the sum of transmit powers of at least N PAs of the terminal device can reach the maximum output power corresponding to the power class of the terminal device, where N is a positive integer;

capability of the terminal device on the transmit power of each PA can reach one $M^{th}$ of the maximum output power corresponding to the power class of the terminal device, where M is a positive integer;

capability of the terminal device on the sum of transmit powers of any K PAs can reach the maximum output power corresponding to the power class of the terminal device, where K is a positive integer;

capability of the terminal device on the transmit power of at least one antenna port can reach the maximum output power corresponding to the power class of the terminal device;

capability of the terminal device on the sum of transmit powers of at least N antenna ports can reach the maximum output power corresponding to the power class of the terminal device, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer;

capability of the terminal device on the transmit power of at least one AC can reach the maximum output power corresponding to the power class of the terminal device for the uplink signal in the codebook-based uplink transmission mode;

capability of the terminal device on the sum of transmit powers of at least N ACs can reach the maximum output power corresponding to the power class of the terminal device for the uplink signal in the codebook-based uplink transmission mode, where N is a positive integer;

capability of the terminal device on the transmit power of each AC can reach one Mtn of the maximum output power corresponding to the power class of the terminal device for the uplink signal in the codebook-based uplink transmission mode, where M is a positive integer;

capability of the terminal device on the sum of transmit powers of any Q ACs can reach the maximum output power corresponding to the power class of the terminal device for the uplink signal in the codebook-based uplink transmission mode, where Q is a positive integer;

capability of the terminal device on the transmit power of at least one PA can reach the maximum output power corresponding to the power class of the terminal device for the uplink signal in the codebook-based uplink transmission mode;

capability of the terminal device on the sum of transmit powers of at least N PAs can reach the maximum output power corresponding to the power class of the terminal device for the uplink signal in the codebook-based uplink transmission mode, where N is a positive integer;

capability of the terminal device on the transmit power of each PA can reach one Mtn of the maximum output power corresponding to the power class of the terminal device for the uplink signal in the codebook-based uplink transmission mode, where M is a positive integer;

capability of the terminal device on the sum of transmit powers of any Q PAs can reach the maximum output power corresponding to the power class of the terminal device for the uplink signal in the codebook-based uplink transmission mode, and Q is a positive integer;

capability of the terminal device on the transmit power of at least one antenna port can reach the maximum output power corresponding to the power class of the terminal device for the uplink signal in the codebook-based uplink transmission mode;

capability of the terminal device on the sum of transmit powers of at least N antenna ports can reach the maximum output power corresponding to the power class of the terminal device for the uplink signal in the codebook-based uplink transmission mode, where N is a positive integer;

capability of the terminal device on the transmit power of each antenna port can reach one $M^{th}$ of the maximum output power corresponding to the power class of the terminal device for the uplink signal in the codebook-based uplink transmission mode, where M is a positive integer;

capability of the terminal device on the sum of transmit powers of any Q antenna ports can reach the maximum output power corresponding to the power class of the terminal device for the uplink signal in the codebook-based uplink transmission mode, where Q is a positive integer.

In one embodiment, N is the number of antenna ports corresponding to the uplink MIMO; M is the maximum number of antenna ports that the terminal device can transmit coherently.

In one embodiment, the power capability indication message does not contain the power class of the terminal device, and the determining device 301 is specifically configured to:

determine the power control scaling rule of the uplink signal according to the power capability and the power class of the terminal device;

where the power class of the terminal device is indicated by the network device, or reported by the terminal device.

In one embodiment, the determining device 301 is specifically configured to:

determine the power control scaling rule according to the power capability and at least one of the following parameters, where the parameters include:

the number of antenna ports configured by the network device for the uplink signal transmission;

a precoding matrix corresponding to the uplink signal;

a codebook subset restriction type corresponding to the uplink signal;

the number of transmission layers corresponding to the uplink signal;

maximum power of uplink transmission.

In one embodiment, the parameters include a precoding matrix corresponding to the uplink signal, and the determining device 301 is specifically configured to:

determine the power control scaling rule according to the power capability and the number of coherent antenna groups associated with non-zero elements in the precoding matrix corresponding to the uplink signal; or determine the power control scaling rule according to the power capability and a codeword coherent transmission type corresponding to the precoding matrix corresponding to the uplink signal; or determine the power control scaling rule according to the power capability, the number of coherent antenna groups associated with non-zero elements in the precoding matrix corresponding to the uplink signal, and the number of antenna ports configured by the network device for transmission of the uplink signal; or determine the power control scaling rule according to the power capability, a codeword coherent transmission type corresponding to the precoding matrix corresponding to the uplink signal, and the number of antenna ports configured for transmission of the uplink signal; or determine the power control scaling rule according to the power capability, a codeword coherent transmission type corresponding to the precoding matrix corresponding to the uplink signal, and the number of transmission layers corresponding to the uplink signal; or determine the power control scaling rule according to the power capability, a coherent transmission type corresponding to the precoding matrix corresponding to the uplink signal, the number of transmission layers corresponding to the uplink signal, and the number of antenna ports configured by the network device for transmission of the uplink signal.

In one embodiment, the parameters include the codebook subset restriction type corresponding to the uplink signal, and determining the power control scaling rule according to the power capability and at least one parameter includes:

determining the power control scaling rule according to the power capability, the codebook subset restriction type corresponding to the uplink signal, and the number of antenna ports configured by the network device for transmission of the uplink signal; or determining the power control scaling rule according to the power capability, the codebook subset restriction type corresponding to the uplink signal, the number of transmission layers corresponding to the uplink signal, and the number of antenna ports configured by the network device for transmission of the uplink signal; or determining the power control scaling rule according to the power capability, the codebook subset restriction type corresponding to the uplink signal, and a coherent transmission type corresponding to the precoding matrix corresponding to the uplink signal; or determining the power control scaling rule according to the power capability, the codebook subset restriction type corresponding to the uplink signal, a coherent transmission type corresponding to the precoding matrix corresponding to the uplink signal, and the number of antenna ports configured by the network device for transmission of the uplink signal; or determining the power control scaling rule according to the power capability, the codebook subset restriction type corresponding to the uplink signal, a coherent transmission type corresponding to the precoding matrix corresponding to the uplink signal, the number of transmission layers corresponding to the uplink signal, and the number of antenna ports configured by the network device for transmission of the uplink signal.

In one embodiment, the determining device 301 is specifically configured to:

determine the power control scaling rule as a first power control scaling rule when the power capability and the at least one parameter satisfy a first preset condition.

In one embodiment, the determining device 301 is specifically configured to:

determine the power control scaling rule as a second power control scaling rule when the power capability satisfies a second preset condition.

In one embodiment, the determining device 301 is specifically further configured to:

receive a codebook subset restriction parameter from the network device, where the codebook subset restriction parameter carries the first instruction message.

In one embodiment, the first instruction message carries a first parameter, the first parameter indicates the type of the power control scaling rule, and different types correspond to different power control scaling rules.

In one embodiment, the first instruction message carries a second parameter, the second parameter indicates whether the terminal device uses the full power to transmit an uplink signal.

In one embodiment, the determining device 301 is specifically configured to:

determine the power control scaling rule as a third power control scaling rule when the first instruction message satisfies a third preset condition.

In one embodiment, the power control scaling rule is at least one of:

not scaling the transmit power, calculated according to high-level parameters, of the uplink signal;

scaling the transmit power, calculated according to high-level parameters, of the uplink signal with a power control scaling factor.

In one embodiment, the processing device 302 is specifically configured to:

the second preset condition is that the transmit power of each antenna port or AC or PA of the terminal device reaches a maximum output power requirement corresponding to a power class of the terminal device, and the power control scaling rule is not scaling the transmit power, calculated according to high-level parameters, of the uplink signal or scaling the transmit power, calculated according to high-level parameters, of the uplink signal with a power control scaling factor of 1; or the third preset condition is that the first instruction message instructs the terminal device to transmit the uplink signal at full power, and the power control scaling rule is not scaling the transmit power, calculated according to high-level parameters, of the uplink signal or scaling the transmit power, calculated according to high-level parameters, of the uplink signal with a power control scaling factor of 1; or the first preset condition is that the transmit power of each antenna port or AC or PA of the terminal device reaches one half of the maximum output power requirement corresponding to a power class of the terminal device, the number of antenna ports configured by the network device for an uplink transmission mode of the uplink signal is greater than 1, and an indicated precoding matrix corresponds to a precoding matrix of single-layer NC transmission, and the power control scaling rule is scaling the transmit power, calculated according to high-level parameters, of the uplink signal with a power control scaling factor of ½; or the first preset condition is that the transmit power of each antenna port or AC or PA of the terminal device reaches a quarter of the maximum output power requirement corresponding to a power class of the terminal device, the number of antenna ports configured by the network device for an uplink transmission mode of the uplink signal is greater than 1, and an indicated precoding matrix corresponds to a precoding matrix of three-layer NC transmission, and the power control scaling rule is scaling the transmit power, calculated according to high-level parameters, of the uplink signal with a power control scaling factor of ¾; or the second preset condition is that the transmit power of each antenna port or AC or PA of the terminal device reaches a quarter of the maximum output power requirement corresponding to a power class of the terminal device, or a single antenna port or AC or PA of the terminal device does not reach a specific requirement, or the terminal device does not report the capability of each antenna port or AC or PA, or a communication protocol does not formulate a performance requirement for each antenna port or AC or PA of the terminal device, and the power control scaling rule is scaling the transmit power, calculated according to high-level parameters, of the uplink signal with a ratio of an actual number of ports for sending signals to the total number of ports configured by the network device for a transmission mode corresponding to the uplink signal; or the second preset condition is that the transmit power of each antenna port, or AC, or PA of the terminal device reaches the maximum power of uplink transmission, and the power control scaling rule is not scaling the transmit power, calculated according to high-level parameters, of the uplink signal or scaling the transmit power, calculated according to high-level parameters, of the uplink signal with a power control scaling factor of 1; or the first preset condition is that the power capability of the terminal device is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of single-layer NC transmission, and the power control scaling rule is scaling the transmit power, calculated according to high-level parameters, of the uplink signal with a power control scaling factor of ½; or the first preset condition is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of three-layer NC transmission, and the power control scaling rule is scaling the transmit power, calculated according to high-level parameters, of the uplink signal with a power control scaling factor of ¾; or the second preset condition is that the transmit power of each antenna port, or AC, or PA of the terminal device reaches a quarter of the maximum power of uplink transmission, or a single antenna port of the terminal device does not reach a specific requirement, or the terminal device does not report the capability of each antenna port, or a communication protocol does not formulate a performance requirement for each antenna port, or AC, or PA of the terminal device, and the power control scaling rule is scaling the transmit power, calculated according to high-level parameters, of the uplink signal with a ratio of an actual number of ports for sending signals to the total number of ports configured by the network device for a transmission mode corresponding to the uplink signal.

In one embodiment, the processing device 302 is specifically configured to:

scale the transmit power, calculated according to high-level parameters, of the uplink signal with a power control scaling factor, where:

when a precoding matrix of the uplink signal is non-coherent transmission precoding matrix, the power control scaling factor is $$\beta = \min\left\{\frac{P_0}{P}, \frac{P}{R}\right\};$$

or when a precoding matrix of the uplink signal is partial coherent transmission precoding matrix, the power control scaling factor is $$\beta = \min\left\{\frac{P_0}{P}, \frac{P}{2R}\right\};$$

or when a precoding matrix of the uplink signal is full-coherent transmission precoding matrix the power control scaling factor is $\beta=1$;

where R is the number of transmission layers of the uplink signal, $P_0$ is the number of ports of non-zero transmission corresponding to the precoding matrix of the uplink signal, and $P$ is the number of antenna ports configured by the network device for transmission of the uplink signal.

In one embodiment, the processing device 302 is specifically configured to:

scale the transmit power, calculated according to high-level parameters, of the uplink signa with a power control scaling factor, and:

the power control scaling factor is $$\beta = \min\left\{1, \frac{P}{G}\right\};$$

where $P$ is the number of antenna ports configured by the network device for the uplink signal MIMO transmission, and G is a coefficient related to the power capability of the terminal device; or the power control scaling factor is $$\beta = \max\left\{1, \frac{K}{R}\right\}\frac{\rho_0}{\rho},$$

where R is the number of transmission layers of the uplink signal, K is a coefficient, $\rho_0$ is the number of ports of non-zero transmission corresponding to the precoding matrix of the uplink signal, and $\rho$ is the number of antenna ports configured by the network device for the uplink signal transmission; or the power control scaling factor is $$\beta = \frac{G}{G_0}\frac{\rho_0}{\rho},$$

and R is the number of transmission layers of the uplink signal, $G_0$ is the number of coherent antenna groups corresponding to the precoding matrix of the uplink signal, G is the maximum number of coherent antenna groups, indicated by the network device to the terminal device, corresponding to all precoding matrices in a codebook corresponding to the codebook subset restriction type of the uplink signal, $\rho_0$ is the number of ports of non-zero transmission corresponding to the precoding matrix of the uplink signal, and $\rho$ is the number of antenna ports configured by the network device for transmission of the uplink signal.

In one embodiment, K is a coefficient related to the number of antenna ports of the uplink signal and the codebook subset restriction type corresponding to the uplink signal; or K is a coefficient related to the power capability of the terminal device.

Here, the physical devices corresponding to the determining device 301 and the processing device 302 may both be the aforementioned processor 202 or transceiver 203. The terminal device can execute the uplink power control method provided in the embodiment shown in FIG. 1. Therefore, for the functions that can be implemented by the functional modules in the device, the reference may be made to the corresponding description in the embodiment shown in FIG. 1, which will not be repeated.

Figure 4:
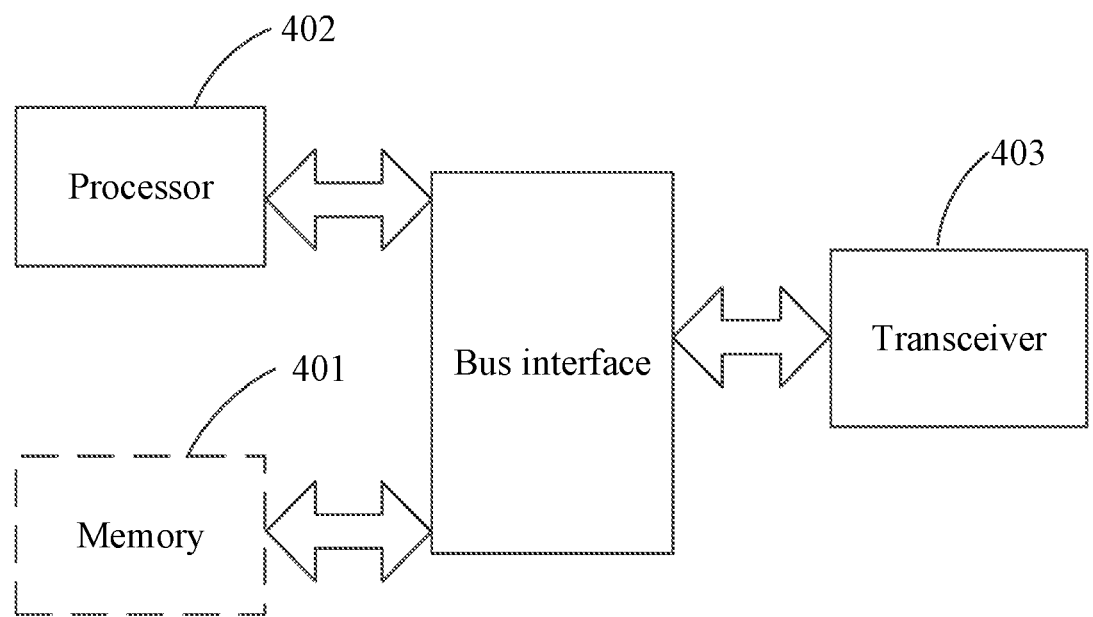
FIG. 4 is a structural schematic diagram of a network device provided by an embodiment of the present application.

Referring to FIG. 4, based on the same inventive concept, an embodiment of the present application provides a network device, which includes a memory 401, a processor 402 and a transceiver 403. The memory 401 and the transceiver 403 may be connected to the processor 402 through a bus interface (taking this as an example in FIG. 4), or may be connected to the processor 402 through special connection lines.

Here, the memory 401 may be configured to store programs. The transceiver 403 is configured to send and receive the data under the control of the processor 402. The processor 402 may be configured to read the programs in the memory 401 to perform the process of:

determining a power control scaling rule of an uplink signal;

instructing a terminal device to send an uplink signal;

determining the scheduling information of the uplink signal according to the power control scaling rule.

In one embodiment, the processor 402 is specifically configured to:

determine the power control scaling rule of the uplink signal according to a power capability of the terminal device.

In one embodiment, the processor 402 is further configured to:

send a first instruction message to the terminal device, where the first instruction message indicates the power control scaling rule of the uplink signal and/or the power capability of the terminal device.

In one embodiment, the processor 402 is further configured to:

determine a first instruction message of the uplink signal according to the power capability of the terminal device.

In one embodiment, the transceiver is specifically configured to:

send a codebook subset restriction parameter to the terminal device, where the codebook subset restriction parameter carries the first instruction message.

In one embodiment, the first instruction message carries a first parameter, the first parameter indicates the type of the power control scaling rule, and different types correspond to different power control scaling rules.

In one embodiment, the first instruction message carries a second parameter, the second parameter indicates whether the terminal device uses full power to transmit an uplink signal.

In one embodiment, the scheduling information of the uplink signal includes at least one of:
precoding and layer number indication information;
SRS indication information;
Modulation and Coding Level (MCS) information.

In one embodiment, the power capability of the terminal device includes:
default power capability; or
power capability indicated by a power capability indication message sent by the terminal device to the network device.

In one embodiment, the power capability indication message includes a first signaling parameter, and the first signaling parameter includes multiple candidate values or multiple states, where different candidate values indicate different power capabilities, and different states indicate different power capabilities.

In one embodiment, the power capability indication message includes:
the power capability indication message includes at least one of:
type information of the terminal device;
power class information of the terminal device;
coherence capability information of antennas of the terminal device or codebook subset type supported by the terminal device.

In one embodiment, the power capability includes at least one of:
capability of the terminal device on transmit power of an AC;
capability of the terminal device on transmit power of an antenna port;
capability of the terminal device on transmit power of a PA;
capability of the terminal device on supporting full power transmission for one or more layers when the uplink signal is in a codebook-based uplink transmission mode;
indicated capability on whether the terminal device supports UL full power transmission;

indicated capability on whether the terminal device supports full power transmission for the uplink signal in a codebook-based uplink transmission mode;

indicated capability on whether the terminal device supports full power transmission with single-layer transmission for the uplink signal in a codebook-based uplink transmission mode;

indicated capability on whether the terminal device supports full power transmission for the uplink signal in a non-codebook based uplink transmission mode;

indicated capability on whether the terminal device supports full power transmission with single-layer transmission for the uplink signal in a non-codebook based uplink transmission mode;

indicated capability on whether the terminal device can use a codebook beyond its antenna coherence capability.

In one embodiment, the power capability includes:

capability of the terminal device on transmit power of each AC; or capability of the terminal device on transmit power of each AC for the uplink signal in the codebook-based uplink transmission mode; or capability of the terminal device on transmit power of each AC corresponding to a coherent antenna group; or capability of the terminal device on transmit power of each AC corresponding to a coherent antenna group for the uplink signal in the codebook-based uplink transmission mode; or capability of the terminal device on transmit power of each PA; or capability of the terminal device on transmit power of each PA for the uplink signal in the codebook-based uplink transmission mode; or capability of the terminal device on transmit power of each PA corresponding to a coherent antenna group; or capability of the terminal device on transmit power of each PA corresponding to a coherent antenna group for the uplink signal in the codebook-based uplink transmission mode; or capability of the terminal device on transmit power of each antenna port; or capability of the terminal device on transmit power of each antenna port for the uplink signal in the codebook-based uplink transmission mode; or capability of the terminal device on transmit power of each antenna corresponding to a coherent antenna group; or capability of the terminal device on transmit power of each antenna corresponding to a coherent antenna group for the uplink signal in the codebook-based uplink transmission mode; or capability of the terminal device on transmit power corresponding to each coherent antenna group; or capability of the terminal device on transmit power corresponding to each coherent antenna group for the uplink signal in the codebook-based uplink transmission mode.

In one embodiment, the power capability includes at least one of:

capability of the terminal device on the sum of transmit powers of any group of coherent antenna groups can reach the maximum output power corresponding to the power class of the terminal device;

capability of the terminal device on the sum of transmit powers of all ACs or all PAs or all antenna ports can reach the maximum output power corresponding to the power class of the terminal device;

capability of the terminal device on the transmit power of at least one AC can reach the maximum output power corresponding to the power class of the terminal device;

capability of the terminal device on the sum of transmit powers of at least N ACs can reach the maximum output power corresponding to the power class of the terminal device, where N is a positive integer;

capability of the terminal device on each AC can reach one $M^{th}$ of the maximum output power corresponding to the power class of the terminal device, where M is a positive integer;

capability of the terminal device on the sum of transmit powers of any Q ACs can reach the maximum output power corresponding to the power class of the terminal device, where Q is a positive integer;

capability of the terminal device on the transmit power of at least one PA can reach the maximum output power corresponding to the power class of the terminal device;

capability of the terminal device on the sum of transmit powers of at least N PAs of the terminal device can reach the maximum output power corresponding to the power class of the terminal device, where N is a positive integer;

capability of the terminal device on the transmit power of each PA can reach one $M^{th}$ of the maximum output power corresponding to the power class of the terminal device, where M is a positive integer;

capability of the terminal device on the sum of transmit powers of any Q PAs can reach the maximum output power corresponding to the power class of the terminal device, where Q is a positive integer;

capability of the terminal device on the transmit power of at least one antenna port can reach the maximum output power corresponding to the power class of the terminal device;

capability of the terminal device on the sum of transmit powers of at least N antenna ports can reach the maximum output power corresponding to the power class of the terminal device, where N is a positive integer;

capability of the terminal device on the transmit power of each antenna port can reach one $M^{th}$ of the maximum output power corresponding to the power class of the terminal device for PUSCH in the codebook-based uplink transmission mode, where M is a positive integer;

capability of the terminal device on the sum of transmit powers of any Q antenna ports can reach the maximum output power corresponding to the power class of the terminal device for PUSCH in the codebook-based uplink transmission mode, where Q is a positive integer;

capability of the terminal device on the transmit power of at least one AC can reach the maximum output power corresponding to the power class of the terminal device for PUSCH in the codebook-based uplink transmission mode;

capability of the terminal device on the sum of transmit powers of at least N ACs can reach the maximum output power corresponding to the power class of the terminal device for PUSCH in the codebook-based uplink transmission mode, where N is a positive integer;

capability of the terminal device on the transmit power of each AC can reach one $M^{th}$ of the maximum output power corresponding to the power class of the terminal device for PUSCH in the codebook-based uplink transmission mode, where M is a positive integer;

capability of the terminal device on the sum of transmit powers of any Q ACs can reach the maximum output power corresponding to the power class of the terminal device for PUSCH in the codebook-based uplink transmission mode, where Q is a positive integer;

capability of the terminal device on the transmit power of at least one PA can reach the maximum output power corresponding to the power class of the terminal device for PUSCH in the codebook-based uplink transmission mode;

capability of the terminal device on the sum of transmit powers of at least N PAs can reach the maximum output power corresponding to the power class of the terminal device for PUSCH in the codebook-based uplink transmission mode, where N is a positive integer;

capability of the terminal device on the transmit power of each PA can reach one $M^{th}$ of the maximum output power corresponding to the power class of the terminal device for the PUSCH in the codebook-based uplink transmission mode, where M is a positive integer;

capability of the terminal device on the sum of transmit powers of any Q PAs can reach the maximum output power corresponding to the power class of the terminal device for PUSCH in the codebook-based uplink transmission mode, and Q is a positive integer;

capability of the terminal device on the transmit power of at least one antenna port can reach the maximum output power corresponding to the power class of the terminal device for the PUSCH in the codebook-based uplink transmission mode;

capability of the terminal device on the sum of transmit powers of at least N antenna ports can reach the maximum output power corresponding to the power class of the terminal device for PUSCH in the codebook-based uplink transmission mode, where N is a positive integer;

capability of the terminal device on the transmit power of each antenna port can reach one $M^{th}$ of the maximum output power corresponding to the power class of the terminal device for PUSCH in the codebook-based uplink transmission mode, where M is a positive integer;

capability of the terminal device on the sum of transmit powers of any Q antenna ports can reach the maximum output power corresponding to the power class of the terminal device for PUSCH in the codebook-based uplink transmission mode, where Q is a positive integer.

In one embodiment, N is the number of antenna ports corresponding to the uplink MIMO; M is the maximum number of antenna ports that the terminal device can transmit coherently.

In one embodiment, the processor 402 is specifically configured to:

determine the power control scaling rule according to the power capability and at least one of the following parameters, where the parameters include:

the number of antenna ports configured by the network device for transmission of the uplink signal;

a precoding matrix corresponding to the uplink signal;

a codebook subset restriction type corresponding to the uplink signal;

the number of transmission layers corresponding to the uplink signal;

maximum power of uplink transmission.

In one embodiment, the parameters include a precoding matrix corresponding to the uplink signal, and the processor 402 is specifically configured to:

determine the power control scaling rule according to the power capability and the number of coherent antenna groups associated with non-zero elements in the precoding matrix corresponding to the uplink signal; or determine the power control scaling rule according to the power capability and a codeword coherent transmission type corresponding to the precoding matrix corresponding to the uplink signal; or determine the power control scaling rule according to the power capability, the number of coherent antenna groups associated with non-zero elements in the precoding matrix corresponding to the uplink signal, and the number of antenna ports configured by the network device for transmission of the uplink signal; or determine the power control scaling rule according to the power capability, a codeword coherent transmission type corresponding to the precoding matrix corresponding to the uplink signal, and the number of antenna ports configured by the network device for transmission of the uplink signal; or determine the power control scaling rule according to the power capability, a codeword coherent transmission type corresponding to the precoding matrix corresponding to the uplink signal, and the number of transmission layers corresponding to the uplink signal; or determine the power control scaling rule according to the power capability, a coherent transmission type corresponding to the precoding matrix corresponding to the uplink signal, the number of transmission layers corresponding to the uplink signal, and the number of antenna ports configured by the network device for transmission of the uplink signal.

In one embodiment, the parameters include the codebook subset restriction type corresponding to the uplink signal, and determining the power control scaling rule according to the power capability and at least one parameter includes:

determining the power control scaling rule according to the power capability, the codebook subset restriction type corresponding to the uplink signal, and the number of antenna ports configured by the network device for transmission of the uplink signal; or determining the power control scaling rule according to the power capability, the codebook subset restriction type corresponding to the uplink signal, the number of transmission layers corresponding to the uplink signal, and the number of antenna ports configured by the network device for transmission of the uplink signal; or determining the power control scaling rule according to the power capability, the codebook subset restriction type corresponding to the uplink signal, and a coherent transmission type corresponding to the precoding matrix corresponding to the uplink signal; or determining the power control scaling rule according to the power capability, the codebook subset restriction type corresponding to the uplink signal, a coherent transmission type corresponding to the precoding matrix corresponding to the uplink signal, and the number of antenna ports configured by the network device for transmission of the uplink signal; or determining the power control scaling rule according to the power capability, the codebook subset restriction type corresponding to the uplink signal, a coherent transmission type corresponding to the precoding matrix corresponding to the uplink signal, the number of transmission layers corresponding to the uplink signal, and the number of antenna ports configured by the network device for transmission of the uplink signal.

In one embodiment, the power control scaling rule is at least one of:

not scaling the transmit power, calculated according to high-level parameters, of the uplink signal;

scaling the transmit power, calculated according to high-level parameters, of the uplink signal with a power control scaling factor.

In one embodiment, the processor 402 is specifically configured to:

when the power capability is that the transmit power of each antenna port or AC or PA of the terminal device reaches a maximum output power requirement corresponding to a power class of the terminal device, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the first instruction message instructs the terminal device to transmit the uplink signal at full power, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the transmit power of each antenna port or AC or PA of the terminal device reaches one half of the maximum output power requirement corresponding to a power class of the terminal device, the number of antenna ports configured by the network device for an uplink transmission mode of the uplink signal is greater than 1, and an indicated precoding matrix corresponds to a precoding matrix of single-layer non-coherent (NC) transmission, the power control scaling rule is scaling the transmit power, calculated according to high-level parameters, of the uplink signal with a power control scaling factor of ½; or when the power capability is that the transmit power of each antenna port or AC or PA of the terminal device reaches a quarter of the maximum output power requirement corresponding to a power class of the terminal device, the number of antenna ports configured by the network device for an uplink transmission mode of the uplink signal is greater than 1, and an indicated precoding matrix corresponds to a precoding matrix of three-layer NC transmission, the power control scaling rule is scaling the transmit power, calculated according to high-level parameters, of the uplink signal with a power control scaling factor of ¾; or when the power capability is that the transmit power of each antenna port or AC or PA of the terminal device reaches a quarter of the maximum output power requirement corresponding to a power class of the terminal device, or a single antenna port or AC or PA of the terminal device does not reach a specific requirement, or the terminal device does not report the capability of each antenna port or AC or PA, or a communication protocol does not formulate a performance requirement for each antenna port or AC or PA of the terminal device, the power control scaling rule is scaling the transmit power, calculated according to high-level parameters, of the uplink signal with a ratio of an actual number of ports for sending signals to the total number of ports configured by the network device for a transmission mode corresponding to the uplink signal; or when the power capability is that the transmit power of each antenna port, or AC, or PA of the terminal device reaches the maximum power of uplink transmission, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of single-layer NC transmission, the power control scaling rule is scaling the transmit power, calculated according to high-level parameters, of the uplink signal with a power control scaling factor of ½; or when the power capability is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of three-layer NC transmission, the power control scaling rule is scaling the transmit power, calculated according to high-level parameters, of the uplink signal with a power control scaling factor of ¾; or when the power capability is that the transmit power of each antenna port, or AC, or PA of the terminal device reaches a quarter of the maximum power of uplink transmission, or a single antenna port of the terminal device does not reach a specific requirement, or the terminal device does not report the capability of each antenna port, or a communication protocol does not formulate a performance requirement for each antenna port, or AC, or PA of the terminal device, the power control scaling rule is scaling the transmit power, calculated according to high-level parameters, of the uplink signal with a ratio of an actual number of ports for sending signals to the total number of ports configured by the network device for a transmission mode corresponding to the uplink signal.

In one embodiment, the first instruction message instructs the terminal device to transmit the uplink signal at full power, and then the first instruction message indicates to the terminal device that the power control scaling rule is not scaling the transmit power, calculated according to high-level parameters, of the uplink signal or scaling the transmit power, calculated according to high-level parameters, of the uplink signal with a power control scaling factor of 1.

In one embodiment, the processor 402 is specifically configured to:

determine the power control scaling factor according to the power capability of the terminal device, where:

when a precoding matrix of the uplink signal is non-coherent transmission precoding matrix, the power control scaling factor is $$\beta = \min\left\{\frac{\rho_0}{\rho}, \frac{\rho}{R}\right\};$$

or when a precoding matrix of the uplink signal is partial coherent transmission precoding matrix, the power control scaling factor is $$\beta = \min\left\{\frac{\rho_0}{\rho}, \frac{\rho}{2R}\right\};$$

or when a precoding matrix of the uplink signal is full-coherent transmission precoding matrix, the power control scaling factor is $\beta=1$;

where R is the number of transmission layers of the uplink signal, $\rho_0$ is the number of ports of non-zero transmission corresponding to the precoding matrix of the uplink signal, and $\rho$ is the number of antenna ports configured by the network device for transmission of the uplink signal.

In one embodiment, the processor 402 is specifically configured to:

determine the power control scaling factor according to the power capability of the terminal device, where:

the power control scaling factor is $$\beta = \min\left\{1, \frac{\rho}{G}\right\};$$

where ρ is the number of antenna ports configured by the network device for the uplink signal MIMO transmission, and G is a coefficient related to the power capability of the terminal device; or the power control scaling factor is $$\beta = \max\left\{1, \frac{K}{R}\right\}\frac{\rho_0}{\rho},$$

where R is the number of transmission layers of the uplink signal, K is a coefficient, $\rho_0$ is the number of ports of non-zero transmission corresponding to the precoding matrix of the uplink signal, and $\rho$ is the number of antenna ports configured by the network device for transmission of the uplink signal; or the power control scaling factor is $$\beta = \frac{G}{G_0}\frac{\rho_0}{\rho},$$

and R is the number of transmission layers of the uplink signal, $G_0$ is the number of coherent antenna groups corresponding to the precoding matrix of the uplink signal, G is the maximum number of coherent antenna groups, indicated by the network device to the terminal device, corresponding to all precoding matrices in a codebook corresponding to the codebook subset restriction type of the uplink signal, $\rho_0$ is the number of ports of non-zero transmission corresponding to the precoding matrix of the uplink signal, and $\rho$ is the number of antenna ports configured by the network device for transmission of the uplink signal.

In one embodiment, K is a coefficient related to the number of antenna ports of the uplink signal and the codebook subset restriction type corresponding to the uplink signal; or K is a coefficient related to the power capability of the terminal device.

Here, in FIG. 4, the bus architecture may include any numbers of interconnected buses and bridges, and specifically link various circuits of one or more processors represented by the processor 402 and the memory represented by the memory 401. The bus architecture may further link various other circuits such as peripheral device, voltage regulator and power management circuit, which are all well known in the art and thus will not be further described again herein. The bus interface provides an interface. The transceiver 403 may be a plurality of elements, i.e., include a transmitter and a receiver, and provide the devices for communicating with various other devices over the transmission media. The processor 402 is responsible for managing the bus architecture and general processing, and the memory 401 may store the data used by the processor 402 when performing the operations.

In one embodiment, the memory 401 may include a Read Only Memory (ROM), a Random Access Memory (RAM), and a magnetic disk memory. The memory 401 is used to store the data required by the processor 402 when running, that is, store the instructions that can be executed by at least one processor 402. The at least one processor 402 performs the uplink power control method provided by the embodiment shown in FIG. 1 by executing the instructions stored in the memory 401. Here, the number of memories 401 is one or more, and is shown together in FIG. 4, but it should be noted that the memory 401 is not a mandatory functional module, so it is shown by broken lines in FIG. 4.

Figure 5:
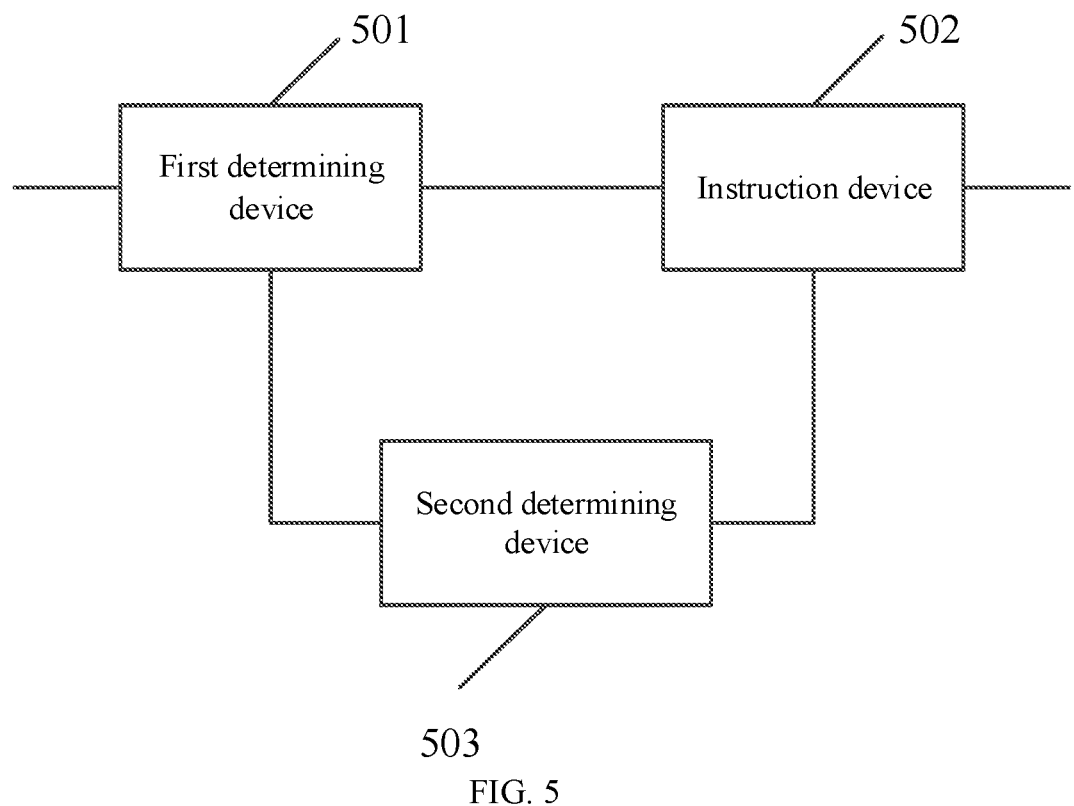
FIG. 5 is a structural schematic diagram of another network device provided by an embodiment of the present application.

Referring to FIG. 5, based on the same inventive concept, an embodiment of the present application provides a terminal device, which includes a first determining device 501, an instruction device 502 and a second determining device 503.

Here, the first determining device 501 is configured to determine a power control scaling rule of an uplink signal. The instruction device 502 is configured to instruct the terminal device to send an uplink signal. The second determining device 503 is configured to determine the scheduling information of the uplink signal according to the power control scaling rule.

deviceIn one embodiment, the first determining device 501 is specifically configured to:

determine the power control scaling rule of the uplink signal according to a power capability of the terminal device.

In one embodiment, the first determining device 501 is further configured to:

send a first instruction message to the terminal device, where the first instruction message indicates the power control scaling rule of the uplink signal and/or the power capability of the terminal device.

In one embodiment, the first determining device 501 is further configured to:

determine a first instruction message of the uplink signal according to the power capability of the terminal device.

In one embodiment, the first determining device 501 is further configured to:

send a codebook subset restriction parameter to the terminal device, where the codebook subset restriction parameter carries the first instruction message.

In one embodiment, the first instruction message carries a first parameter, the first parameter indicates the type of the power control scaling rule, and different types correspond to different power control scaling rules.

In one embodiment, the first instruction message carries a second parameter, the second parameter indicates whether the terminal device uses full power to transmit an uplink signal.

In one embodiment, the scheduling information of the uplink signal includes at least one of:

precoding and layer number indication information; SRS indication information; Modulation and Coding Level (MCS) information.

In one embodiment, the power capability of the terminal device includes:

default power capability; or power capability indicated by a power capability indication message sent by the terminal device to the network device.

In one embodiment, the power capability indication message includes a first signaling parameter, and the first signaling parameter includes multiple candidate values or multiple states, where different candidate values indicate different power capabilities, and different states indicate different power capabilities.

In one embodiment, the power capability indication message includes:

the power capability indication message includes at least one of:
type information of the terminal device;
power class information of the terminal device;
coherence capability information of antennas of the terminal device or codebook subset type supported by the terminal device.

In one embodiment, the power capability includes at least one of:
capability of the terminal device on transmit power of an AC;
capability of the terminal device on transmit power of an antenna port;
capability of the terminal device on transmit power of a PA;
capability of the terminal device on supporting full power transmission for one or more layers when the uplink signal is in a codebook-based uplink transmission mode;
indicated capability on whether the terminal device supports UL full power transmission;
indicated capability on whether the terminal device supports full power transmission for the uplink signal in a codebook-based uplink transmission mode;
indicated capability on whether the terminal device supports full power transmission with single-layer transmission for the uplink signal in a codebook-based uplink transmission mode;
indicated capability on whether the terminal device supports full power transmission for the uplink signal in a non-codebook based uplink transmission mode;
indicated capability on whether the terminal device supports full power transmission with single-layer transmission for the uplink signal in a non-codebook based uplink transmission mode;
indicated capability on whether the terminal device can use a codebook beyond its antenna coherence capability.

In one embodiment, the power capability includes:
capability of the terminal device on transmit power of each AC; or
capability of the terminal device on transmit power of each AC for the uplink signal in the codebook-based uplink transmission mode; or
capability of the terminal device on transmit power of each AC corresponding to a coherent antenna group; or
capability of the terminal device on transmit power of each AC corresponding to a coherent antenna group for the uplink signal in the codebook-based uplink transmission mode; or
capability of the terminal device on transmit power of each PA; or
capability of the terminal device on transmit power of each PA for the uplink signal in the codebook-based uplink transmission mode; or
capability of the terminal device on transmit power of each PA corresponding to a coherent antenna group; or
capability of the terminal device on transmit power of each PA corresponding to a coherent antenna group for the uplink signal in the codebook-based uplink transmission mode; or
capability of the terminal device on transmit power of each antenna port; or capability of the terminal device on transmit power of each antenna port for the uplink signal in the codebook-based uplink transmission mode; or
capability of the terminal device on transmit power of each antenna corresponding to a coherent antenna group; or
capability of the terminal device on transmit power of each antenna corresponding to a coherent antenna group for the uplink signal in the codebook-based uplink transmission mode; or
capability of the terminal device on transmit power corresponding to each coherent antenna group; or
capability of the terminal device on transmit power corresponding to each coherent antenna group for the uplink signal in the codebook-based uplink transmission mode.

In one embodiment, the power capability includes at least one of:
capability of the terminal device on the sum of transmit powers of any group of coherent antenna groups can reach the maximum output power corresponding to the power class of the terminal device;
capability of the terminal device on the sum of transmit powers of all ACs or all PAs or all antenna ports can reach the maximum output power corresponding to the power class of the terminal device;
capability of the terminal device on the transmit power of at least one AC can reach the maximum output power corresponding to the power class of the terminal device;
capability of the terminal device on the sum of transmit powers of at least N ACs can reach the maximum output power corresponding to the power class of the terminal device, where N is a positive integer;
capability of the terminal device on each AC can reach one $M^{th}$ of the maximum output power corresponding to the power class of the terminal device, where M is a positive integer;
capability of the terminal device on the sum of transmit powers of any Q ACs can reach the maximum output power corresponding to the power class of the terminal device, where Q is a positive integer;
capability of the terminal device on the transmit power of at least one PA can reach the maximum output power corresponding to the power class of the terminal device;
capability of the terminal device on the sum of transmit powers of at least N PAs of the terminal device can reach the maximum output power corresponding to the power class of the terminal device, where N is a positive integer;
capability of the terminal device on the transmit power of each PA can reach one $M^{th}$ of the maximum output power corresponding to the power class of the terminal device, where M is a positive integer;
capability of the terminal device on the sum of transmit powers of any Q PAs can reach the maximum output power corresponding to the power class of the terminal device, where Q is a positive integer;
capability of the terminal device on the transmit power of at least one antenna port can reach the maximum output power corresponding to the power class of the terminal device;
capability of the terminal device on the sum of transmit powers of at least N antenna ports can reach the maximum output power corresponding to the power class of the terminal device, where N is a positive integer;
capability of the terminal device on the transmit power of each antenna port can reach one $M^{th}$ of the maximum output power corresponding to the power class of the terminal device for PUSCH in the codebook-based uplink transmission mode, where M is a positive integer;

capability of the terminal device on the sum of transmit powers of any Q antenna ports can reach the maximum output power corresponding to the power class of the terminal device for PUSCH in the codebook-based uplink transmission mode, where Q is a positive integer;

capability of the terminal device on the transmit power of at least one AC can reach the maximum output power corresponding to the power class of the terminal device for the PUSCH in the codebook-based uplink transmission mode;

capability of the terminal device on the sum of transmit powers of at least N ACs can reach the maximum output power corresponding to the power class of the terminal device for PUSCH in the codebook-based uplink transmission mode, where N is a positive integer;

capability of the terminal device on the transmit power of each AC can reach one $M^{th}$ of the maximum output power corresponding to the power class of the terminal device for PUSCH in the codebook-based uplink transmission mode, where M is a positive integer;

capability of the terminal device on the sum of transmit powers of any Q ACs can reach the maximum output power corresponding to the power class of the terminal device for PUSCH in the codebook-based uplink transmission mode, where Q is a positive integer;

capability of the terminal device on the transmit power of at least one PA can reach the maximum output power corresponding to the power class of the terminal device for PUSCH in the codebook-based uplink transmission mode;

capability of the terminal device on the sum of transmit powers of at least N PAs can reach the maximum output power corresponding to the power class of the terminal device for PUSCH in the codebook-based uplink transmission mode, where N is a positive integer;

capability of the terminal device on the transmit power of each PA can reach one $M^{th}$ of the maximum output power corresponding to the power class of the terminal device for the PUSCH in the codebook-based uplink transmission mode, where M is a positive integer;

capability of the terminal device on the sum of transmit powers of any Q PAs can reach the maximum output power corresponding to the power class of the terminal device for PUSCH in the codebook-based uplink transmission mode, and Q is a positive integer;

capability of the terminal device on the transmit power of at least one antenna port can reach the maximum output power corresponding to the power class of the terminal device for PUSCH in the codebook-based uplink transmission mode;

capability of the terminal device on the sum of transmit powers of at least N antenna ports can reach the maximum output power corresponding to the power class of the terminal device for PUSCH in the codebook-based uplink transmission mode, where N is a positive integer;

capability of the terminal device on the transmit power of each antenna port can reach one $M^{th}$ of the maximum output power corresponding to the power class of the terminal device for PUSCH in the codebook-based uplink transmission mode, where M is a positive integer;

capability of the terminal device on the sum of transmit powers of any Q antenna ports can reach the maximum output power corresponding to the power class of the terminal device for PUSCH in the codebook-based uplink transmission mode, where Q is a positive integer.

In one embodiment, N is the number of antenna ports corresponding to the uplink MIMO; M is the maximum number of antenna ports that the terminal device can transmit coherently.

In one embodiment, the first determining device 501 is specifically configured to:

determine the power control scaling rule according to the power capability and at least one of the following parameters, where the parameters include:

the number of antenna ports configured by the network device for transmission of the uplink signal;

a precoding matrix corresponding to the uplink signal;

a codebook subset restriction type corresponding to the uplink signal;

the number of transmission layers corresponding to the uplink signal;

maximum power of uplink transmission.

In one embodiment, the parameters include a precoding matrix corresponding to the uplink signal, and the first determining device 501 is specifically configured to:

determine the power control scaling rule according to the power capability and the number of coherent antenna groups associated with non-zero elements in the precoding matrix corresponding to the uplink signal; or determine the power control scaling rule according to the power capability and a codeword coherent transmission type corresponding to the precoding matrix corresponding to the uplink signal; or determine the power control scaling rule according to the power capability, the number of coherent antenna groups associated with non-zero elements in the precoding matrix corresponding to the uplink signal, and the number of antenna ports configured by the network device for transmission of the uplink signal; or determine the power control scaling rule according to the power capability, a codeword coherent transmission type corresponding to the precoding matrix corresponding to the uplink signal, and the number of antenna ports configured by the network device for transmission of the uplink signal; or determine the power control scaling rule according to the power capability, a codeword coherent transmission type corresponding to the precoding matrix corresponding to the uplink signal, and the number of transmission layers corresponding to the uplink signal; or determine the power control scaling rule according to the power capability, a coherent transmission type corresponding to the precoding matrix corresponding to the uplink signal, the number of transmission layers corresponding to the uplink signal, and the number of antenna ports configured by the network device for transmission of the uplink signal.

In one embodiment, the parameters include the codebook subset restriction type corresponding to the uplink signal, and the first determining device 501 is specifically configured to:

determine the power control scaling rule according to the power capability, the codebook subset restriction type corresponding to the uplink signal, and the number of antenna ports configured by the network device for transmission of the uplink signal; or determine the power control scaling rule according to the power capability, the codebook subset restriction type corresponding to the uplink signal, the number of transmission layers corresponding to the uplink signal, and the number of antenna ports configured by the network device for transmission of the uplink signal; or determine the power control scaling rule according to the power capability, the codebook subset restriction type corresponding to the uplink signal, and a coherent transmission type corresponding to the precoding matrix corresponding to the uplink signal; or determine the power control scaling rule according to the power capability, the codebook subset restriction type corresponding to the uplink signal, a coherent transmission type corresponding to the precoding matrix corresponding to the uplink signal, and the number of antenna ports configured by the network device for transmission of the uplink signal; or determine the power control scaling rule according to the power capability, the codebook subset restriction type corresponding to the uplink signal, a coherent transmission type corresponding to the precoding matrix corresponding to the uplink signal, the number of transmission layers corresponding to the uplink signal, and the number of antenna ports configured by the network device for transmission of the uplink signal.

In one embodiment, the power control scaling rule is at least one of:

not scaling the transmit power, calculated according to high-level parameters, of the uplink signal;

scaling the transmit power, calculated according to high-level parameters, of the uplink signal with a power control scaling factor.

In one embodiment, the first determining device 501 is specifically configured to:

when the power capability is that the transmit power of each antenna port or AC or PA of the terminal device reaches a maximum output power requirement corresponding to a power class of the terminal device, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the first instruction message instructs the terminal device to transmit the uplink signal at full power, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the transmit power of each antenna port or AC or PA of the terminal device reaches one half of the maximum output power requirement corresponding to a power class of the terminal device, the number of antenna ports configured by the network device for an uplink transmission mode of the uplink signal is greater than 1, and an indicated precoding matrix corresponds to a precoding matrix of single-layer non-coherent (NC) transmission, the power control scaling rule is scaling the transmit power, calculated according to high-level parameters, of the uplink signal with a power control scaling factor of ½; or when the power capability is that the transmit power of each antenna port or AC or PA of the terminal device reaches a quarter of the maximum output power requirement corresponding to a power class of the terminal device, the number of antenna ports configured by the network device for an uplink transmission mode of the uplink signal is greater than 1, and an indicated precoding matrix corresponds to a precoding matrix of three-layer NC transmission, the power control scaling rule is scaling the transmit power, calculated according to high-level parameters, of the uplink signal with a power control scaling factor of ¾; or when the power capability is that the transmit power of each antenna port or AC or PA of the terminal device reaches a quarter of the maximum output power requirement corresponding to a power class of the terminal device, or a single antenna port or AC or PA of the terminal device does not reach a specific requirement, or the terminal device does not report the capability of each antenna port or AC or PA, or a communication protocol does not formulate a performance requirement for each antenna port or AC or PA of the terminal device, the power control scaling rule is scaling the transmit power, calculated according to high-level parameters, of the uplink signal with a ratio of an actual number of ports for sending signals to the total number of ports configured by the network device for a transmission mode corresponding to the uplink signal; or when the power capability is that the transmit power of each antenna port, or AC, or PA of the terminal device reaches the maximum power of uplink transmission, the power control scaling rule is not scaling the transmit power, calculated according to high-level parameters, of the uplink signal or scaling the transmit power, calculated according to high-level parameters, of the uplink signal with a power control scaling factor of 1; or when the power capability is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of single-layer NC transmission, the power control scaling rule is scaling the transmit power, calculated according to high-level parameters, of the uplink signal with a power control scaling factor of ½; or when the power capability is that the transmit power of each antenna port, or AC, or PA of the terminal device reaches one half of the maximum power of uplink transmission, the number of antenna ports configured by the network device for an uplink transmission mode of the uplink signal is greater than 1, and an indicated precoding matrix corresponds to a precoding matrix of three-layer NC transmission, the power control scaling rule is scaling the transmit power, calculated according to high-level parameters, of the uplink signal with a power control scaling factor of ¾; or when the power capability is that the transmit power of each antenna port, or AC, or PA of the terminal device reaches a quarter of the maximum power of uplink transmission, or a single antenna port of the terminal device does not reach a specific requirement, or the terminal device does not report the capability of each antenna port, or a communication protocol does not formulate a performance requirement for each antenna port, or AC, or PA of the terminal device, the power control scaling rule is scaling the transmit power, calculated according to high-level parameters, of the uplink signal with a ratio of an actual number of ports for sending signals to the total number of ports configured by the network device for a transmission mode corresponding to the uplink signal.

In one embodiment, the first instruction message instructs the terminal device to transmit the uplink signal at full power, and then the first instruction message indicates to the terminal device that the power control scaling rule is not scaling the transmit power, calculated according to high-level parameters, of the uplink signal or scaling the transmit power, calculated according to high-level parameters, of the uplink signal with a power control scaling factor of 1.

In one embodiment, the first determining device 501 is specifically configured to:

determine the power control scaling factor according to the power capability of the terminal device, where:

when a precoding matrix of the uplink signal is non-coherent transmission precoding matrix, the power control scaling factor is $$\beta = \min\left(\frac{\rho_0}{\rho}, \frac{\rho}{R}\right);$$

or when a precoding matrix of the uplink signal is partial coherent transmission precoding matrix, the power control scaling factor is $$\beta = \min\left(\frac{\rho_0}{\rho}, \frac{\rho}{2R}\right);$$

or when a precoding matrix of the uplink signal is full-coherent transmission precoding matrix, the power control scaling factor is $\beta=1$;

where R is the number of transmission layers of the uplink signal, $\rho_0$ is the number of ports of non-zero transmission corresponding to the precoding matrix of the uplink signal, and $\rho$ is the number of antenna ports configured by the network device for transmission of the uplink signal.

In one embodiment, the first determining device 501 is specifically configured to:

determine the power control scaling factor according to the power capability of the terminal device, where:

the power control scaling factor is $$\beta = \min\left(1, \frac{\rho}{G}\right);$$

where $\rho$ is the number of antenna ports configured by the network device for the uplink signal MIMO transmission, and G is a coefficient related to the power capability of the terminal device; or the power control scaling factor is $$\beta = \max\left\{1, \frac{K}{R}\right\}\frac{\rho_0}{\rho},$$

where R is the number of transmission layers of the uplink signal, K is a coefficient, $\rho_0$ is the number of ports of non-zero transmission corresponding to the precoding matrix of the uplink signal, and $\rho$ is the number of antenna ports configured by the network device for transmission of the uplink signal; or the power control scaling factor is $$\beta = \frac{G}{G_0}\frac{\rho_0}{\rho},$$

and R is the number of transmission layers of the uplink signal, $G_0$ is the number of coherent antenna groups corresponding to the precoding matrix of the uplink signal, G is the maximum number of coherent antenna groups, indicated by the network device to the terminal device, corresponding to all precoding matrices in a codebook corresponding to the codebook subset restriction type of the uplink signal, $\rho_0$ is the number of ports of non-zero transmission corresponding to the precoding matrix of the uplink signal, and $\rho$ is the number of antenna ports configured by the network device for transmission of the uplink signal.

In one embodiment, K is a coefficient related to the number of antenna ports of the uplink signal and the codebook subset restriction type corresponding to the uplink signal; or K is a coefficient related to the power capability of the terminal device.

Here, the physical devices corresponding to the first determining device 501, the instruction device 502 and the second determining device 503 may all be the aforementioned processor 402 or transceiver 403. The network device can be used to execute the uplink power control method provided in the embodiment shown in FIG. 1. Therefore, for the functions that can be implemented by the functional modules in the device, the reference may be made to the corresponding description in the embodiment shown in FIG. 1, which will not be repeated.

Based on the same inventive concept, an embodiment of the present application further provides a computer storage medium. The computer storage medium stores computer instructions. When the computer instructions run on a computer, the uplink power control method provided by the embodiment shown in FIG. 1 is performed.

The signal processing method, terminal device, and network device of the wireless communication system provided by the embodiments of the present application can be applied to a wireless communication system, such as a 5G system. The applicable communication systems include but not limited to: 5G system or its evolved system, other Orthogonal Frequency Division Multiplexing (OFDM)-based systems, DFT-S-OFDM (Discrete Fourier Transform-Spread OFDM)-based systems, Evolved Long Term Evolution (eLTE) system, and new network device systems, etc. In practical applications, the connections among the above devices may be wireless connections or wired connections.

It should be noted that the above communication system may include multiple terminals, and the network device may communicate (transmit signaling or data) with multiple terminals. The terminal device involved in the embodiments of the application may be a device for providing the voice and/or data connectivity to the user, a handheld device with the wireless connection function, or other processing device connected to the wireless modem. The wireless user equipment can communicate with one or more core networks via the Radio Access Network (RAN), and the wireless user equipment can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The terminal can also be called system, Subscriber Device, Subscriber Station, Mobile Station, Mobile Station, Remote Station, Access Point, Remote Terminal, Access Terminal, User Terminal, User Agent, User Device, wireless device.

The network device provided by the embodiments of the present application may be a base station, or is used to perform the interconversion between the received air frame and the IP packet, and used as the router between the wireless terminal device and the rest of the access network. The rest of the access network may include Internet Protocol (IP) network devices. The network device may also be a device that coordinates the attribute management of the air interface. For example, the network device can be a network device in the 5G system, such as Next generation Node B (gNB), or can be the Base Transceiver Station (BTS) in the GSM or CDMA, or can be the NodeB in the Wideband Code Division Multiple Access (WCDMA), or can be the evolutional Node B (eNB or e-NodeB) in the LTE, which is not limited by the embodiments of the application.

It should be understood that the word such as "first" or "second" in the description of the embodiments of the present application is only for purpose of distinguishing the description, and cannot be construed to indicate or imply the relative importance and cannot be construed to indicate or imply the order either. In the description of the embodiments of the present application, "a plurality of" refers to two or more.

In some possible embodiments, various aspects of the uplink power control method, the network device and the terminal device provided by the present application can also be implemented in the form of a program product, which includes program codes. When the program product runs on a computer device, the program codes are configured to cause the computer device to perform the steps in the uplink power control method according to various exemplary embodiments of the present application described above in this specification, for example, the computer device may perform the uplink power control method of the wireless communication system provided by the embodiment as shown in FIG. 1.

The program product can use any combination of one or more readable media. The readable medium may be a readable signal medium or a readable storage medium. The readable storage medium may be, for example but not limited to, electrical, magnetic, optical, electromagnetic, infrared, or semiconductor system, apparatus or device, or any combination thereof. More specific examples of the readable storage media (non-exhaustive list) include: electrical connection with one or more wires, portable disk, hard disk, Random Access Memory (RAM), Read Only Memory (ROM), Erasable Programmable Read Only Memory (EPROM) or flash memory, optical fiber, portable Compact Disk-Read Only Memory (CD-ROM), optical storage device, magnetic storage device, or any suitable combination thereof.

The program product for the signal processing method of the wireless communication system of the embodiment of the present application may adopt a portable Compact Disk-Read Only Memory (CD-ROM) and include program codes, and may be run on a computing device. However, the program product of the present application is not limited to this. In this document, the readable storage medium can be any tangible medium that contains or stores a program, where the program can be used by or used in combination with the instruction execution system, apparatus or device.

It should be noted that several devices or subdevices of the apparatuses are mentioned in the above detailed description, but such division is only exemplary and not mandatory. In fact, according to the embodiments of the present application, the features and functions of two or more devices described above may be embodied in one device. Conversely, the features and functions of one device described above may be further divided into multiple devices to be embodied.

In addition, although the operations of the method of the present application are described in a specific order in the drawings, this does not require or imply that these operations must be performed in the specific order or that all the operations shown must be performed to achieve the desired result. Additionally or alternatively, some steps may be omitted, multiple steps may be combined into one step for execution, and/or one step may be decomposed into multiple steps for execution.

The embodiments of the application can provide methods, systems and computer program products. Thus the application can take the form of hardware embodiments alone, software embodiments alone, or embodiments combining the software and hardware aspects. Also the application can take the form of computer program products implemented on one or more computer usable storage mediums (including but not limited to magnetic disk memories, CD-ROMs, optical memories and the like) containing computer usable program codes therein.

The application is described by reference to the flow charts and/or the block diagrams of the methods, the devices (systems) and the computer program products according to the embodiments of the application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. An uplink power control method, comprising:
   determining a power control scaling rule of an uplink signal according to a power capability of a terminal device and a first instruction message from a network device, or
   determining a power control scaling rule of an uplink signal according to a first instruction message from a network device;
   processing transmit power of the uplink signal according to the power control scaling rule, and determining transmit power on each antenna port of the uplink signal according to the processed transmit power;
wherein the first instruction message carries a first parameter, the first parameter indicates a type of the power control scaling rule; and
the power capability of the terminal device comprises: power capability indicated by a power capability indication message sent by the terminal device to the network device.

2. The method of claim 1, wherein the power capability indication message comprises at least one of:
type information of the terminal device;
power class information of the terminal device;
coherence capability information of antennas of the terminal device; or
codebook subset type supported by the terminal device.

3. The method of claim 1, wherein the power capability comprises at least one of:
capability of the terminal device on transmit power of an Antenna Connector (AC);
capability of the terminal device on transmit power of an antenna port;
capability of the terminal device on transmit power of a Power Amplifier (PA);
capability of the terminal device on supporting full power transmission for one or more layers when the uplink signal is in a codebook-based uplink transmission mode;
indicated capability on whether the terminal device supports UL full power transmission;
indicated capability on whether the terminal device supports full power transmission for the uplink signal in a codebook-based uplink transmission mode;
indicated capability on whether the terminal device supports full power transmission with single-layer transmission for the uplink signal in a codebook-based uplink transmission mode;
indicated capability on whether the terminal device supports full power transmission for the uplink signal in a non-codebook based uplink transmission mode;
indicated capability on whether the terminal device supports full power transmission with single-layer transmission for the uplink signal in a non-codebook based uplink transmission mode;
indicated capability on whether the terminal device can use a codebook beyond its antenna coherence capability.

4. The method of claim 1, wherein the determining the power control scaling rule of the uplink signal according to the power capability, comprises:
determining the power control scaling rule according to the power capability and at least one of following parameters:
a quantity of antenna ports configured by the network device for transmission of the uplink signal;
a precoding matrix corresponding to the uplink signal;
a codebook subset restriction type corresponding to the uplink signal;
a quantity of transmission layers corresponding to the uplink signal;
maximum power of uplink transmission.

5. The method of claim 1, wherein the determining the power control scaling rule according to the power capability, comprises:
determining the power control scaling rule as a second power control scaling rule when the power capability satisfies a second preset condition; and/or determining the power control scaling rule as a third power control scaling rule when the first instruction message satisfies a third preset condition.

6. The method of claim 1, further comprising:
receiving a codebook subset restriction parameter from the network device, wherein the codebook subset restriction parameter carries the first instruction message.

7. The method of claim 6, wherein the first instruction message carries a second parameter, and the second parameter indicates whether the terminal device uses full power to transmit an uplink signal.

8. The method of claim 5, wherein the power control scaling rule is at least one of:
not scaling a transmit power, calculated according to high-level parameters, of the uplink signal;
scaling a transmit power, calculated according to high-level parameters, of the uplink signal with a power control scaling factor.

9. The method of claim 8, wherein the processing the transmit power of the uplink signal according to the scaling rule, comprises:
the second preset condition is that the transmit power of each antenna port, or the transmit power of each AC, or the transmit power of each PA of the terminal device reaches a maximum output power requirement corresponding to a power class of the terminal device, and the power control scaling rule is:
not scaling the transmit power, calculated according to high-level parameters, of the uplink signal, or
scaling the transmit power, calculated according to high-level parameters, of the uplink signal with a power control scaling factor of 1;
or the third preset condition is that the first instruction message instructs the terminal device to transmit the uplink signal at full power, and the power control scaling rule is:
not scaling the transmit power, calculated according to high-level parameters, of the uplink signal, or
scaling the transmit power, calculated according to high-level parameters, of the uplink signal with a power control scaling factor of 1;
or the second preset condition is that:
the transmit power of each antenna port, or the transmit power of each AC, or the transmit power of each PA of the terminal device reaches a quarter of a maximum output power requirement corresponding to a power class of the terminal device, or
a single antenna port or AC or PA of the terminal device does not reach a specific requirement, or
the terminal device does not report capability of each antenna port or AC or PA, or
a communication protocol does not formulate a performance requirement for each antenna port or AC or PA of the terminal device, and
the power control scaling rule is:
scaling the transmit power, calculated according to high-level parameters, of the uplink signal with a ratio of an actual number of ports for sending signals to a total number of ports configured by the network device for a transmission mode corresponding to the uplink signal;
or the second preset condition is that the transmit power of each antenna port, or the transmit power of each AC, or the transmit power of each PA of the terminal device reaches a maximum power of uplink transmission, and the power control scaling rule is:

not scaling the transmit power, calculated according to high-level parameters, of the uplink signal, or
scaling the transmit power, calculated according to high-level parameters, of the uplink signal with a power control scaling factor of 1;
or the second preset condition is that:
the transmit power of each antenna port, or the transmit power of each AC, or the transmit power of each PA of the terminal device reaches a quarter of a maximum power of uplink transmission, or
a single antenna port of the terminal device does not reach a specific requirement, or
the terminal device does not report capability of each antenna port, or
a communication protocol does not formulate a performance requirement for each antenna port or AC or PA of the terminal device, and
the power control scaling rule is:
scaling the transmit power, calculated according to high-level parameters, of the uplink signal with a ratio of an actual number of ports for sending signals to a total number of ports configured by the network device for a transmission mode corresponding to the uplink signal.

10. An uplink power control method, comprising:
determining a power control scaling rule of an uplink signal according to a power capability of a terminal device;
sending a first instruction message to the terminal device, wherein the first instruction message indicates the power control scaling rule of the uplink signal and/or the power capability of the terminal device; the first instruction message carries a first parameter, the first parameter indicates a type of the power control scaling rule; and the power capability of the terminal device comprises: power capability indicated by a power capability indication message sent by the terminal device to the network device;
instructing a terminal device to send an uplink signal;
determining scheduling information of the uplink signal according to the power control scaling rule.

11. The method of claim 10, further comprising:
determining the first instruction message of the uplink signal according to the power capability of the terminal device.

12. The method of claim 10, wherein the sending the first instruction message to the terminal device, comprises:
sending a codebook subset restriction parameter to the terminal device, wherein the codebook subset restriction parameter carries the first instruction message.

13. The method of claim 10,
wherein the first instruction message carries a second parameter, and the second parameter indicates whether the terminal device uses full power to transmit an uplink signal.

14. The method of claim 10, wherein the power capability of the terminal device comprises:
default power capability; or
power capability indicated by a power capability indication message sent by the terminal device to the network device; wherein the power capability indication message comprises at least one of:
type information of the terminal device;
power class information of the terminal device;
coherence capability information of antennas of the terminal device; or
codebook subset type supported by the terminal device.

15. The method of claim 10, wherein the power capability comprises at least one of:
capability of the terminal device on transmit power of an Antenna Connector (AC);
capability of the terminal device on transmit power of an antenna port;
capability of the terminal device on transmit power of a Power Amplifier (PA);
capability of the terminal device on supporting full power transmission for one or more layers when the uplink signal is in a codebook-based uplink transmission mode;
indicated capability on whether the terminal device supports UL full power transmission;
indicated capability on whether the terminal device supports full power transmission for the uplink signal in a codebook-based uplink transmission mode;
indicated capability on whether the terminal device supports full power transmission with single-layer transmission for the uplink signal in a codebook-based uplink transmission mode;
indicated capability on whether the terminal device supports full power transmission for the uplink signal in a non-codebook based uplink transmission mode;
indicated capability on whether the terminal device supports full power transmission with single-layer transmission for the uplink signal in a non-codebook based uplink transmission mode;
indicated capability on whether the terminal device can use a codebook beyond its antenna coherence capability.

16. The method of claim 10, wherein the determining the power control scaling rule of the uplink signal according to the power capability of the terminal device, comprises:
determining the power control scaling rule according to the power capability and at least one of following parameters comprising:
a quantity of antenna ports configured by the network device for transmission of the uplink signal;
a precoding matrix corresponding to the uplink signal;
a codebook subset restriction type corresponding to the uplink signal;
a quantity of transmission layers corresponding to the uplink signal;
maximum power of uplink transmission.

17. The method of claim 10, wherein the power control scaling rule is at least one of:
not scaling a transmit power, calculated according to high-level parameters, of the uplink signal;
scaling a transmit power, calculated according to high-level parameters, of the uplink signal with a power control scaling factor.

18. The method of claim 17, wherein the determining the power control scaling rule of the uplink signal according to the power capability of the terminal device, comprises:
when the power capability is that the transmit power of each antenna port, or the transmit power of each AC, or the transmit power of each PA of the terminal device reaches a maximum output power requirement corresponding to a power class of the terminal device, the power control scaling rule is:
not scaling the transmit power, calculated according to high-level parameters, of the uplink signal, or
scaling the transmit power, calculated according to high-level parameters, of the uplink signal with a power control scaling factor of 1;

or when the power capability is that the first instruction message instructs the terminal device to transmit the uplink signal at full power, the power control scaling rule is:

not scaling the transmit power, calculated according to high-level parameters, of the uplink signal, or scaling the transmit power, calculated according to high-level parameters, of the uplink signal with a power control scaling factor of 1;

or when the power capability is that the transmit power of each antenna port, or the transmit power of each AC, or the transmit power of each PA of the terminal device reaches one half of a maximum output power requirement corresponding to a power class of the terminal device, a quantity of antenna ports configured by the network device for an uplink transmission mode of the uplink signal is greater than 1, and an indicated precoding matrix corresponds to a precoding matrix of single-layer non-coherent (NC) transmission, the power control scaling rule is:

scaling the transmit power, calculated according to high-level parameters, of the uplink signal with a power control scaling factor of ½;

or when the power capability is that the transmit power of each antenna port, or the transmit power of each AC, or the transmit power of each PA of the terminal device reaches a quarter of a maximum output power requirement corresponding to a power class of the terminal device, a quantity of antenna ports configured by the network device for an uplink transmission mode of the uplink signal is greater than 1, and an indicated precoding matrix corresponds to a precoding matrix of three-layer NC transmission, and the power control scaling rule is:

scaling the transmit power, calculated according to high-level parameters, of the uplink signal with a power control scaling factor of ¾;

or when the power capability is that:

the transmit power of each antenna port, or the transmit power of each AC, or the transmit power of each PA of the terminal device reaches a quarter of a maximum output power requirement corresponding to a power class of the terminal device, or a single antenna port or AC or PA of the terminal device does not reach a specific requirement, or the terminal device does not report capability of each antenna port or AC or PA, or a communication protocol does not formulate a performance requirement for each antenna port or AC or PA of the terminal device, and the power control scaling rule is:

scaling the transmit power, calculated according to high-level parameters, of the uplink signal with a ratio of an actual number of ports for sending signals to a total number of ports configured by the network device for a transmission mode corresponding to the uplink signal;

or when the power capability is that the transmit power of each antenna port, or the transmit power of each AC, or the transmit power of each PA of the terminal device reaches a maximum power of uplink transmission, the power control scaling rule is:

not scaling the transmit power, calculated according to high-level parameters, of the uplink signal, or scaling the transmit power, calculated according to high-level parameters, of the uplink signal with a power control scaling factor of 1;

or when the power capability is that the transmit power of each antenna port, or the transmit power of each AC, or the transmit power of each PA of the terminal device reaches one half of a maximum power of uplink transmission, a quantity of antenna ports configured by the network device for an uplink transmission mode of the uplink signal is greater than 1, and an indicated precoding matrix corresponds to a precoding matrix of single-layer NC transmission, the power control scaling rule is:

scaling the transmit power, calculated according to high-level parameters, of the uplink signal with a power control scaling factor of ½;

or when the power capability is that the transmit power of each antenna port, or the transmit power of each AC, or the transmit power of each PA of the terminal device reaches one half of a maximum power of uplink transmission, a quantity of antenna ports configured by the network device for an uplink transmission mode of the uplink signal is greater than 1, and an indicated precoding matrix corresponds to a precoding matrix of three-layer NC transmission, the power control scaling rule is:

scaling the transmit power, calculated according to high-level parameters, of the uplink signal with a power control scaling factor of ¾;

or when the power capability is that:

the transmit power of each antenna port, or the transmit power of each AC, or the transmit power of each PA of the terminal device reaches a quarter of a maximum power of uplink transmission, or a single antenna port of the terminal device does not reach a specific requirement, or the terminal device does not report capability of each antenna port, or a communication protocol does not formulate a performance requirement for each antenna port, or AC, or PA of the terminal device, and the power control scaling rule is:

scaling the transmit power, calculated according to high-level parameters, of the uplink signal with a ratio of an actual number of ports for sending signals to a total number of ports configured by the network device for a transmission mode corresponding to the uplink signal.

19. A terminal device, comprising:

a memory configured to store instructions;

a processor configured to read the instructions in the memory to perform a process of:

determining a power control scaling rule of an uplink signal according to a power capability of a terminal device and a first instruction message from a network device, or determining a power control scaling rule of an uplink signal according to a first instruction message from a network device;

processing transmit power of the uplink signal according to the power control scaling rule, and determining transmit power on each antenna port of the uplink signal according to the processed transmit power;

a transceiver configured to receive and send data under the control of the processor;

wherein the first instruction message carries a first parameter, the first parameter indicates a type of the power control scaling rule; and the power capability of the terminal device comprises: power capability indicated by a power capability indication message sent by the terminal device to the network device.

20. The terminal device of claim 19, wherein the processor is further configured to:
determine the power control scaling rule according to the power capability and at least one of following parameters:
a quantity of antenna ports configured by the network device for transmission of the uplink signal;
a precoding matrix corresponding to the uplink signal;
a codebook subset restriction type corresponding to the uplink signal;
a quantity of transmission layers corresponding to the uplink signal;
maximum power of uplink transmission.

21. The terminal device of claim 19, wherein the processor is further configured to:
determine the power control scaling rule as a second power control scaling rule when the power capability satisfies a second preset condition;
determine the power control scaling rule as a third power control scaling rule when the first instruction message satisfies a third preset condition.

22. The terminal device of claim 21, wherein:
the second preset condition is that the transmit power of each antenna port, or the transmit power of each AC, or the transmit power of each PA of the terminal device reaches a maximum output power requirement corresponding to a power class of the terminal device, and the power control scaling rule is:
not scaling the transmit power, calculated according to high-level parameters, of the uplink signal, or
scaling the transmit power, calculated according to high-level parameters, of the uplink signal with a power control scaling factor of 1;
or the third preset condition is that the first instruction message instructs the terminal device to transmit the uplink signal at full power, and the power control scaling rule is:
not scaling the transmit power, calculated according to high-level parameters, of the uplink signal, or
scaling the transmit power, calculated according to high-level parameters, of the uplink signal with a power control scaling factor of 1;
or the second preset condition is that:
the transmit power of each antenna port, or the transmit power of each AC, or the transmit power of each PA of the terminal device reaches a quarter of a maximum output power requirement corresponding to a power class of the terminal device, or
a single antenna port or AC or PA of the terminal device does not reach a specific requirement, or
the terminal device does not report capability of each antenna port or AC or PA, or
a communication protocol does not formulate a performance requirement for each antenna port or AC or PA of the terminal device, and
the power control scaling rule is:
scaling the transmit power, calculated according to high-level parameters, of the uplink signal with a ratio of an actual number of ports for sending signals to a total number of ports configured by the network device for a transmission mode corresponding to the uplink signal;
or the second preset condition is that the transmit power of each antenna port, or the transmit power of each AC, or the transmit power of each PA of the terminal device reaches a maximum power of uplink transmission, and the power control scaling rule is:
not scaling the transmit power, calculated according to high-level parameters, of the uplink signal, or
scaling the transmit power, calculated according to high-level parameters, of the uplink signal with a power control scaling factor of 1;
or the second preset condition is that:
the transmit power of each antenna port, or the transmit power of each AC, or the transmit power of each PA of the terminal device reaches a quarter of a maximum power of uplink transmission, or
a single antenna port of the terminal device does not reach a specific requirement, or
the terminal device does not report capability of each antenna port, or
a communication protocol does not formulate a performance requirement for each antenna port or AC or PA of the terminal device, and
the power control scaling rule is:
scaling the transmit power, calculated according to high-level parameters, of the uplink signal with a ratio of an actual number of ports for sending signals to a total number of ports configured by the network device for a transmission mode corresponding to the uplink signal.

23. A network device, comprising:
a memory configured to store instructions;
a processor configured to read the instructions in the memory to perform the method of claim 10;
a transceiver configured to receive and send data under the control of the processor.

* * * * *